US012619831B1

(12) United States Patent
DeLisi

(10) Patent No.: US 12,619,831 B1
(45) Date of Patent: May 5, 2026

(54) SYSTEMS AND METHODS FOR GENERATING DELIBERATIVE COMMITTEES OF AGE-STRATIFIED LARGE LANGUAGE MODELS

(71) Applicant: Charles DeLisi, Naples, FL (US)

(72) Inventor: Charles DeLisi, Naples, FL (US)

(73) Assignee: Charles DeLisi, Chestnut Hill, MA (US)

( * ) Notice: Subject to any disclaimer, the term of this patent is extended or adjusted under 35 U.S.C. 154(b) by 0 days.

(21) Appl. No.: 19/277,948

(22) Filed: Jul. 23, 2025

Related U.S. Application Data

(60) Provisional application No. 63/788,599, filed on Apr. 14, 2025, provisional application No. 63/788,586, filed on Apr. 14, 2025.

(51) Int. Cl.
*G06F 40/30* (2020.01)
*G06F 40/35* (2020.01)
*H04L 41/40* (2022.01)

(52) U.S. Cl.
CPC .............. *G06F 40/35* (2020.01); *H04L 41/40* (2022.05)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 5,340,317 A * | 8/1994 | Freeman .................. G09B 5/04 |
| | | | 434/319 |
| 8,909,780 B1 | 12/2014 | Dickinson et al. |
| 10,853,717 B2 | 12/2020 | Abramson et al. |
| 10,984,151 B1 * | 4/2021 | Brown .................... G06F 30/20 |
| 11,444,893 B1 * | 9/2022 | Kalluri .................... G10L 15/22 |
| 11,762,995 B2 | 9/2023 | Concha et al. |
| 11,956,509 B1 * | 4/2024 | Fisher ................ H04N 21/4316 |
| 2012/0123811 A1 * | 5/2012 | Socolof .................. H04N 7/155 |
| | | | 705/5 |
| 2013/0097513 A1 * | 4/2013 | Adarraga .............. H04L 65/403 |
| | | | 715/736 |
| 2013/0257877 A1 * | 10/2013 | Davis ..................... G06N 3/006 |
| | | | 345/473 |

(Continued)

*Primary Examiner* — Lamont M Spooner
(74) *Attorney, Agent, or Firm* — Wolf, Greenfield & Sacks, P.C.

(57) ABSTRACT

The techniques described herein relate to systems and methods for generating deliberative committees of age-stratified large language models (LLMs). An example method for generating a dialogue between at least first and second age-stratified LLMs trained to generate simulated responses to questions that respective first/second persons would have provided in a particular life stage comprises receiving a prompt comprising a question, executing the first LLM to generate a first simulated response to the question that the first person would have provided in the first life stage, executing, using the prompt and/or the first simulated response, the second LLM to generate a second simulated response to at least the question that the second person would have provided in the second life stage, and generating, using the response(s), an output representing a third simulated response to the question that the first/second persons would have collectively determined to provide in their particular life stages.

20 Claims, 14 Drawing Sheets

(56) References Cited

U.S. PATENT DOCUMENTS

| | | | |
|---|---|---|---|
| 2014/0101079 A1* | 4/2014 | Deal | G06N 5/045 |
| | | | 706/12 |
| 2016/0063993 A1* | 3/2016 | Dolan | G06N 20/00 |
| | | | 704/254 |
| 2017/0102915 A1* | 4/2017 | Kuscher | G06F 16/9574 |
| 2017/0132313 A1 | 5/2017 | Kukla et al. | |
| 2018/0160180 A1* | 6/2018 | Kedenburg, III | H04N 21/4753 |
| 2018/0174580 A1* | 6/2018 | Kim | G10L 15/197 |
| 2018/0331842 A1* | 11/2018 | Faulkner | H04N 7/15 |
| 2019/0130424 A1* | 5/2019 | Greenfield | G06Q 30/0201 |
| 2019/0266280 A1* | 8/2019 | Acampado | G06F 16/3329 |
| 2020/0320769 A1 | 10/2020 | Chen et al. | |
| 2021/0397922 A1* | 12/2021 | Crabtree | H04L 67/10 |
| 2022/0231944 A1 | 7/2022 | Jindal et al. | |
| 2022/0253321 A1* | 8/2022 | Iida | G16Z 99/00 |
| 2022/0292543 A1* | 9/2022 | Henderson | G06Q 30/0252 |
| 2023/0259705 A1* | 8/2023 | Tunstall-Pedoe | G06N 3/0499 |
| | | | 704/9 |
| 2023/0274086 A1* | 8/2023 | Tunstall-Pedoe | G06F 40/20 |
| | | | 704/9 |
| 2023/0274089 A1* | 8/2023 | Tunstall-Pedoe | G06F 40/40 |
| | | | 704/2 |
| 2023/0274094 A1* | 8/2023 | Tunstall-Pedoe | G06F 40/30 |
| | | | 704/9 |
| 2023/0316006 A1* | 10/2023 | Tunstall-Pedoe | G06N 3/0442 |
| | | | 704/9 |
| 2024/0127002 A1* | 4/2024 | Newman | G06F 40/20 |
| 2024/0169724 A1* | 5/2024 | Suppa | G06V 20/41 |
| 2024/0427999 A1* | 12/2024 | Newman | G06F 16/955 |
| 2025/0006182 A1* | 1/2025 | Ingel | G10L 15/063 |
| 2025/0029723 A1* | 1/2025 | Bhatt | G16H 50/20 |
| 2025/0045996 A1* | 2/2025 | Lebaredian | G06T 13/00 |
| 2025/0111150 A1* | 4/2025 | Garapati | G06F 40/30 |
| 2025/0111919 A1* | 4/2025 | Kyyrö | G16H 40/67 |
| 2025/0200893 A1* | 6/2025 | Bosworth | G06F 40/00 |
| 2025/0232346 A1* | 7/2025 | Zhang | G06Q 30/015 |
| 2025/0267171 A1 | 8/2025 | Sharma et al. | |

* cited by examiner

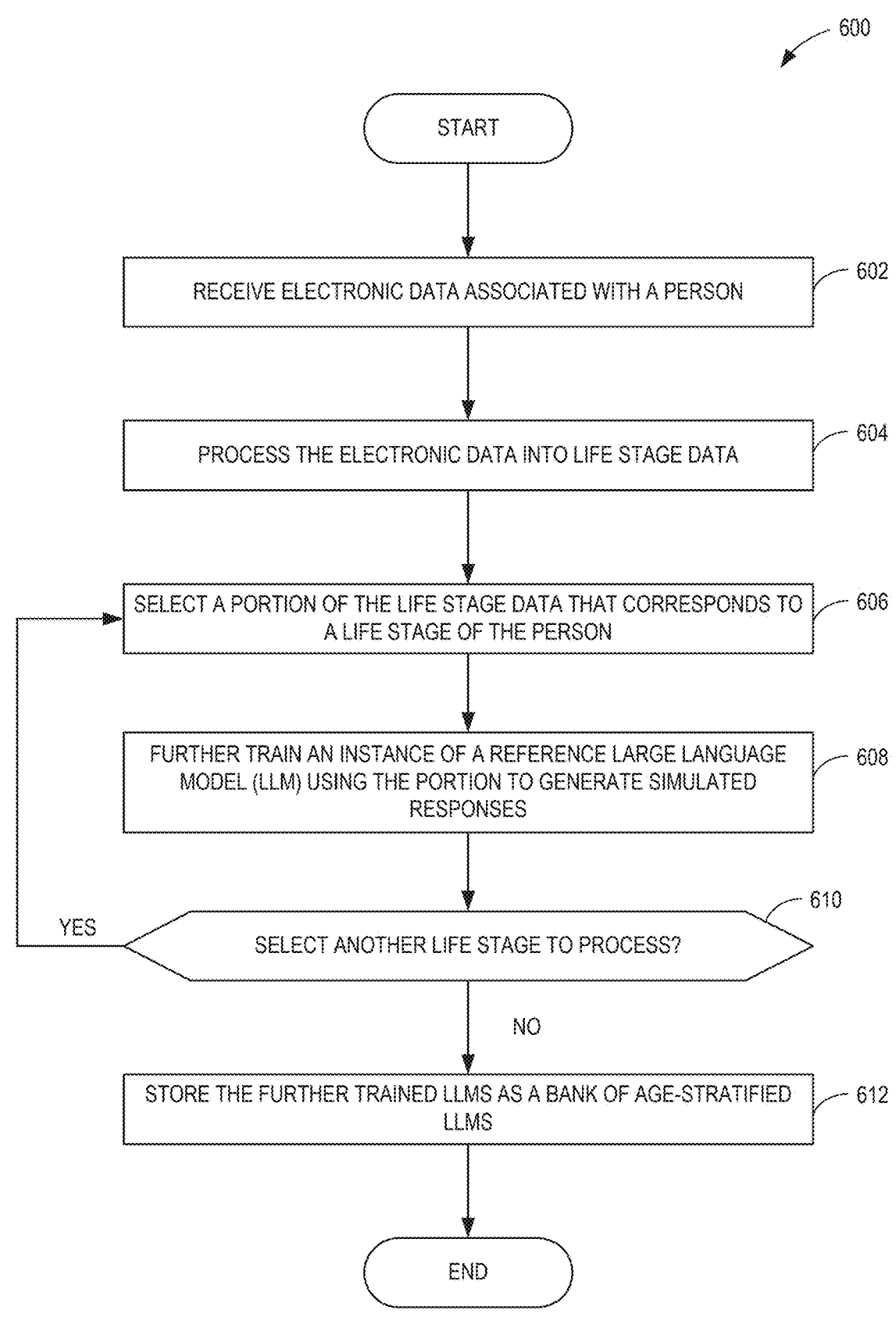

600

START

602 — RECEIVE ELECTRONIC DATA ASSOCIATED WITH A PERSON

604 — PROCESS THE ELECTRONIC DATA INTO LIFE STAGE DATA

606 — SELECT A PORTION OF THE LIFE STAGE DATA THAT CORRESPONDS TO A LIFE STAGE OF THE PERSON

608 — FURTHER TRAIN AN INSTANCE OF A REFERENCE LARGE LANGUAGE MODEL (LLM) USING THE PORTION TO GENERATE SIMULATED RESPONSES

610 — SELECT ANOTHER LIFE STAGE TO PROCESS?

YES

NO

612 — STORE THE FURTHER TRAINED LLMS AS A BANK OF AGE-STRATIFIED LLMS

END

FIG. 6

```python
CopyEdit
import numpy as np
import matplotlib.pyplot as plt
import networkx as nx
import pandas as pd

# Parameters
n_agents = 3
m_subunits = 3
max_iterations = 20
seeds = [0, 1, 2]  # For reproducible trials

# Define graph nodes and edges
nodes = [(i + 1, j + 1) for i in range(n_agents) for j in
range(m_subunits)]

def valid_interagent_edges(n, m):
    edges = []
    for i in range(n):
        for j in range(m):
            for k in range(n):
                if i != k:
                    for l in range(m):
                        if j <= l:
                            edges.append(((i + 1, j + 1), (k + 1, l +
1)))
    return edges def valid_intraagent_edges(n, m):
    edges = []
    for i in range(n):
        for j in range(m):
            for k in range(m):
                if j < k:
                    edges.append(((i + 1, j + 1), (i + 1, k + 1)))
    return edges

# Create graph
G = nx.DiGraph()
G.add_nodes_from(nodes)
G.add_edges_from(valid_interagent_edges(n_agents, m_subunits))
G.add_edges_from(valid_intraagent_edges(n_agents, m_subunits))

# Simulation function with T=0 included
def simulate_deliberation_with_full_trace(G, max_iter, seed):
    node_list = list(G.nodes)
    rng = np.random.default_rng(seed)
    current_state = {node: rng.integers(0, 2) for node in node_list}
    fractions_in_agreement = []
...
```

```
# T=0: Initial agreement
    values = list(current_state.values())
    majority = max(values.count(0), values.count(1))           1100
    fractions_in_agreement.append(majority / len(values))

for _ in range(max_iter):
        new_state = current_state.copy()
        for node in node_list:
            inputs = list(G.predecessors(node))
            if not inputs:
                continue
            input_states = [current_state[n] for n in inputs]
            opposite = 1 - current_state[node]
            if input_states.count(opposite) / len(input_states) >= 2 / 3:
                new_state[node] = opposite values = list(new_state.values())
        majority = max(values.count(0), values.count(1))
        fractions_in_agreement.append(majority / len(values))

if new_state == current_state:
            break
        current_state = new_state return fractions_in_agreement

Run simulations
results_with_T0 = pd.DataFrame()
for i, seed in enumerate(seeds):
    fractions = simulate_deliberation_with_full_trace(G, max_iterations,
seed=seed)
    results_with_T0[f'Trial {i+1}'] = pd.Series(fractions)

# Plot
plt.figure(figsize=(10, 6))
for col in results_with_T0.columns:
    y_values = results_with_T0[col]
    plt.plot(results_with_T0.index, y_values, label=col, marker='o',
linestyle='-')
    for x, y in enumerate(y_values):
        plt.text(x, y + 0.02, f"{y:.2f}", ha='center', va='bottom', fontsize=9)

plt.xlabel("Time Step (T)")
plt.ylabel("Fraction of Nodes in Agreement")
plt.title("Corrected ASAI Deliberation Plot Including T = 0")
plt.xticks(ticks=range(results_with_T0.shape[0]))
plt.ylim(0, 1.05)
plt.grid(True)
plt.legend()
plt.tight_layout()
plt.show()
```

SYSTEMS AND METHODS FOR GENERATING DELIBERATIVE COMMITTEES OF AGE-STRATIFIED LARGE LANGUAGE MODELS

RELATED APPLICATIONS

This application claims priority under 35 U.S.C. § 119 to U.S. Provisional Application No. 63/788,586, entitled "SYSTEM AND METHOD FOR CONTEXT-AWARE, INTER-TEMPORAL AI SIMULATION OF HISTORICAL FIGURES," filed on Apr. 14, 2025, and U.S. Provisional Application No. 63/788,599, entitled "GOVERNANCE FRAMEWORK FOR ETHICAL SOCIO-POLITICAL DECISION MAKING," filed on Apr. 14, 2025, each of which is herein incorporated by reference in their entireties.

FIELD

The techniques described herein relate generally to artificial intelligence (AI) and, more particularly, to systems, apparatus, articles of manufacture, and methods for generating deliberative committees of age-stratified large language models.

BACKGROUND

A generative machine learning model can be trained to generate content in response to an input. An example generative machine learning model is a large language model (LLM). An LLM is a trained deep-learning model that can respond to an input prompt using natural language text. The input prompt can be a question posed by a user and the LLM can generate a response to the question using natural language text.

SUMMARY

In accordance with the disclosed subject matter, systems, apparatus, articles of manufacture, and methods are provided for generating banks of age-stratified large language models.

Some embodiments relate to a first method for generating a first bank of age-stratified large language models (LLMs) to simulate responses to prompts that would be provided by a first person in different life stages of their life. The method comprising, using at least one computer hardware processor to perform, receiving, from at least one first datastore and via at least one communication network, first electronic data associated with the first person, processing the first electronic data to generate first life stage data comprising first multiple data portions corresponding to the different life stages of the first person, and generating the first bank of age-stratified LLMs by using the first multiple data portions to further train a reference LLM. The generating comprising generating, for each particular data portion of the first multiple data portions corresponding to a particular life stage of the first person, a respective age-stratified LLM by further training, using the particular data portion, an instance of the reference LLM to generate simulated responses to questions that the first person would have provided in their particular life stage. The method further comprises storing the first bank of age-stratified trained LLMs.

Some embodiments relate to a second method for generating a dialogue between at least a first age-stratified large language model (LLM) and a second age-stratified LLM, the first age-stratified LLM trained to generate simulated responses to questions that a first person would have provided in a first life stage of their life, the second age-stratified LLM trained to generate simulated responses to questions that a second person would have provided in a second life stage of their life. The method comprises, using at least one computer hardware processor to perform, receiving, from an electronic device and via at least one communication network, a prompt comprising a question, executing, using the prompt, the first age-stratified LLM to generate a first simulated response to the question that the first person would have provided in the first life stage, executing, using at least one of the prompt or the first simulated response, the second age-stratified LLM to generate a second simulated response to at least one of the question or the first simulated response that the second person would have provided in the second life stage, and generating, using at least one of the first simulated response or the second simulated response, an output representing a third simulated response to the question that the first person and the second person would have collectively determined to provide in their particular life stages and for output to the electronic device via the at least one communication network.

Some embodiments relate to an apparatus comprising at least one memory storing processor executable instructions, and at least one hardware processor configured to execute the processor executable instructions to perform any of the aforementioned methods.

Some embodiments relate to at least one computer readable storage medium storing processor executable instructions that, when executed by at least one hardware processor, cause the at least one hardware processor to perform any of the aforementioned methods.

Some embodiments relate to a system comprising at least one hardware processor, and at least one computer-readable storage medium storing processor executable instructions that, when executed by the at least one hardware processor, cause the at least one hardware processor to perform any of the aforementioned methods.

The foregoing summary is not intended to be limiting. Moreover, various aspects of the present disclosure may be implemented alone or in combination with other aspects.

BRIEF DESCRIPTION OF FIGURES

Various aspects and embodiments of the present technology will be described with reference to the following figures. It should be appreciated that the figures are not necessarily drawn to scale. Items appearing in multiple figures are indicated by the same or a similar reference number in all the figures in which they appear.

FIG. 6 is a flowchart representative of an example process that may be performed and/or example machine-readable instructions that may be executed by processor circuitry to implement the system of FIG. 1A, or portion(s) thereof, to generate the ASAI models of FIG. 1A, in accordance with some embodiments of the technology described herein.

FIG. 11A shows a first portion of example source code that may be executed by processor circuitry to execute the simulations of FIG. 10, in accordance with some embodiments of the technology described herein.

FIG. 11B shows a second portion of the source code shown in FIG. 11A that may be executed by processor circuitry to execute the simulations of FIG. 10, in accordance with some embodiments of the technology described herein.

DETAILED DESCRIPTION

Figure 1A:
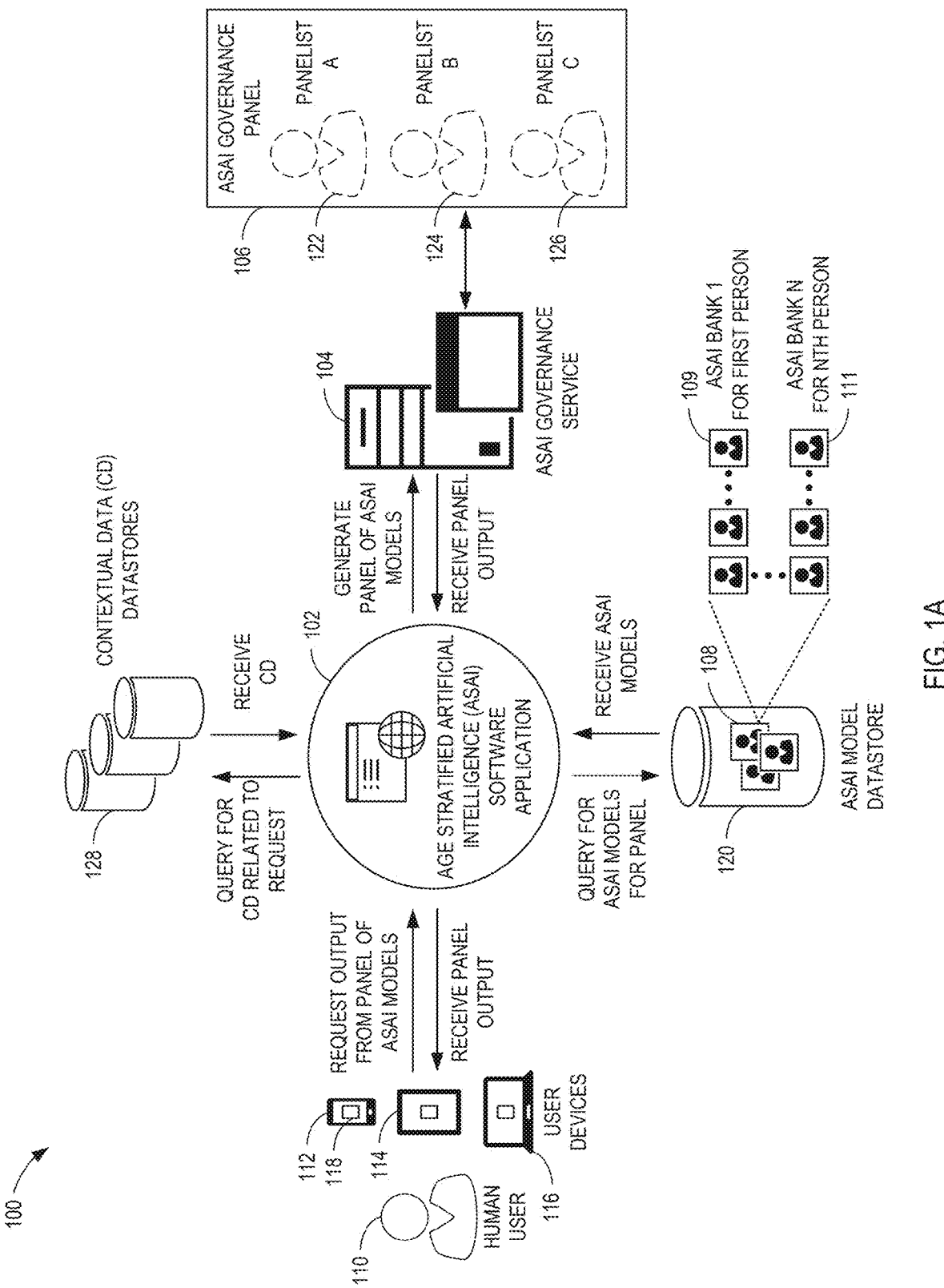
FIG. 1A shows an example system including age-stratified artificial intelligence (ASAI) software and an ASAI governance service configured to generate a panel of ASAI models to deliberate about a topic prompted by a user, in accordance with some embodiments of the technology described herein.

The present disclosure generally provides techniques for generating deliberative committees of age-stratified large language models (LLMs) and/or, more generally, age-stratified artificial intelligence and/or machine learning (AI/ML) models. An example use case involves providing a technological infrastructure for executing an age-stratified LLM, which can correspond to a first person in a first life stage of their life, to simulate responses to prompts that would have been provided by the first person in the first life stage. Another example use case involves the technological infrastructure executing multiple age-stratified LLMs corresponding to different persons in particular life stages of the persons' lives to simulate a dialogue about a question that the different persons would have had in their particular life stages about the question.

Artificial intelligence (AI) systems are increasingly deployed in high-stakes domains such as global security, healthcare, finance, and public policy. However, current AI systems typically operate as opaque "black boxes," providing recommendations or decisions without transparent reasoning, traceable deliberation, or mechanisms for accountability. This lack of transparency undermines public trust, complicates regulatory compliance, and elevates the risk of harmful or unintended outcomes.

The techniques disclosed herein involve an example governance framework and computational architecture for AI systems that ensures transparent, traceable, and audit-ready decision-making. The example governance framework introduces structured, context-sensitive deliberative committees composed of cognitively and ethically differentiated agents. These committees produce decision rationales that are not only explainable but also evaluatuable against normative constraints. The architecture can include at least two enabling layers: (1) a provenance layer that records the full operational history of information flow and inference, and (2) a constitutional layer that enforces deliberative norms and provides entry points for human oversight at defined decision junctures. The result is an example system disclosed herein that enhances explainability, mitigates algorithmic bias, and supports oversight without micromanagement.

The techniques involve generating a bank of age-stratified LLMs to simulate responses to prompts that would be provided by a person in different life stages of their life by further training instances of a reference LLM using electronic data from their different life stages. Each age-stratified LLM can correspond to the person in a different, particular life stage of their life and be generated to simulate responses to questions that the person would have given in the particular life stage. Beneficially, the techniques disclosed herein can be used to generate age-stratified LLMs that can generate simulated responses to prompts in accordance with decision-making traits and/or cognitive abilities of real individuals across distinct life stages and/or historical periods.

LLMs are a type of AI/ML model trained to conduct a probability distribution over words. AI/ML may refer to artificial intelligence (AI), machine learning (ML) and/or AI/ML. Some LLMs are trained to generate an output including natural language text by predicting the next most appropriate word to fill in a blank space in a sentence, phrase, paragraph, etc. LLMs are used in a variety of natural language generation tasks, such as content generation, question answering, and text summarization.

Conventional, general purpose pre-trained LLMs are trained on a substantially large corpus of generalized data. Examples of such pre-trained LLMs include ChatGPT from OpenAI, Gemini from Google, and LLAMA® from Meta Platforms. Such pre-trained LLMs are trained in this way because they have a substantially large number of parameters (e.g., hundreds of billions of parameters), which need to be estimated from a substantially large dataset (e.g., tens of terabytes (TB) of raw data, hundreds of billions of gigabytes (GB) of cleaned and filtered text data). However, the inventor has recognized that there is not enough training data (raw or cleaned/filtered) to train a tailored LLM for each possible use case. Thus, conventional, general purpose pre-trained models are trained using a substantial amount of data and do not perform well on tailored use cases.

To further explore how pre-trained LLMs do not perform well on tailored use cases, assume a particular use case involving prompting a pre-trained LLM to respond to a question like a person from a particular time period in history would have responded to the question. For example, the pre-trained LLM can be prompted to "respond as someone in the year 1800." However, the inventor recognized a technological challenge with such pre-trained LLMs performing this type of task because the pre-trained LLM is trained on data from across all time periods and has no built-in mechanism to filter or suppress this broader knowledge base. By being trained on data from across all time periods and no filtering/suppression mechanism, the pre-trained LLM's responses to prompts rooted in specific historical contexts can be anachronistically influenced, such as generating responses in a way that is out of the specific historical contexts being requested. For example, in response to the prompt "respond as someone in the year 1800," the pre-trained LLM may unintentionally incorporate knowledge, language patterns, or ethical framings that reflect later time periods (than the time period requested) such that the response to the prompt would not be in the style or manner as someone in the year 1800-because the pre-trained LLM model has no built-in mechanism to filter or suppress its broader knowledge base.

The inventor has also recognized that conventional LLM systems are unfit for performing another example tailored use case of enabling users to orchestrate interactions between multiple, general-purpose pre-trained LLM instances. In such a tailored use case, a user may prompt these LLM instances to simulate engagement in a dialogue on a specific topic, simulate having distinct roles, and/or simulate having particular viewpoints. However, the inventor has recognized that when such pre-trained LLMs are applied to precise tasks—especially those involving historical reasoning, ethical deliberation, and/or constrained context—these multi-LLM systems face two technological challenges.

First, pre-trained LLMs are not trained using tailored historical or cognitive context such that they can generate simulated responses using information from only a particular time period and/or from a viewpoint of a particular person in the particular time period. While a user may prompt a pre-trained LLM to respond to the prompt using information from a specific period in history (e.g., 18th-century political thought), the pre-trained LLM's outputs are often influenced by its broad, undifferentiated training corpus. This leads to subtle anachronisms or distorted reasoning because the pre-trained LLM cannot reliably isolate temporal context in its internal representations and thereby results in the pre-trained LLM generating inaccurate responses to prompts. Accordingly, a first pre-trained LLM can generate an inaccurate response to a prompt that is tainted by anachronisms and/or distorted reasoning, provide the inaccurate response to a second pre-trained LLM, and cause the second pre-trained LLM to generate a further response to the prompt that is adversely affected by the inaccurate response from the first pre-trained LLM.

Second, the pre-trained LLMs are not restricted in how they exchange information. For example, if a first pre-trained LLM generates inaccurate, misleading, and/or anachronistic content, and passes it to a second pre-trained LLM, the second pre-trained LLM may treat it as valid input. This can derail the reasoning process, leading to compounding errors, response incoherence, or even self-reinforcing loops.

The inventor has developed technology that overcomes these technological challenges by age-stratifying training data for a particular person and fine-tuning separate Specialized AI models (SAIs) (e.g., fine-tuned LLMs) using the age-stratified training data to generate a bank of SAIs to simulate responses to prompts by the person in accordance with the different cognitive or historical life stages of the particular person. Beneficially, this ensures that each model generates simulated responses constrained to the worldview, information access, and reasoning style available to the particular person at a specific point in their life.

More particularly, the technology involves receiving electronic data associated with a particular person. The electronic data can be processed to generate first life stage data by stratifying the electronic data by a life stage of the person into multiple data portions corresponding to the different life stages of the person. The technology involves generating a first bank of age-stratified LLMs to simulate responses to prompts that would be provided by the person in the different life stages of their life. The first bank of age-stratified LLMs can be generated by using the multiple data portions to further train a reference LLM. For example, for each particular data portion of the multiple data portions corresponding to a particular life stage of the person, a respective age-stratified LLM can be generated by further training, using the particular data portion, an instance of the reference LLM to generate simulated responses to questions that the person would have provided in their particular life stage.

By way of example, the person can be a former president of the United States of America (USA). The technology developed by the inventor involves processing electronic data/information associated with the president into multiple data portions corresponding to different ages and/or different life stages of the president. Examples of a life stage include a youth life stage, a mature life stage, and an elder life stage.

Furthering the example, a first age-stratified LLM corresponding to the president can be generated to simulate responses to questions that the president would have provided in the youth life stage by further training a first instance of a reference LLM using electronic data associated with the president in the youth life stage. A second age-stratified LLM corresponding to the president can be generated to simulate responses to questions that the president would have provided in the mature life stage by further training a second instance of the reference LLM using electronic data associated with the president in the mature life stage. A third age-stratified LLM corresponding to the president can be generated to simulate responses to questions that the president would have provided in the elder life stage by further training a third instance of the reference LLM using electronic data associated with the president in the elder life stage.

The technology developed by the inventor further involves a technique of generating deliberative committees of age-stratified LLMs. The technique involves generating a dialogue between at least a first age-stratified LLM corresponding to a first person in a first life stage of the first person's life and a second age-stratified LLM corresponding to a second person in a second life stage of the second person's life. A prompt comprising a question can be received from an electronic device and via at least one communication network. The first age-stratified LLM can be executed, using the prompt, to generate a first simulated response to the question that the first person would have provided in the first life stage. The second age-stratified LLM can be executed, using the prompt and/or the first simulated response, to generate a second simulated response to the question and/or the first simulated response that the second person would have provided in the second life stage. The dialogue amongst the age-stratified LLMs can result in generating, using the first simulated response and/or the second simulated response, a third simulated response to the question that the first person and the second person would have collectively determined to provide in their particular life stages and for output to the electronic device via the at least one communication network.

The technology developed by the inventor overcomes the technological challenge of conventional, general purpose pre-trained LLMs being unfit for tailored use cases, such as generating an age-stratified LLM to simulate responses to questions that a person would have provided in a particular life stage of the person's life. Unlike pre-trained LLMs that have hundreds of billions of parameters or several trillion parameters, the technology developed by the inventor can generate banks of age-stratified LLMs using fewer hardware computational resources (e.g., hardware processor, memory, storage, and hardware acceleration resources) and in less training time by adjusting a substantially fewer number of parameters than the number of parameters that is adjusted during the initial training of the pre-trained LLM.

By way of example, to generate a bank of age-stratified LLMs to generate simulate responses to questions that former U.S. President John F. Kennedy would have provided in a particular life stage of his life, the technology involves further training a pre-trained LLM using electronic data from his presidential library to fine-tune a subset of the pre-trained LLM's parameters. The subset can include a number of parameters in a range of 10 to 67 billion parameters, which is substantially less than the hundreds of billions or several trillion parameters of the pre-trained LLM. Additionally, further retraining of a substantially smaller subset of the pre-trained LLM's parameters instead of training a new LLM from an initial state (e.g., from scratch) consumes substantially fewer hardware computational resources and reduces the training time to generate an age-stratified LLM. Beneficially, due at least in part to the reduction in training time, the technology developed by the inventor can generate banks of age-stratified LLMs in relatively quick succession or iteration with respect to training conventional, general purpose LLMs.

The technology developed by the inventor also overcomes the technological challenge of pre-trained LLMs being unfit to generate simulated responses using information from only a particular time period and/or from a viewpoint of a particular person in the particular time period. The technology developed by the inventor solves this technological challenge by generating a bank of age-stratified LLMs using age-stratified life stage data across different life stages of a person, such that each age-stratified LLM in the bank corresponds to a different life stage of the person. Each age-stratified LLM can be generated by age-stratifying training data into a particular life stage of the person and further training an instance of a reference LLM using the age-stratified training data corresponding to the particular life stage of the person. The resulting age-stratified LLM generates simulate responses to questions that the person would have provided in the particular life stage of the person. Beneficially, this ensures that each age-stratified LLM only has access to data appropriate to that particular life stage, thereby producing outputs that are more accurate and grounded in the correct historical and developmental context of the person in that particular life stage of the person's life with respect to outputs from conventional, general purpose pre-trained LLMs.

Additionally, the technology developed by the inventor overcomes the technological challenge of pre-trained LLMs not being restricted in how they exchange information. The technology developed by the inventor solves this technological problem by regulating the flow of information between age-stratified LLMs, particularly by limiting what "younger" age-stratified LLMs can transmit to "older" or "maturer" age-stratified LLMs. For example, a "younger" age-stratified LLM can correspond to a person in a youth life stage and its output can be restricted from flowing to a "maturer" age-stratified LLM, which can correspond to the person (or a different person) in a mature life stage or an elder life stage. This "sandboxing" approach to communication between age-stratified LLMs restricts what information can be shared by "younger" age-stratified LLMs to ensure that age-stratified LLMs simulating "older" life stages do not generate simulated responses that are contaminated in response to ingesting simulated responses from the "younger" LLMs that represent less developed reasoning. Beneficially, this ensures that the simulated responses of the age-stratified LLMs maintain a higher degree of accuracy when executing in a system involving multiple age-stratified LLMs with respect to a system that executes multiple instances of conventional, general purpose pre-trained LLMs.

Accordingly, some embodiments provide for a method (e.g., the flowchart 600 of FIG. 6) for generating a first bank of age-stratified large language models (LLMs) (e.g., the first bank of ASAI models 109 of FIG. 1A) to simulate responses to prompts (e.g., the prompt 408 of FIG. 4) that would be provided by a first person in different life stages of their life. The method comprises, using at least one computer hardware processor (e.g., the processor circuitry 802 of FIG. 8) to perform receiving, from at least one first datastore (e.g., at least one of the datastores 144 of FIG. 1B) and via at least one communication network, first electronic data (e.g., the retrieved data shown in FIG. 1B, the raw data shown in FIG. 2) associated with the first person, processing the first electronic data to generate first life stage data (e.g., the natural language processing (NLP) data shown in FIG. 2) comprising first multiple data portions corresponding to the different life stages of the first person, generating the first bank of age-stratified LLMs by using the first multiple data portions to further train a reference LLM (e.g., one of the reference LLMs 147 of FIG. 1B), the generating comprising generating, for each particular data portion of the first multiple data portions corresponding to a particular life stage of the first person, a respective age-stratified LLM (e.g., one(s) of the ASAI models 108 of FIG. 1A, the first ASAI model 150 of FIG. 1B, the second ASAI model 152 of FIG. 1B, the third ASAI model 154 of FIG. 1B) by further training, using the particular data portion, an instance of the reference LLM to generate simulated responses to questions that the first person would have provided in their particular life stage, and storing the first bank of age-stratified trained LLMs.

Figure 1B:
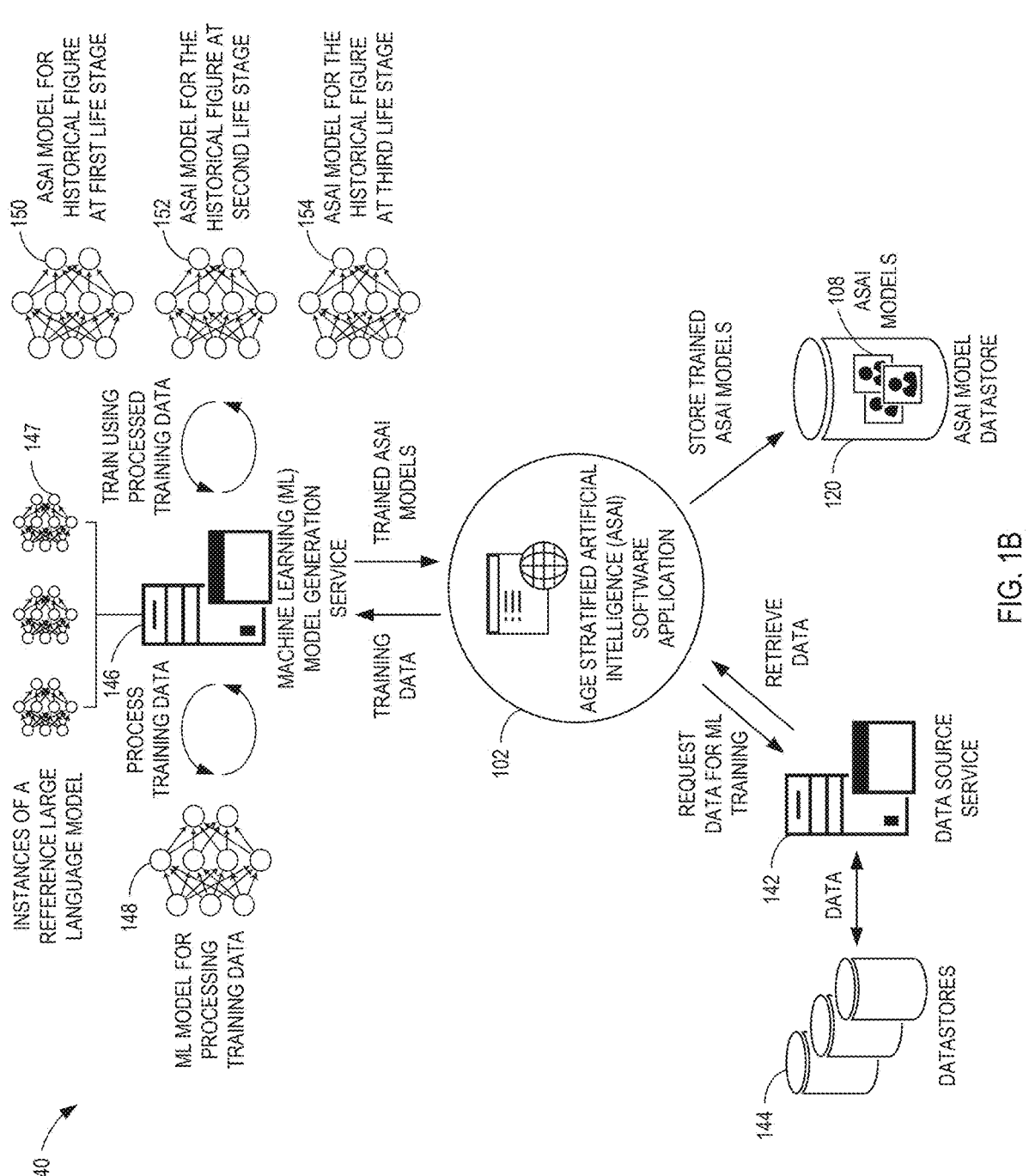
FIG. 1B shows an example system configured to generate the ASAI models of FIG. 1A, in accordance with some embodiments of the technology described herein.

In some embodiments, the different life stages of the first person comprise a youth life stage, a mature life stage, and an elder life stage of the first person, and generating the first bank of age-stratified LLMs comprises: generating a first age-stratified LLM (e.g., the first ASAI model 150 of FIG. 1B) of the first bank (e.g., the first bank of ASAI models 109 of FIG. 1A) by further training, using a first data portion of the first multiple data portions corresponding to the youth life stage of the first person, a first instance of the reference LLM (e.g., a first instance of the instances 147 of the reference LLM of FIG. 1B) to generate simulated responses to questions that the first person would have provided in the youth life stage; generating a second age-stratified LLM (e.g., the second ASAI model 152 of FIG. 1B) of the first bank by further training, using a second data portion of the first multiple data portions corresponding to the mature life stage of the first person, a second instance of the reference LLM (e.g., a second instance of the instances 147 of the reference LLM of FIG. 1B) to generate simulated responses to questions that the first person would have provided in the mature life stage; and generating a third age-stratified LLM (e.g., the third ASAI model 154 of FIG. 1B) of the first bank by further training, using a third data portion of the first multiple data portions corresponding to the elder life stage of the first person, a third instance of the reference LLM (e.g., a third instance of the instances 147 of the reference LLM of FIG. 1B) to generate simulated responses to questions that the first person would have provided in the elder life stage.

In some embodiments, generating the first bank of age-stratified LLMs comprises: retrieving the instance of the reference LLM from at least one second datastore (e.g., the ASAI model datastore 120 of FIG. 1B); adjusting, using (i) a first data portion of the first multiple data portions corresponding to a first life stage of the first person and (ii) a first LLM learning rate smaller than a second LLM learning rate used to train the instance of the reference LLM, a first set of LLM parameters of at least one output layer of the instance of the reference LLM to generate a further trained LLM; determining a value of an evaluation parameter indicative of a performance of the further trained LLM by executing the further trained LLM using a performance verification dataset; and outputting the further trained LLM as a first age-stratified LLM (e.g., the first ASAI model 150) of the first bank (e.g., the first bank of ASAI models 109 of FIG. 1A) of age-stratified LLMs in response to determining that the value of the evaluation parameter meets an evaluation parameter threshold.

In some embodiments, the method further comprises: processing second electronic data (e.g., the raw data of FIG. 2, the extracted data of FIG. 2) to generate second life stage data (e.g., the NLP data of FIG. 2) comprising second multiple data portions corresponding to different life stages of a second person; and generating a second bank of age-stratified LLMs (e.g., the second bank of ASAI models 111 of FIG. 1A) by using the second multiple data portions to further train the reference LLM (e.g., one of the instances 147 of the reference LLM of FIG. 1B), the generating comprising: generating, for each particular data portion of the second multiple data portions corresponding to a particular life stage of the second person, a respective age-stratified LLM (e.g., one of the ASAI models of the second bank of ASAI models 111 of FIG. 1A) by further training, using the particular data portion, a further instance of the reference LLM (e.g., a further instance of the reference LLM of FIG. 1B) to generate simulated responses to questions that the second person would have provided in their particular life stage.

In some embodiments, the method further comprises: using a first age-stratified LLM (e.g., the first ASAI model 150) of the first bank of age-stratified LLMs corresponding to a first life stage of the first person and a second age-stratified LLM of a second bank of age-stratified LLMs (e.g., one of the ASAI models of the second bank of ASAI models 111 of FIG. 1A) corresponding to a second life stage of a second person to simulate a dialogue that the first person and the second person would have had in their respective life stages by: executing the first age-stratified LLM to generate a first simulated response to a question comprised in a first prompt that the first person would have provided in the first life stage of the first person; and executing the second age-stratified LLM to generate a second simulated response to at least one of the question or the first simulated response that the second person would have provided in the second life stage of the second person.

In some embodiments, wherein: executing the first age-stratified LLM comprises executing the first age-stratified LLM in a first virtual machine (VM) (e.g., the first virtual resource 410 of FIG. 4) having a first private Internet Protocol (IP) address in a virtual network (e.g., the virtual network 416 of FIG. 4); and executing the second age-stratified LLM comprises executing the second age-stratified LLM in a second VM (e.g., the second virtual resource 412 of FIG. 4) having a second private IP address in the virtual network, and simulating the dialogue comprises: transmitting, from the first VM and using the first and second private IP addresses, a first communication message comprising the first simulated response to the second VM over the virtual network; and transmitting, from the second VM and using the first and second private IP addresses, a second communication message comprising the second simulated response to the first VM over the virtual network.

In some embodiments, wherein: executing the first age-stratified LLM comprises executing the first age-stratified LLM in a first container (e.g., the first virtual resource 410 of FIG. 4) having a first private Internet Protocol (IP) address in a virtual network (e.g., the virtual network 416 of FIG. 4); and executing the second age-stratified LLM comprises executing the second age-stratified LLM in a second container (e.g., the second virtual resource 412 of FIG. 4) having a second private IP address in the virtual network.

In some embodiments, wherein simulating the dialogue comprises: transmitting, from the first container and using the first and second private IP addresses, the first simulated response to the second container over the virtual network; and transmitting, from the second container and using the first and second private IP addresses, the second simulated response to the first container over the virtual network.

In some embodiments, wherein a container pod comprises the first container and the second container, and simulating the dialogue comprises: instantiating a shared volume in the container pod and accessible by the first container and the second container; and wherein: executing the first age-stratified LLM comprises storing the first simulated response in the shared volume; and executing the second age-stratified LLM comprises retrieving the first simulated response from the shared volume and storing the second simulated response in the shared volume.

In some embodiments, wherein a first age-stratified LLM of the first bank of age-stratified LLMs corresponds to a first life stage of the first person, and further comprising: receiving, from an electronic device (e.g., one of the electronic devices 112, 114, 116 of FIG. 1A) associated with a user (e.g., the user 110 of FIG. 1A) and via the at least one communication network, a first prompt (e.g., the prompt 408 of FIG. 4) comprising a question for the first age-stratified LLM to generate a first simulated response that the first person would have provided in the first life stage; retrieving, from at least one second datastore (e.g., the contextual data datastores 128 of FIG. 1A), contextual data (e.g., the contextual data 402 of FIG. 4) associated with the question that the first person would have used to provide the first simulated response; and executing, using the first prompt and the contextual data, the first age-stratified LLM to generate the first simulated response.

In some embodiments, wherein processing the first electronic data comprises: detecting, using a natural language processing model (e.g., the data extraction module 208 of FIG. 2), at least partial calendar dates from the first multiple data portions and each partial calendar date associated with at least one of the first multiple data portions; and executing, using the at least partial calendar dates, a machine learning (ML) model (e.g., the NLP module 210 of FIG. 2) to generate the first life stage data, the ML model trained to classify multiple data portions as pertaining to particular life stages of persons to generate life stage data, and generating the first life stage data comprises: generating, for each particular data portion of the first multiple data portions, a data association between the particular data portion and a particular life stage of the first person by mapping a particular partial calendar date of the particular data portion to the particular life stage; and storing the data associations, the first life stage data comprising the data associations.

Some embodiments provide for a method (e.g., the flowchart 700 of FIG. 7) for generating a dialogue (e.g., the panel deliberation 424 of FIG. 4) between at least a first age-stratified large language model (LLM) (e.g., a first one of the ASAI models 108 of FIG. 1A, a first one of the ASAI models 150, 152, 154 of FIG. 1B) and a second age-stratified LLM (e.g., a second one of the ASAI models 108 of FIG. 1A, a second one of the ASAI models 150, 152, 154 of FIG. 1B), the first age-stratified LLM trained to generate simulated responses to questions that a first person would have provided in a first life stage of their life, the second age-stratified LLM trained to generate simulated responses to questions that a second person would have provided in a second life stage of their life. The method comprises, using at least one computer hardware processor (e.g., the processor circuitry 902 of FIG. 9) to perform, receiving, from an electronic device (e.g., one of the electronic devices 112, 114, 116 of FIG. 1A) and via at least one communication network, a prompt (e.g., the prompt 408 of FIG. 4) comprising a question, executing, using the prompt, the first age-stratified LLM to generate a first simulated response (e.g., the first weighted input 418 of FIG. 4) to the question that the first person would have provided in the first life stage, executing, using at least one of the prompt or the first simulated response, the second age-stratified LLM to generate a second simulated response (e.g., the second weighted input 420 of FIG. 4) to at least one of the question or the first simulated response that the second person would have provided in the second life stage, and generating, using at least one of the first simulated response or the second simulated response, an output (e.g., the panel output 426 of FIG. 4) representing a third simulated response to the question that the first person and the second person would have collectively determined to provide in their particular life stages and for output to the electronic device via the at least one communication network.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Turning to the figures, the illustrated example of FIG. 1A shows an example system 100 including age stratified artificial intelligence (ASAI) software 102 and an ASAI governance service 104 configured to generate a panel 106 of ASAI models 108 to deliberate about a prompt provided by a user 110. The prompt can include a topic, one or more questions, and/or one or more questions about the topic. The panel 106 can effectuate a dialogue amongst the ASAI models 108 to generate an output related to the prompt. The output can be a simulated response to the prompt. The simulated response may include a decision and/or a recommendation regarding the prompt.

The user 110 of this example is a human user. Additionally and/or alternatively, the user 110 may be a machine user (e.g., a computer, a server, a service). Examples of a human user include an educator, a researcher, a political advisor, and a government employee.

By way of example, the user 110 may be a government employee assigned to a government agency tasked with energy infrastructure development. The user 110 may be developing a government program and/or policy directed to increasing hydroelectric power capabilities. The user 110 may also want to consider the effects of such development on the agriculture operations in certain geographical areas with such effects including the restriction of water rights to agriculture operators (e.g., farmers, ranchers).

Furthering the above example, the user 110 may request the panel 106 via the ASAI software 102 to deliberate about the topic of whether to develop hydroelectric power in an agriculture region in which farmers and ranchers have extensive property and water usage rights. The user 110 may request the panel 106 to generate an output related to the topic, such as a decision, a recommendation, and/or a suggestion related to whether hydroelectric power should be pursued in agriculture regions and/or to what extent the rights of farmers and ranchers may be acquired or restricted in furtherance of the hydroelectric power development.

The user 110 of this example may transmit data to and/or receive data from the ASAI software 102 using one(s) of electronic devices 112, 114, 116. The transmitted data to the ASAI software 102 is shown to include a request, by the user 110, for an output from the panel 106 of the ASAI models 108. The received data from the ASAI software 102 is shown to include the panel output.

The electronic devices 112, 114, 116 include a first electronic device 112, a second electronic device 114, and a third electronic device 116. The first electronic device 112 is an Internet-enabled cellular phone (e.g., a smartphone). The second electronic device 114 is a tablet computer. The third electronic device 116 is a laptop computer. Additionally and/or alternatively, the user 110 may use a different type of electronic device, such as a television (e.g., a smart television), or wearable device (e.g., headphones, headsets, smartwatches, smart glasses, etc.).

The user 110 may digitally interact with the ASAI software 102 using a software application 118 executed by the electronic devices 112, 114, 116. In some embodiments, the software application 118 can be a lightweight and/or mobile version of the ASAI software 102. In some embodiments, the software application 118 can be a client application that runs on the electronic devices 112, 114, 116 and interacts with the ASAI software 102, which can be implemented at least in part by computer server(s), to access resources and/or services of associated with the ASAI software 102.

In some embodiments, the software application 118 is a web-based application. For example, the web-based application can be implemented at least in part by a graphical user interface (GUI). The GUI can be executed by a browser (e.g., an Internet browser) that enables the user 110 to interact with the ASAI software 102.

The ASAI software 102 can be configured to receive the request for a panel output from the user 110, via the electronic devices 112, 114, 116, and assemble the panel 106 to generate the requested panel output. The ASAI software 102 can return an output generated by the panel 106 to the user 110.

As shown, the ASAI software 102 is a software application. The software application can be a software service implemented by one or more servers (e.g., computer servers) accessible via a network (e.g., a computer-implemented network). For example, the ASAI software 102 can be a service implemented by one or more physical servers and/or virtualizations of the one or more physical servers. In some embodiments, the one or more servers are hosted by a cloud provider (e.g., a public cloud provider, a private cloud provider) and/or an enterprise network.

In some embodiments, the ASAI software 102 selects ones of the ASAI models 108 to be included in the panel 106. As shown, the ASAI software 102 can select one or more ASAI models 108 stored in an ASAI model datastore 120.

In some embodiments, the ASAI models 108 stored in the ASAI model datastore 120 can include a plurality of banks of ASAI models 109, 111 for a plurality of persons. The persons can be historical persons (e.g., historical figures). For example, the ASAI models 108 can include a first bank of ASAI models 109 for a first historical person (identified by "ASAI BANK 1 FOR FIRST PERSON"), a second bank of ASAI models 111 (identified by "ASAI BANK N FOR NTH PERSON") for a second historical person, etc. In such an example, each of the first bank of ASAI models 109 can be an age stratified artificial intelligence and/or machine learning (AI/ML) model trained to generate simulate responses to questions (e.g., questions included in prompts) that the first historical person would have provided in a particular age and/or life stage of the first historical person. Furthering the example, each of the second bank of ASAI models 111 can be an age stratified AI/ML model trained to generate simulated responses to questions that the second historical person would have provided in a particular age and/or life stage of the second historical person.

In some embodiments, the ASAI model datastore 120 can be implemented by any technology for storing data. For example, the ASAI model datastore 120 can be implemented by a volatile memory (e.g., a Synchronous Dynamic Random Access Memory (SDRAM), a Dynamic Random Access Memory (DRAM), a RAMBUS Dynamic Random Access Memory (RDRAM), etc.) and/or a non-volatile memory (e.g., flash memory). The ASAI model datastore 120 may additionally or alternatively be implemented by one or more double data rate (DDR) memories, such as DDR, DDR2, DDR3, DDR4, DDR5, mobile DDR (mDDR), etc. The ASAI model datastore 120 may additionally or alternatively be implemented by one or more mass storage devices such as hard disk drive(s) (HDD(s)), compact disk (CD) drive(s), digital versatile disk (DVD) drive(s), flash storage, solid-state disk (SSD) drive(s), etc.

While in the illustrated example the ASAI model datastore 120 is illustrated as a single datastore, the ASAI model datastore 120 may be implemented by any number and/or type(s) of datastore. Furthermore, the data stored in the ASAI model datastore 120 may be in any data format. Examples of data formats include an artificial intelligence data format (e.g., a machine learning format, a neural network format, etc.), a flat file, binary data, comma delimited data, tab delimited data, and structured query language (SQL) structures.

In some embodiments, the ASAI model datastore 120 may be implemented by a database system, such as one or more databases. The term "database" as used herein means an organized body of related data, regardless of the manner in which the data or the organized body thereof is represented. For example, the organized body of related data may be in the form of one or more of an artificial intelligence file and/or extension, a table, a log, a map, a grid, a packet, a datagram, a frame, a file, an e-mail, a message, a document, a report, a list or in any other form.

As shown, the ASAI software 102 can query the ASAI model datastore 120 for one(s) of the ASAI models 108. Additionally and/or alternatively, the ASAI software 102 may search in the ASAI model datastore 120 for identifications of which ASAI models are stored in the ASAI model datastore 120 and/or data/information associated with the ASAI models 108.

As shown, responsive to the query, the ASAI software 102 can receive one(s) of the ASAI models 108 from the ASAI model datastore 120. In some embodiments, the ASAI software 102 can receive the ASAI models 108 themselves from the ASAI model datastore 120. In some embodiments, the ASAI software 102 can receive identifications of the ASAI models 108 and/or data/information associated with the ASAI models 108 from the ASAI model datastore 120.

In some embodiments, the ASAI software 102 causes the panel 106 to generate an output for the requesting user 110. As shown, the ASAI software 102 instructs the ASAI governance service 104 to form the panel 106 using ASAI models 108 received (e.g., obtained, retrieved) from the ASAI model datastore. As shown, the ASAI governance service 104 forms the panel 106 and provides the panel output to the ASAI software 102. The ASAI software 102 can return the panel output to the requesting user 110 via the electronic devices 112, 114, 116.

In some embodiments, the ASAI governance service 104 is a software service implemented by one or more servers accessible via a network. For example, the ASAI governance service 104 can be a software service implemented by one or more physical servers and/or virtualizations of the one or more physical servers. In some embodiments, the one or more servers are hosted by a cloud provider and/or an enterprise network.

In some embodiments, the one or more servers can host the ASAI software 102 and the ASAI governance service 104. In some embodiments, one or more first servers can host the ASAI software 102 while one or more second servers can host the ASAI governance service 104.

The ASAI governance service 104 can assemble, generate, and/or form the panel 106 to include a plurality of panelists 122, 124, 126 shown as a first panelist 122 (identified by "PANELIST A"), a second panelist 124 (identified by "PANELIST B"), and a third panelist 126 (identified by "PANELIST C"). Alternatively, the panel 106 may include two panelists or more than three panelists.

The panelists 122, 124, 126 are digital panelists representing different persons in different life stages. The digital panelists can be respectively implemented by an age-stratified AI/ML model trained to generate simulated responses to questions that the different persons would have provided in the corresponding life stage of the different persons.

In some embodiments, the system 100 can implement an agentic system. For example, the digital panelists can be digital agents, such as AI/ML enabled agents. By way of example, each of the panelists 122, 124, 126 can be implemented by a respective AI/ML agent. Each of the AI/ML agents can be implemented by a respective one of the ASAI models 108.

Furthering the example, the ASAI governance service 104 can execute and/or instantiate a first ASAI model of a first bank of the ASAI models 108 to implement a first ML-enabled agent (e.g., a first AI/ML-enabled agent), which can generate simulated responses that the first person represented by the first panelist 122 would have provided in a particular life stage of the first person. The ASAI governance service 104 can execute and/or instantiate a second ASAI model of the first bank of the ASAI models 108 to implement a second ML-enabled agent, which can generate simulated responses that the second person represented by the second panelist 124 would have provided in a particular life stage of the second person. The ASAI governance service 104 can execute and/or instantiate a third ASAI model of the first bank of the ASAI models 108 to implement a third ML-enabled agent, which can generate simulated responses that the third person represented by the third panelist 126 would have provided in a particular life stage of the third person.

In some embodiments, the panelists 122, 124, 126 can each correspond to historical person(s). For example, the first panelist 122 can correspond to a first historical person, the second panelist 124 can correspond to the first historical person or a second historical person, and the third panelist 126 can correspond to the first or second historical person or a third historical person.

In some embodiments, ones of the panelists 122, 124, 126 can be historical persons whose existences did not overlap in time. For example, the first panelist 122 can correspond to former U.S. President Abraham Lincoln and the second panelist 124 can correspond to former U.S. President John F. Kennedy, whose lives did not overlap. Alternatively, ones of the panelists 122, 124, 126 may be historical persons whose existences did overlap in time. For example, the first panelist 122 can correspond to former U.S. President George W. Bush and the second panelist 124 can correspond to former U.S. President Barack H. Obama, whose lives did at least partially overlap.

The panelists 122, 124, 126 can each correspond to a person (e.g., a historical person) in a life stage. An example life stage includes a youth life stage, a mature life stage, and an elder life stage. The life stages can be tailored to a particular person. For example, a person who died at age 30 may have a youth life stage of ages 12-17, a mature life stage of ages 18-26, and an elder life stage of 27-30. In another example, a person who died at age 90 may have a youth life stage of 18-29, a mature life stage of 30-60, and an elder life stage of 61-90. The youth life stages can be young life stages or young adult life stages. The mature life stages can be middle life stages or mid-adult life stages.

In some embodiments, the panelists 122, 124, 126 correspond to the same person (e.g., the same historical person) in different life stages. For example, the first panelist 122 can correspond to a person in the youth life stage, the second panelist 124 can correspond to the same person in the mature life stage, and the third panelist 126 can correspond to the same person in the elder life stage.

In some embodiments, the panelists 122, 124, 126 correspond to different persons (e.g., different historical persons) in the same life stage. For example, the first panelist 122 can correspond to a first person in the mature life stage, the second panelist 124 can correspond to a second person in the mature life stage, and the third panelist 126 can correspond to a third person in the mature life stage.

In some embodiments, the panelists 122, 124, 126 correspond to different persons (e.g., different historical persons) in a combination of life stages. For example, the first panelist 122 can correspond to a first person in the youth life stage, the second panelist 124 can correspond to a second person in the mature life stage, and the third panelist 126 can correspond to a third person in the elder life stage. In another example, the first panelist 122 can correspond to a first person in the mature life stage, the second panelist 124 can correspond to a second person in the mature life stage, and the third panelist 126 can correspond to a third person in the elder life stage.

In some embodiments, the banks of ASAI models 108 that implement the panelists 122, 124, 126 can be augmented and/or improved using data and/or information related to a topic. As shown, the data/information for augmentation is contextual data stored in contextual data datastores 128.

In some embodiments, the contextual data includes geopolitical data associated with historical events, persons, and places. Examples of geopolitical data include data related to climate change impacts, international conflicts, political polarization, regional instability, resource competition, technology competition, trade wars and protectionism, and warfare (e.g., cyber warfare, conventional warfare) over time.

In some embodiments, the contextual data includes historical data associated with historical events, persons, and places. Examples of historical data include census data, economic indicators (e.g., gross domestic product, deflation/inflation rates, interest rates, money supply), information found in encyclopedias, government policies, social data (e.g., crime rates, education levels), and cultural data (e.g., books, literary texts, magazines, opinion commentary, newspaper articles) over time.

By way of example, the user 110 may prompt the ASAI software 102 to convene a panel to deliberate about a topic, such as hydroelectric power development in agricultural regions, and/or respond to questions (e.g., respond to questions about the topic). The ASAI software 102 may process the questions, the topic, etc., by using natural language processing (NLP) and/or AI/ML-processing techniques, to identify the questions, the topic, etc. The ASAI software 102 can query the contextual data datastores 128 for information related to the questions, the topic, etc. The ASAI software 102 can receive the information returned from the contextual data datastores 128 and output the received information to the ASAI governance service 104. Such information may be referred to herein as "augmented data," "augmented information," or "augmented ASAI information".

Furthering the example, the ASAI governance service 104 may augment one(s) of the ASAI models 108 implementing the panelists 122, 124, 126 using the augmented information. For example, augmenting an ASAI model with augmented information can be performed by further training the ASAI model using the augmented information to generate an augmented ASAI model. By way of example, the ASAI governance service 104 may further retrain an ASAI model by adjusting parameters of one or more AI/ML model output layers. By way of another example, the ASAI governance service 104 may append one or more AI/ML model output layers to an ASAI model. The one or more AI/ML model output layers can include a plurality of AI/ML parameters (e.g., AI/ML weights) generated using and/or corresponding to the augmented information. In some such examples, the ASAI models 108 augmented with the AI/ML model output layer(s) can simulate a dialogue about the questions, the topic, etc., using the contextual data without altering the underlying training architecture (e.g., AI/ML model layers, parameters (e.g., weights), inter-layer connections) of the ASAI models 108.

In some embodiments, the system 100 is implemented at least in part by one or more networks (e.g., computer-implemented networks) (not shown). For example, the ASAI software 102 can communicate with the electronic devices 112, 114, 116, the ASAI model datastore 120, the contextual data datastores 128, and/or the ASAI governance service 104 via at least one network.

The network(s) may be implemented by any wired and/or wireless network(s) such as one or more cellular networks (e.g., 4G LTE cellular networks, 5G cellular networks, future generation 6G cellular networks, etc.), one or more data buses, one or more local area networks (LANs), one or more optical fiber networks, one or more private networks, one or more public networks, one or more satellite networks, one or more wireless local area networks (WLANs), one or more virtual networks (e.g., software-defined network(s)), etc., and/or any combination(s) thereof. For example, the system 100 can be implemented at least in part by the Internet.

FIG. 1B shows an example system 140 configured to generate the ASAI models 108 of FIG. 1A. In some embodiments, system 140 implements a portion of the system 100 of FIG. 1A. For example, the system 140 shown in FIG. 1B includes the ASAI software 102 and the ASAI model datastore 120 of FIG. 1A.

In some embodiments, the ASAI software 102 obtains data for training ML models (e.g., AI/ML models) to generate the ASAI models 108. The ML models can be pre-trained ML models (e.g., pre-trained AI/ML models). The pre-trained ML models can be pre-trained large language models (LLMs). The ASAI models 108 can be ML models, such as LLMs.

As shown, the ASAI software 102 can request data for ML training from a data source service 142. The data source service 142 can represent and/or correspond to one or more entities that curate, host, and/or manage data and/or information. Examples of an entity include encyclopedias, forums, guides, networks, portals, webpages, websites, and a government and/or regulatory database. Examples of a government and/or regulatory database include a database curated by a USA presidential library, the USA Library of Congress, and the Smithsonian.

By way of example, a first one of the datastores 144 can store data/information hosted by a news media organization. In another example, a second of the datastores 144 can store data/information hosted by an Internet-based encyclopedia. In yet another example, a third one of the datastores 144 can store data/information curated by a USA presidential library.

In some embodiments, the data source service 142 is a software service that can be implemented by one or more physical servers and/or virtualizations of the one or more physical servers. In some embodiments, the one or more servers are hosted by a cloud provider and/or an enterprise network.

The software service that implements the data source service 142 can include one or more interfaces (not shown) and one or more datastores 144. The interfaces can include application programming interfaces (APIs), graphical user interfaces (GUIs), and landing pages (e.g., landing webpages). For example, the ASAI software 102 may obtain and/or retrieve data/information from one(s) of the datastores 144 of the data source service 142 via an API. In some embodiments, the ASAI software 102 can inspect and/or extract data of interest from a landing page (or any other page) of the data source service 142.

As shown, the ASAI software 102 can issue a request to the data source service 142 for data for ML training and retrieve data responsive to the request. The retrieved data may be retrieved from one or more of the databases 144 by the data source service 142. The ASAI software 102 can process the retrieved data into training data (e.g., LLM training data). For example, the ASAI software 102 can process, using NLP and/or AI/ML techniques, the retrieved data into training data having a format and/or organization suitable for training an LLM model.

As shown, the ASAI software 102 can output the training data to a machine learning (ML) model generation service 146 to cause the ML model generation service 146 to train ML models, such as pre-trained LLMs, into the ASAI models 108, which can each be an age-stratified LLM.

Example training of an ML model is supervised training, which can include instantiating the ML model, providing the ML model with sample data (e.g., the training data) that may have labels (e.g., metadata, data tags) to describe the sample data, and comparing output(s) of the ML model with the labels to evaluate accuracy of the ML model based on the comparison(s). For example, the ML model generation service 146 can train ML models, such as pre-trained LLMs, into the ASAI models 108 using supervised training. In such an example, the ML model generation service 146 can train the pre-trained LLMs by using stochastic gradient descent. Additionally and/or alternatively, the ML model generation service 146 may train the pre-trained LLMs by applying an unsupervised learning algorithm and/or a semi-supervised learning algorithm to the training data.

In some embodiments, the ML model generation service 146 is a software service implemented by one or more physical servers and/or virtualizations of the one or more physical servers. In some embodiments, the one or more servers are hosted by a cloud provider and/or an enterprise network.

In some embodiments, one or more of the ASAI models 108 are discriminative ML models. Examples of discriminative ML models include clustering models, decision trees, logistic regression models, neural networks, random forests, and support vector machines.

In some embodiments, one or more of the ASAI models 108 are generative ML models. Examples of generative ML models include generative pre-trained transformers (GPT), bidirectional encoder representations from transformers (BERT), any one(s) of a family of LLMs known as Large Language Model Meta AI (LLaMA), robustly optimized BERT pretraining approach (RoBERTa) models, and pathways language models (PaLMs). For example, one or more of the ASAI models 108 can be age-stratified LLMs.

In some embodiments, the ML model generation service 146 processes, using an ML model 148, the training data from the ASAI software 102 into a suitable format for LLM training. For example, the ML model 148 can adjust, change, manipulate, and/or convert the training data received from the ASAI software 102 into processed training data for further training a pre-trained LLM. In such an example, the ML model 148 can autonomously assign labels to the training data, assign timestamps (e.g., calendar dates) and/or life stages (e.g., youth, mature, elder life stage) to the training data, etc.

In some embodiments, the ML model generation service 146 further trains instances of a reference LLM (e.g., reference LLM instances 147) into the ASAI models 108 using age-stratified training data. The reference LLM can be a pre-trained LLM. In some embodiments, the age-stratified training data can be the training data from the ASAI software 102. In some embodiments, the age-stratified training data can be the processed training data output from the ML model 148.

As shown, the instances 147 include a first instance of the pre-trained LLM, a second instance of the same pre-trained LLM, and a third instance of the same pre-trained LLM. In some embodiments, the ML model generation service 146 can retrieve the pre-trained LLM from a datastore (not shown) and generate copies/instances of the retrieved pre-trained LLM. In some embodiments, the ML model generation service 146 can retrieve the pre-trained LLM from the ASAI model datastore 120 (e.g., via the ASAI software 102 or directly from the ASAI model datastore 120), such that the ASAI model datastore 120 can store different types of pre-trained LLMs for ASAI model generation and/or instances of the different types of pre-trained LLMs.

In some embodiments, the ML model generation service 146 can further train the instances of the pre-trained LLM to have distinct, ethical frameworks. For example, the ML model generation service 146 can use PhilPapers/ PhilArchive, Stanford Encyclopedia of Philosophy, the Moral Machine Dataset, and/or datasets from the Allen Institute for AI (AI2).

In some embodiments, the ML model generation service 146 can further train the instances of the pre-trained LLM to generate responses to questions and such responses can simulate committee behavior and conducting policy discussions. For example, the ML model generation service 146 can further train the instances of the pre-trained LLM using (i) data retrieved from the Congressional Record API, which can include Congressional voting data and policy deliberation, (ii) the OECD Library and/or the World Bank Open Data for global governance, ethics, and law data, (iii) the UNESCO/UNDP/PeaceTech Lab for peacebuilding, conflict resolution, and ethical data pipelines, (iv) the Council on Foreign Relations (CFR) for historical foreign policy analysis, (v) the RAND Corporation for ethics in defense, decision simulations, and AI risk modeling, and/or (vi) the Harvard Caselaw Access Project for full-text U.S. court decisions.

In some embodiments, the ML model generation service 146 can further train the instances of the pre-trained LLM to generate, in response to questions, responses that simulate decision behavior, cognitive diversity, and cultural memory. For example, the ML model generation service 146 can further train the instances of the pre-trained LLM using (i) ICPSR (Inter-university Consortium for Political and Social Research) for behavioral and longitudinal datasets, (ii) the Pew Research Center for value-based polling, demographic attitudes, and trust in institutions, (iii) Humanitarian Data Exchange (HDX) for real-world conflict, migration, and diplomacy data, (iv) the GDELT Project for Real-time and historical global event and sentiment database, and/or (v) Ethnologue/WALS (World Atlas of Language Structures) for cultural and linguistic variation in cognition.

As shown, the ML model generation service 146 can generate a first ASAI model 150. The first ASAI model 150 is for a person (shown as a historical figure) at a first life stage of the person. For example, the ML model generation service 146 can further train an instance of a reference LLM (e.g., a pre-trained LLM), using first age-stratified training data associated with the first life stage of the person, to generate the first ASAI model 150. The first ASAI model 150 can generate simulated response to questions that the person would have provided in the first life stage of the person's life.

As shown, the ML model generation service 146 can generate a second ASAI model 152. The second ASAI model 152 is for the same person (shown as the same historical figure) at a second life stage of the person. For example, the ML model generation service 146 can further train another instance of the reference LLM, using second age-stratified training data associated with the second life stage of the person, to generate the second ASAI model 152. The second ASAI model 152 can generate simulated response to questions that the person would have provided in the second life stage of the person's life.

As shown, the ML model generation service 146 can generate a third ASAI model 154. The third ASAI model 154 is for the same person (shown as the same historical figure) at a third life stage of the person. For example, the ML model generation service 146 can further train yet another instance of the reference LLM, using third age-stratified training data associated with the third life stage of the person, to generate the third ASAI model 154. The third ASAI model 154 can generate simulated response to questions that the person would have provided in the third life stage of the person's life.

Although only ASAI models 150, 152, 154 for three life stages for a person are shown, the ML model generation service 146 may generate ASAI models for one, two, or more than four life stages of the person.

The first ASAI model 150, the second ASAI model 152, and the third ASAI model 154 of this example are generative ML models. The generative ML models can be GPT models. The GPT models can be LLMs. For example, the first ASAI model 150, the second ASAI model 152, and the third ASAI model 154 can each be an age-stratified LLM. Alternatively, one or more of the ASAI models 150, 152, 154 may be discriminative ML models.

The ASAI models 150, 152, 154 of this example are a bank of age-stratified LLMs corresponding to a person. The bank of age-stratified LLMs can simulate responses to prompts that would be provided by the person in different life stages of the their life.

The ML model generation service 146 can generate the ASAI models 150, 152, 154 to generate simulated responses to questions that a person would have provided in a particular life stage of the person's life. By way of example, the person can be a historical person, such as a former United States president. In such an example, the first ASAI model 150 can be generated to simulate responses to prompts, which can include question(s), that would be provided by the president in a youth life stage, such as when the president was ages 18-29. The second ASAI model 152 can be generated to simulate responses to prompts that would be provided by the president in a mature life stage after the youth life stage, such as when the president was ages 30-50. The third ASAI model 154 can be generated to simulate responses to prompts that would be provided by the president in an elder life stage after the youth and mature life stages, such as when the president was ages 51-75.

Furthering the above example, the age-stratified training data used by the ML model generation service 146 to generate the ASAI models 150, 152, 154 can be electronic data associated with the president in the different life stages. For example, the ML model generation service 146 can further train an instance of a reference LLM using first data portion(s) of the electronic data corresponding to the youth life stage of the president to generate the first ASAI model 150. The ML model generation service 146 can further train another instance of the reference LLM using second data portion(s) of the electronic data corresponding to the mature life stage of the president to generate the second ASAI model 152. The ML model generation service 146 can further train yet another instance of the reference LLM using third data portion(s) of the electronic data corresponding to the elder life stage of the president to generate the third ASAI model 154.

Examples of the electronic data include audio, image, video, and/or text data associated with the president in the different life stages. In some embodiments, the electronic data can be obtained from a plurality of presidential data sources including the presidential library for the president and the Library of Congress.

Examples of audio data include audio recorded debates, speeches, and interviews involving the president and commentary made by others about the president.

Examples of image data include images of printed speeches and writings by the president (e.g., notes, letters).

Examples of video data include video recorded debates, speeches, and interviews involving the president and videos made by others characterizing the decision making about the president.

Examples of text data include transcripts of debates, speeches, and interviews involving the president, writings by the president, and books, magazine articles, journal articles, and essays by others characterizing the decision making of the president.

By way of example, the ML model generation service 146 generates the bank of ASAI models 150, 152, 154 by further training respective instances of a reference LLM using multiple data portions corresponding to different life stages of a person. The ML model generation service 146 can retrieve an instance of the reference LLM from at least one datastore (not shown). In some embodiments, the ML model generation service 146 can receive the instance of the reference LLM from the ASAI software 102.

The ML model generation service 146 can adjust, using (i) a first data portion of the multiple data portions corresponding to a first life stage of the person and (ii) a first LLM learning rate smaller than a second LLM learning rate used to train the instance of the reference LLM, a first set of LLM parameters of at least one output layer of the instance of the reference LLM to generate a further trained LLM (not shown). The ML model generation service 146 can determine a value of an evaluation parameter indicative of a performance of the further trained LLM by executing the further trained LLM using a performance verification dataset. For example, the performance verification dataset can include LLM prompts and expected LLM outputs generated in response to an LLM processing the prompts. The expected LLM outputs can be used to verify whether the further trained LLM is processing the prompts to generate expected and/or desired outputs. Examples of the evaluation parameter include an accuracy, efficiency, factual consistency, fluency, and relevance parameter.

Furthering the example, the ML model generation service 146 can output the further trained LLM as a first age-stratified LLM (e.g., the first ASAI model 150) of the bank of age-stratified LLMs (e.g., the bank of ASAI models 150, 152, 154) in response to determining that the value of the evaluation parameter meets an evaluation parameter threshold. Examples of the evaluation parameter threshold include an accuracy, efficiency, factual consistency, fluency, and relevance parameter threshold.

As shown, after the ML model generation service 146 generates the ASAI models 150, 152, 154, the ML model generation service 146 can output the ASAI models 150, 152, 154 to the ASAI software 102. As shown, the ASAI software 102 can store the ASAI models 150, 152, 154 as ones of the ASAI models 108 in the ASAI model datastore 120.

Figure 2:
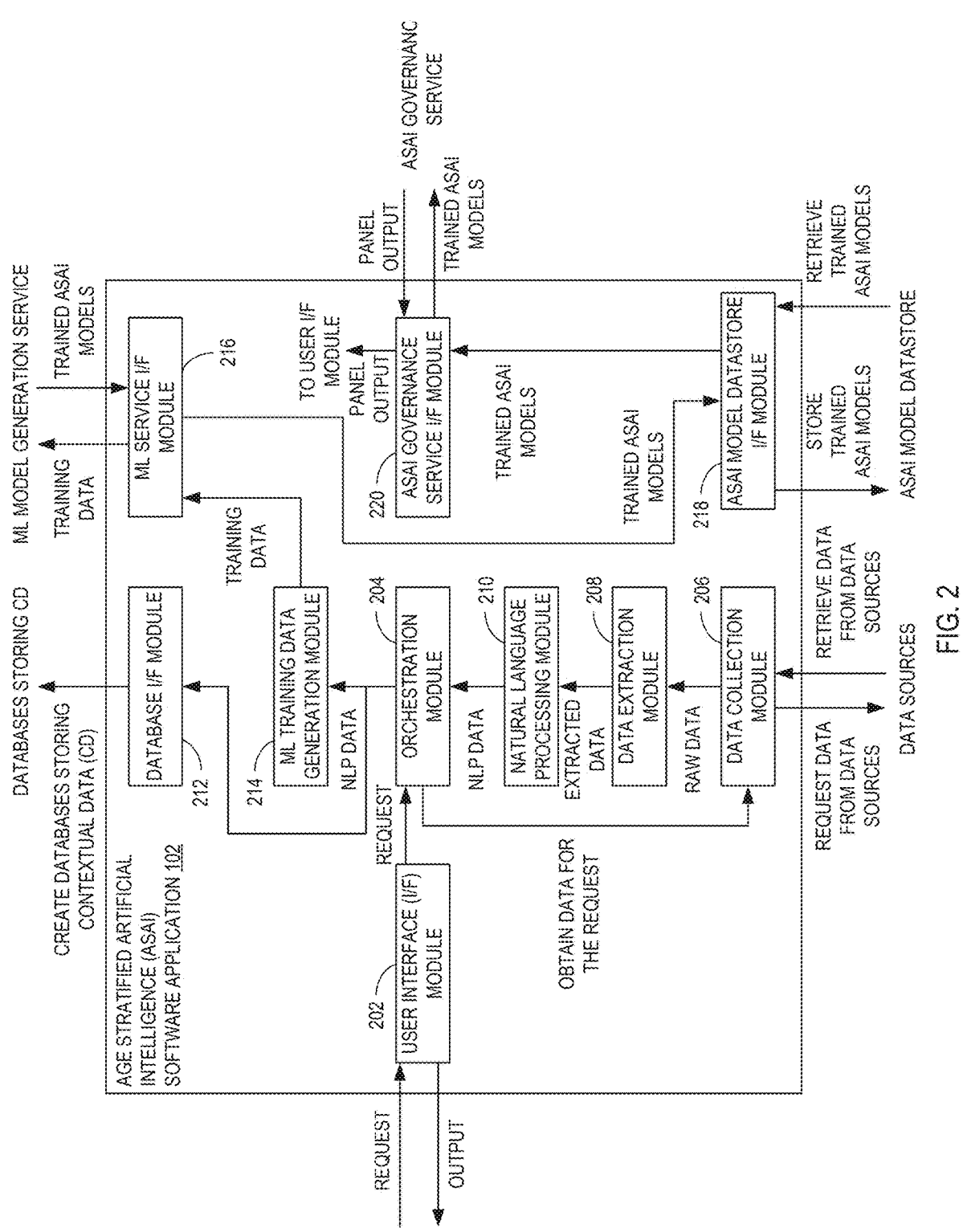
FIG. 2 shows a block diagram of an example implementation of the ASAI software of FIG. 1A, in accordance with some embodiments of the technology described herein.

FIG. 2 shows a block diagram of an example implementation of the ASAI software 102 of FIGS. 1A and/or 1B. The ASAI software 102 of this example includes a user interface (I/F) module 202 configured to receive data and/or transmit data to a user, such as the user 110 of FIG. 1A. In some embodiments, the user interface module 202 can be implemented by one or more APIs.

The received data can include a request, such as from the user 110. Examples of the request include a request to generate one or more banks of the ASAI models 108 of FIG. 1A for one or more persons (e.g., one or more historical figures) and a request for an output from a panel of the ASAI models 108. The request can be a prompt including one or more questions, such as one or more questions about a topic, and the output can be a simulated response to the question(s).

The transmitted data can include a panel output. Examples of the panel output include a simulated response. Examples of the simulated response include a decision, a recommendation, a policy, and a vote associated with a request from the user 110.

The user interface module 202 can output the request to an orchestration module 204. The orchestration module 204 can be configured to automate, coordinate, and/or manage operations (e.g., workflows, tasks) across the different modules of the ASAI software 102 shown in FIG. 2.

The orchestration module 204 can process the request to determine one or more operations to be executed to complete the request. In response to determining that the request is to generate ASAI models for a person, the orchestration module 204 can determine that data is to be obtained for the request. As shown, the orchestration module 204 can instruct a data collection module 206 to obtain data for the request.

In some embodiments, the data collection module 206 can implement a web scraper and/or crawler. For example, the data collection module 206 can crawl websites on the Internet and scrape information of interest related to the request.

In some embodiments, the data collection module 206 requests data from data sources. For example, the data collection module 206 can issue a request to the data source service 142 of FIG. 1B to retrieve data pertinent to the request from the datastores 144. In such an example, if the request is to generate a bank of ASAI models for a former U.S. president, the data collection module 206 can identify a data source (e.g., the data source service 142) related to the former U.S. president, such as the president's presidential library online resources. The data collection module 206 can query the data source to retrieve data associated with the former U.S. president.

As shown, the data collection module 206 can be configured to retrieve (e.g., obtain) data from the data sources. For example, the data collection module 206 can retrieve the data associated with the former U.S. president from the data source service 142. In such an example, the data can be associated with one or more life states of the president's life. The data collection module 206 can output the retrieved data as raw data (e.g., unprocessed data) to a data extraction module 208.

In some embodiments, the data extraction module 208 executes document and/or text extraction. In some embodiments, the data extraction module 208 can be configured to detect and/or extract data (e.g., metadata, text data) from the raw data. For example, the data extraction module 208 can execute one or more ML models (e.g., one or more natural language processing (NLP) models) configured to extract alphanumeric text of interest from electronic data.

Examples of the extracted data include timestamps (e.g., time of day, calendar dates including month, day, and year), an identification of a type of the data (e.g., audio, image, text, video), and an identification of what the data represents (e.g., an article, a speech). For example, the data extraction module 208 can extract timestamps from the raw data, which can be used to determine which portion(s) of the raw data correspond to different life stages of the president. The data extraction module 208 can output the extracted data to a natural language processing (NLP) module 210.

The NLP module 210 can be configured to process the extracted data to generate life stage data. For example, the NLP module 210 can process the extracted data by interpreting and/or understanding the extracted data in order to determine which portions of the data belong to particular life stages of the historical figure. In such an example, the NLP module 210 can process extracted data by associating a timestamp of a portion of the raw data to a particular life stage of the president. In some embodiments, the resulting NLP data is life stage data.

In some embodiments, the NLP module 210 can be implemented by one or more ML models (e.g., one or more NLP models) configured to execute one or more NLP techniques. For example, the NLP module 210 can be implemented by one or more NLP models trained to execute text processing, tokenization, stemming, tagging, semantic analysis, syntactic analysis, named entity recognition, and/or sentiment analysis on the extracted data. Semantic analysis may involve determining the meaning of words and sentences and considering the context and relationships between words to understand the overall meaning or message. Syntactic analysis may involve identifying parts of speech and how they relate to each other and analyzing grammatical structure of sentences. Named entity recognition may involve identifying and categorizing named entities, such as dates, people, locations, and organizations. Sentiment analysis may involve determining an emotional tone or sentiment expressed in text.

In some embodiments, the NLP module 210 can generate and/or output NLP data. For example, the NLP module 210 can process the extracted data into the NLP data. Examples of the NLP data include natural language text. For example, the NLP module 210 can be implemented at least in part by an NLP model configured to generate text (e.g., human-quality text) written in a human language (e.g., English, Spanish, French). The NLP module 210 can output the NLP data to the orchestration module 204.

In some embodiments, the orchestration module 204 stores the NLP data for further processing by the ASAI software 102 and/or a different component of the system 100 of FIG. 1A and/or the system 140 of FIG. 1B. For example, the orchestration module 204 can output the NLP data to a database interface module 212.

The database interface module 212 can be configured to interface with a database. For example, the database interface module 212 can transmit data to and/or receive data from the contextual data datastores 128 of FIG. 1A. In some embodiments, the database interface module 212 is implemented by one or more APIs.

In some embodiments, the database interface module 212 can be configured to generate a database. For example, in response to receiving the NLP data, the database interface module 212 can generate a new database (e.g., a new one of the contextual data datastores 128) to store the NLP data and/or add the NLP data to an existing database (e.g., one of the contextual data datastores 128).

In some embodiments, the database interface module 212 can be configured to generate a database to store data for a particular life stage. For example, the database interface module 212 can store portion(s) of the NLP data into different databases each corresponding to a different life stage of the president. For example, the database interface module 212 can store a first portion of the NLP data in a youth life stage database, a second portion of the NLP data in a mature life stage database, and a third portion of the NLP data in an elder life stage database, each of which corresponding to the president.

In some embodiments, the database interface module 212 can be configured to generate a database to store data that pertains to a particular topic. Examples of topics include diplomacy, education, law, and policy. For example, the database interface module 212 can be configured to generate a first database that stores a first dataset related to diplomacy activities, directives, functions, policies, protocols, and/or operations by the president. In another example, the database interface module 212 can be configured to generate a second database that stores a second dataset related to the president's education activities, field(s) of study, and/or credentials. In some embodiments, the first and second dataset can be further partitioned by life stage. For example, the first dataset can be partitioned into a first sub-dataset related to the president's diplomacy activities in a youth life stage, a second sub-dataset related to the president's diplomacy activities in a mature life stage, and a third sub-dataset related to the president's diplomacy activities in an elder life stage.

In some embodiments, the orchestration module 204 can determine that the NLP data received from the NLP module 210 is associated with completing the request to generate ASAI models. As shown, the orchestration module 204 can receive the NLP data from the NLP module 210 and output the NLP data to a machine learning (ML) training data generation module 214.

In some embodiments, the ML training data module 214 can be implemented by one or more ML models trained to generate training data by processing the NLP data using the one or more ML models. Examples of the one or more ML models include discriminative and generative ML models. For example, the ML training data module 214 can be configured to execute ML model(s) to process the NLP data into training data for training the ASAI models 150, 152, 154 of FIG. 1B. As shown, the ML training data module 214 outputs the training data to a machine learning (ML) service interface (I/F) module 216.

By way of example, the NLP processing module 210 can detect, using one or more NLP models, at least partial calendar dates from multiple data portions of the extracted data and each partial calendar date associated with at least one of the multiple data portions. The ML training data generation module 214 can execute, using the at least partial calendar dates, one or more ML models to generate first life stage data, the one or more ML models trained to classify multiple data portions as pertaining to particular life stages of persons to generate life stage data. For example, the ML training data generation module 214 can generate the life stage data by generating, for each particular data portion of the multiple data portions, a data association between the particular data portion and a particular life stage of a person by mapping a particular partial calendar date of the particular data portion to the particular life stage of the person. The ML training data generation module 214 can store the data associations in at least one datastore (not shown) of the ASAI software 102 and/or accessible by the ASAI software 102. The life stage data can include the data associations.

The ML service interface module 216 can be configured to transmit data to and/or receive data from an ML service, such as the ML model generation service 146 of FIG. 1B. In some embodiments, the ML service interface module 212 is implemented by one or more APIs.

As shown, the transmitted data can be the training data. As shown, the received data can be trained ASAI models, such as the ASAI models 150, 152, 154 of FIG. 1B. The ML service interface module 216 can output the trained ASAI models to an ASAI model datastore interface (I/F) module 218.

The ASAI model datastore interface module 218 can be configured to transmit data to and/or receive data from an ASAI model datastore, such as the ASAI model datastore 120 of FIGS. 1A and/or 1B. In some embodiments, the ASAI model datastore interface module 218 is implemented by one or more APIs.

As shown, the transmitted data can be the trained ASAI models, such as the ASAI models 150, 152, 154. For example, the ASAI model datastore interface module 218 can output the ASAI models 150, 152, 154 for storage in the ASAI model datastore 120 as at least some of the ASAI models 108. In such an example, the ASAI model datastore interface module 218 can output a youth, mature, and elder life stage ASAI model to the ASAI model database 120 for storage as a bank of ASAI models, such as the first bank of ASAI models 109.

As shown, the received data can be trained ASAI models, such as one(s) of the ASAI models 108 of FIGS. 1A and/or 1B. The ML service interface module 216 can retrieve and output at least some of the ASAI models 108 to an ASAI governance service interface module 220.

The ASAI governance service interface module 220 can be configured to transmit data to and/or receive data from an ASAI governance service, such as the ASAI governance service 104 of FIG. 1A. In some embodiments, the ASAI governance service interface module 220 is implemented by one or more APIs.

In some embodiments, the request received by the user interface module 202 is a request for an output from a panel of ASAI models as shown in FIG. 1A. The request can be to establish a panel of ASAI models to respond to a question and/or deliberate about a topic. For example, the question can be "Should the U.S. government proceed with hydro-electric power development in predominantly agricultural regions?" In another example, the topic can be hydroelectric power development in agricultural regions. The request can further include a request for an output by the panel, which can include a simulated response representing a decision, recommendation, and/or suggestion about the question and/or topic.

In some such embodiments, the ASAI model datastore interface module 218 can retrieve some of the ASAI models 108 for the panel 106 and output the retrieved ASAI models 108 to the ASAI governance service interface module 220 for output to the ASAI governance service 104. In some embodiments, the ASAI model datastore interface module 218 can retrieve an ASAI model from different banks of ASAI models. For example, the ASAI model datastore interface module 218 can retrieve a youth life stage ASAI model corresponding to a former U.S. President from the first bank of ASAI models 109, a mature life stage ASAI model corresponding to a former Secretary for the U.S. Department of Energy from the second bank of ASAI models 111, a mature life stage ASAI model corresponding to a former Secretary for the Department of Agriculture from a third bank of ASAI models (not shown), and an elder life stage ASAI model corresponding to a former Secretary of State for the U.S. Department of State from a fourth bank of ASAI models (not shown).

In response to outputting the retrieved ASAI models to the ASAI governance service 104, the ASAI governance service 104 can instantiate and/or generate the panel 106 of FIG. 1A using the retrieved one(s) of the ASAI models 108 in furtherance of completing the request received by the user interface module. For example, the ASAI governance service 104 can enable the panel 106 to deliberate about the topic and generate output(s) in connection with the topic. In another example, the ASAI governance service 104 can enable the panel 106 to generate simulated response(s) to question(s).

The ASAI governance service 104 can provide the output(s) to the ASAI governance service interface module 220, which, in turn, can provide the output(s) to the user interface module 202. The user interface module 202 can transmit the output(s) to one(s) of the electronic devices 112, 114, 116 for presentation of the output(s) to the user 110.

While an example implementation of the ASAI software 102 of FIGS. 1A and/or 1B is depicted in FIG. 2, other implementations are contemplated. For example, one or more blocks, components, functions, etc., of the ASAI software 102 shown in FIG. 2 may be combined or divided in any other way. The ASAI software 102 of the illustrated example may be implemented by hardware alone, or by a combination of hardware, software, and/or firmware. For example, the ASAI software 102 may be implemented by one or more analog or digital circuits (e.g., comparators, operational amplifiers, etc.), one or more hardware-implemented state machines, one or more programmable processors (e.g., central processing units (CPUs), digital signal processors (DSPs), field programmable gate arrays (FP-GAs), graphics processing units (GPUs), etc.), one or more network interfaces (e.g., network interface circuitry, network interface cards (NICs), smart NICs, etc.), one or more application specific integrated circuits (ASICs), one or more memories (e.g., non-volatile memory, volatile memory, etc.), one or more mass storage disks or devices (e.g., hard-disk drives (HDDs), solid-state disk (SSD) drives, flash memory, etc.), etc., and/or any combination(s) thereof.

Figure 3:
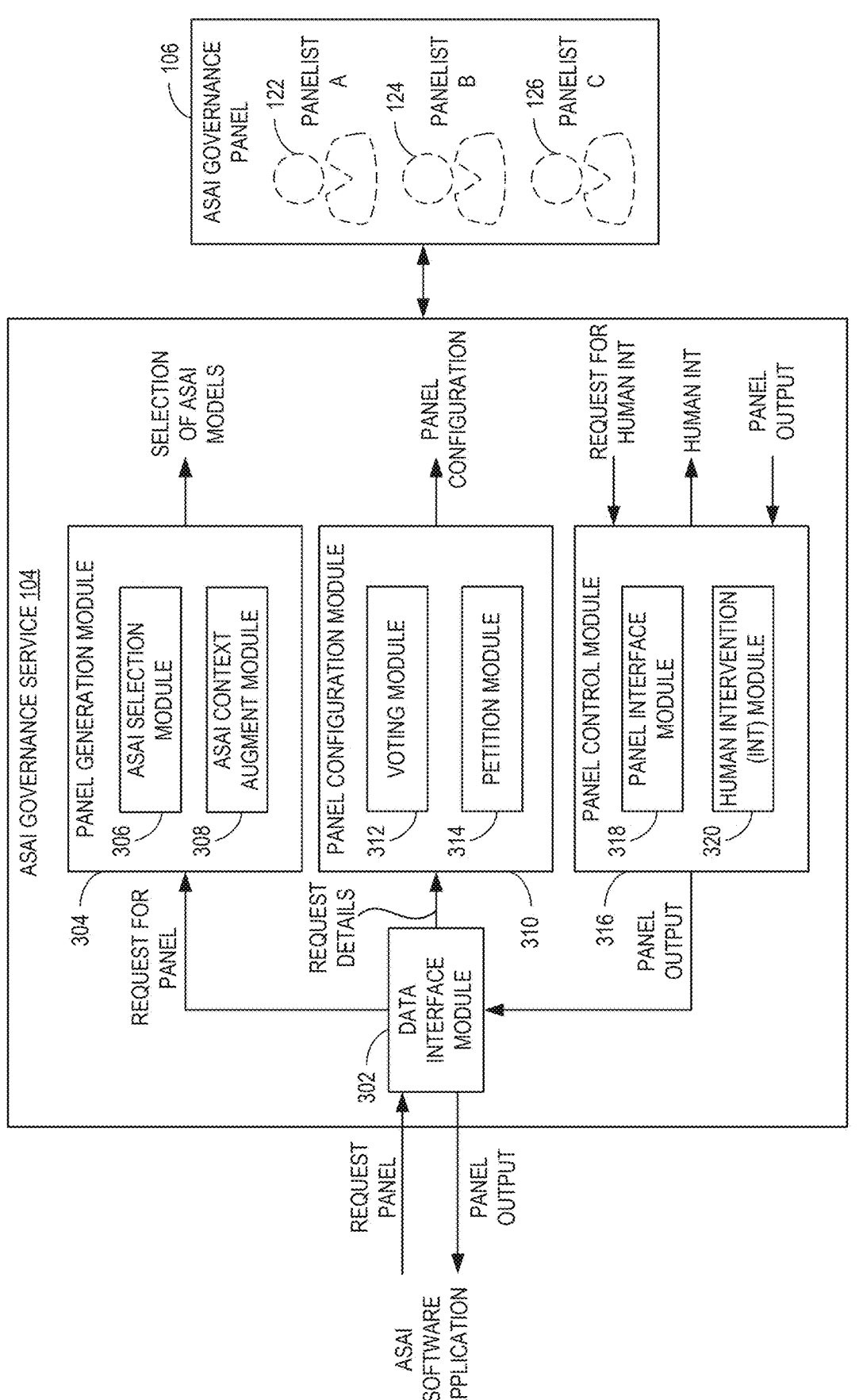
FIG. 3 shows a block diagram of an example implementation of the ASAI governance service of FIG. 1A, in accordance with some embodiments of the technology described herein.

FIG. 3 shows a block diagram of an example implementation of the ASAI governance service 104 of FIG. 1A. The ASAI governance service 104 can be configured to generate and/or control an ASAI panel, such as the panel 106 of FIG. 1A.

The ASAI governance service 104 of this example includes a data interface module 302 configured to transmit data to and/or receive data from an ASAI governance service interface module, such as the ASAI governance service interface module 220 of FIG. 2. In some embodiments, the data interface module 302 is implemented by one or more APIs.

As shown, the received data can be a request for a panel to deliberate about a topic and/or generate an output in connection with the topic (collectively identified by "REQUEST PANEL"). As shown, the transmitted data can be the output in connection with the topic (identified by "PANEL OUTPUT").

In some embodiments, the data interface module 302 processes the received data to effectuate panel governance. For example, the data interface module 302 can parse and/or analyze the received data to determine that the received data includes a request for a panel. In such an example, the data interface module 302 can output a request for a panel in accordance with the information in the received request. The data interface module 302 can output the request to a panel generation module 304.

In some embodiments, the panel generation module 304 can select one or more of the ASAI models 108 to form a panel, such as the panel 106, and/or augment one(s) of the selected ASAI models 108 for improved governance and output quality. As shown, the panel generation module 304 includes and/or implements an ASAI selection module 306 and an ASAI context augmentation module 308 (identified by "ASAI CONTEXT AUGMENT MODULE").

In some embodiments, the ASAI selection module 306 selects at least one ASAI model for establishment of an ASAI governance panel. For example, the ASAI selection module 306 can select one or more of the ASAI models 108 of FIG. 1A.

In some embodiments, the ASAI selection module 306 can determine which ASAI models 108 to select based on the request for the panel received by the data interface module 302. For example, the request can identify one(s) of the ASAI models 108 to select. Alternatively, the ASAI selection module 306 may randomly select ones of the ASAI models 108 for panel creation.

In some embodiments, the ASAI selection module 306 can determine which ASAI models 108 to select based on the topic to be deliberated. For example, if the topic is related to hydroelectric power and farming, the ASAI selection module 306 can select ASAI models 108 that have strong connections and/or associations with hydroelectric power (e.g., energy), farming (e.g., agriculture), and their interconnections (e.g., property rights, water usage rights). In some embodiments, the ASAI selection module 306 can instruct the data interface module 302 to retrieve the ASAI models 108 from the ASAI model datastore 120.

In some embodiments, the ASAI context augmentation module 308 augments an ASAI model to improve deliberation about the requested topic. For example, the ASAI context augmentation module 308 can obtain contextual data/information from the contextual data datastores 128 associated with the topic. In such an example, the ASAI context augmentation module 308 can direct the data interface module 302 to retrieve the contextual data/information from the contextual data datastores 128 associated with the topic. The contextual data/information may be referred to "as augmented information."

In some embodiments, the ASAI context augmentation module 308 can augment a selected ASAI model for panel generation by generating one or more AI model layers and/or appending the one or more AI model layers to the selected ASAI model. The one or more AI model layers can include AI weights corresponding to the augmented information. Beneficially, the selected ASAI model augmented with the AI model layer(s) can deliberate about the topic using the contextual data/information without altering the thought processes (e.g., AI model layers, weights, architecture) of the underlying ASAI model.

As shown, the panel generation module 304 can output a selection of ASAI models. In some embodiments, the selection includes one or more non-augmented ones of the ASAI models 108 and/or one or more augmented ones of the ASAI models 108. As shown, the panel 106 can be constructed, generated, established, and/or instantiated using the selected ASAI models.

By way of example, the first panelist 122 can be implemented by executing a first selected one of the ASAI models 108. In such an example, the first selected ASAI model can be non-augmented and/or augmented with the augmented information.

Furthering the example, the second panelist 124 can be implemented by executing a second selected one of the ASAI models 108. In such an example, the second selected ASAI model can be non-augmented and/or augmented with the augmented information.

Additionally in this example, the third panelist 126 can be implemented by executing a third selected one of the ASAI models 108. In such an example, the third selected ASAI model can be non-augmented and/or augmented with the augmented information.

To govern deliberation about the topic by the panel 106, the ASAI governance service 104 includes a panel configuration module 310. The panel configuration module 310 can be configured to establish voting and/or petition protocols to control voting and/or petition aspects of the deliberation by the panel 106 on the topic.

The panel configuration module 310 includes a voting module 312. The voting module 312 can be configured to establish voting protocols that control the manner in which the panel 106 can vote on a course of action, decision, recommendation, and/or suggestion related to the topic. For example, the voting module 312 can establish a voting threshold (e.g., a consensus threshold) that sets a threshold number of votes needed in the affirmative to approve a decision/recommendation/suggestion to be output as at least part of the output by the panel 106.

In some embodiments, the voting module 312 can be configured to assign vote (or voting) weights to each panelist 122, 124, 126. The vote weights can be degrees to which a panelist's vote has heightened or reduced importance with respect to other panelists. For example, the voting module 312 can assign a first weight of 0.5 to the first panelist 122, a second weight of 1.0 to the second panelist 124, and a third weight of 2.0 to the third panelist 126. In such an example, a vote by the first panelist 122 has half the weight (or importance) with respect to a vote by the second panelist 124. Further, a vote by the third panelist 126 has twice the weight (or importance) with respect to a vote by the second panelist 124 and four times the weight with respect to a vote by the first panelist 126. Put another way, in this example, a vote by the third panelist 126 has heightened and/or greater importance to the overall outcome of the deliberation by the panel 106 than other votes.

The panel configuration module 310 includes a petition module 314. The petition module 314 can be configured to establish petition protocols that control the manner in which the panel 106, or panelist(s) thereof, can create a petition related to the topic. For example, the petition module 314 can establish which one(s) of the panelists 122, 124, 126 can generate and raise a petition for consideration by a human in the loop and/or the user 110 who initially requested the formation of the panel 106.

As shown, the voting module 312, the petition module 314, and/or, more generally, the panel configuration module 310 can output a panel configuration (e.g., panel configuration data) to be used to govern the panel 106. For example, the voting module 312 can output a voting threshold and/or vote weights as at least part of the panel configuration. In such an example, the petition module 314 can output the petition protocols as at least part of the panel configuration. In some embodiments, the panel 106 can be generated at least in part using the panel configuration.

The ASAI governance service 104 includes a panel control module 316 to effectuate deliberation about the topic by the panel 106. In some embodiments, the panel control module 316 can transmit data to and/or receive data from the panel 106. In some embodiments, the panel control module 316 can control, handle, and/or manage human in the loop interaction.

The panel control module 316 includes a panel interface module 318. The panel interface module 318 can be configured to receive data from and/or transmit data to the panel 106.

The panel control module 316 further includes a human intervention module 320 configured to enable a human user to control, monitor, and/or interact with the panel 106. For example, the human intervention module 320 can be configured to provide input, from a human user, to the panel 106. In another example, the human intervention module 320 can be configured to enable the human user to govern the panel 106, such as by changing a direction of the panel deliberation, realigning the panel deliberation about an aspect of the topic, etc. In some embodiments, the human intervention module 320 can be implemented at least in part by a GUI through which the human user can monitor the panel 106, provide input to the panel 106, and/or otherwise govern the panel 106.

As shown, the received data is a request for human intervention (identified by "REQUEST FOR HUMAN INT"). For example, the panel 106 may solicit intervention from a human supervisor of the ASAI governance service 104. Examples of the intervention include a request for additional contextual data/information and a modification to voting and/or petition protocols. Also shown, the received data can include the panel output.

As shown, the transmitted data is data resulting from the human intervention (identified by "HUMAN INT"). Examples of the transmitted data include additional contextual/data information, updated vote weights, updated vote thresholds, and updated petition protocols.

While an example implementation of the ASAI governance service 104 of FIG. 1A is depicted in FIG. 3, other implementations are contemplated. For example, one or more blocks, components, functions, etc., of the ASAI governance service 104 shown in FIG. 3 may be combined or divided in any other way. The ASAI governance service 104 of the illustrated example may be implemented by hardware alone, or by a combination of hardware, software, and/or firmware. For example, the ASAI governance service 104 may be implemented by one or more analog or digital circuits, one or more hardware-implemented state machines, one or more programmable processors, one or more network interfaces, one or more ASICs, one or more memories, one or more mass storage disks or devices, etc., and/or any combination(s) thereof.

Figure 4:
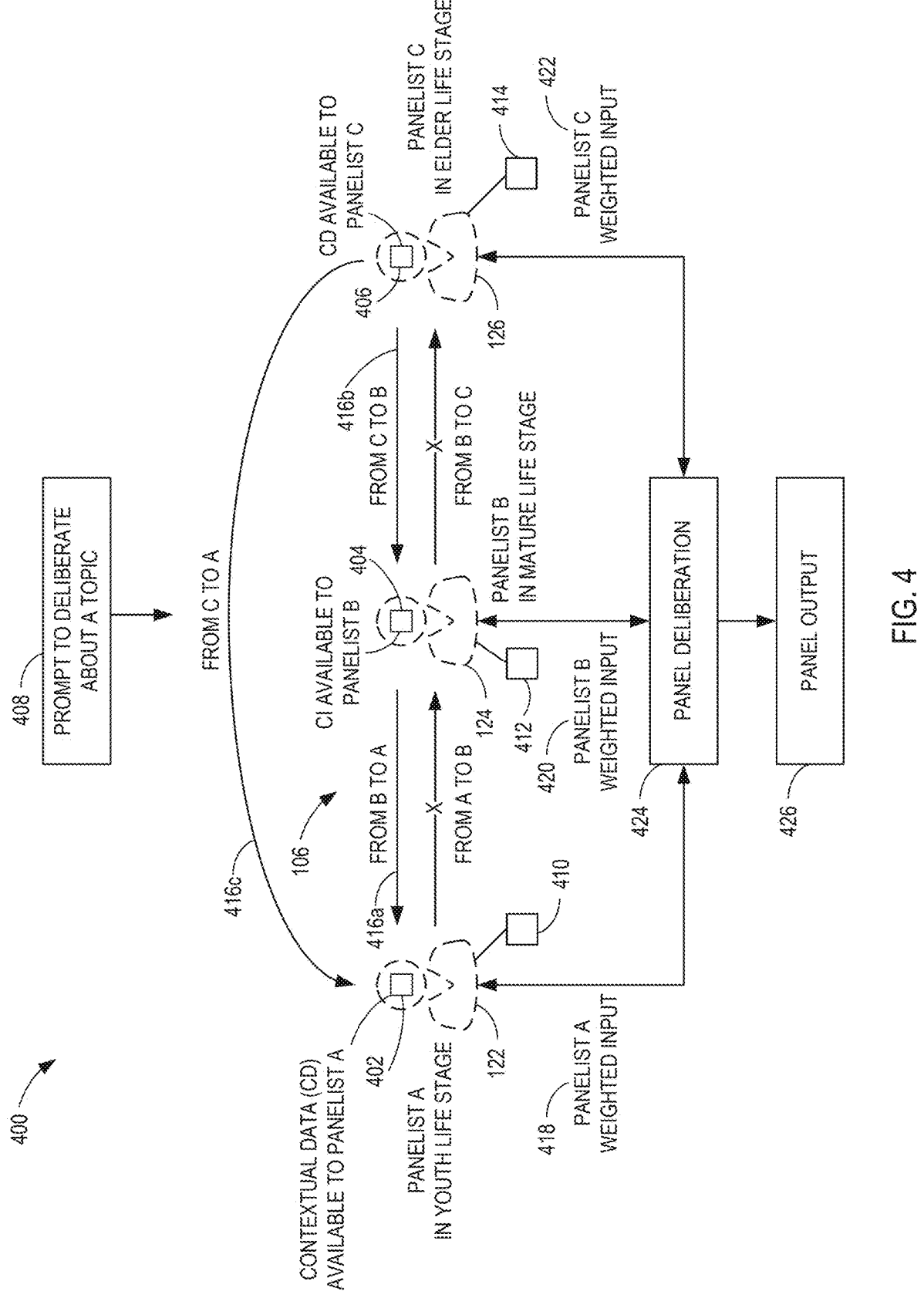
FIG. 4 shows an example workflow of a panel of ASAI models deliberating about a topic, in accordance with some embodiments of the technology described herein.

FIG. 4 shows an example workflow 400 of a panel of ASAI models deliberating about a topic. Additionally and/or alternatively, the workflow 400 can be implemented by the panel of ASAI models generating simulated response(s) to question(s) provided in prompt(s).

In some embodiments, the workflow 400 is implemented by the ASAI governance service 104 of FIGS. 1A and/or 3. As shown, the panel can be the panel 106 of FIGS. 1A and/or 3 and including the panelists 122, 124, 126 of FIGS. 1A and/or 3. The ASAI models can be ones of the ASAI models 108 of FIGS. 1A and/or 1B. For example, the ASAI governance service 104 can implement a computing environment in which the ASAI models 108 are executed to effectuate deliberation (e.g., discussion, dialogue) about the topic.

In some embodiments, each of the panelists 122, 124, 126 are ML-enabled agents implemented by ASAI models. For example, the first panelist 122 can be a first ML-enabled agent implemented by a first one of the ASAI models 108. The second panelist 124 can be a second ML-enabled agent implemented by a second one of the ASAI models 108. The third panelist 126 can be a third ML-enabled agent implemented by a third one of the ASAI models 108.

In some embodiments, the panelists 122, 124, 126 are implemented by ASAI models corresponding to different persons, such as historical figures, in different life stages. Alternatively, two or more of the panelists 122, 124, 126 may correspond to the same person. Alternatively, two or more of the panelists 122, 124, 126 may correspond to the same life stage.

As shown, the first panelist 122 is implemented by a first ASAI model corresponding to a first person in a youth life stage. The first ASAI model is augmented and/or configured with first contextual data 402. For example, the ASAI context augmentation module 308 of FIG. 3 can retrieve the first contextual data 402 from the contextual data datastores 128 of FIG. 1A to augment the first ASAI model. The first contextual data 402 is available to the first panelist 122 but not the second and third panelists 124, 126. By way of example, the first panelist 122 can be a historical figure, such as former U.S. President Barack Obama in a youth life stage (e.g., ages 18-30).

The second panelist 124 is implemented by a second ASAI model corresponding to a second person in a mature life stage. The second ASAI model is augmented and/or configured with second contextual data 404. For example, the ASAI context augmentation module 308 of FIG. 3 can retrieve the second contextual data 404 from the contextual data datastores 128 of FIG. 1A to augment the second ASAI model. The second contextual data 404 is available to the second panelist 124 but not the first and third panelists 122, 126. By way of example, the second panelist 124 can be a historical figure, such as former U.S. President Ronald Reagan in a mature life stage (e.g., ages 31-60).

The third panelist 126 is implemented by a third ASAI model corresponding to a third person in an elder life stage. The third ASAI model is augmented and/or configured with third contextual data 406. For example, the ASAI context augmentation module 308 of FIG. 3 can retrieve the third contextual data 406 from the contextual data datastores 128 of FIG. 1A to augment the third ASAI model. The third contextual data 406 is available to the third panelist 126 but not the first and second panelists 122, 124. By way of example, the third panelist 126 can be a historical figure, such as former U.S. President Gerald Ford in an elder life stage (e.g., ages 61-75).

In the illustrated example, the panelists 122, 124, 126 generate simulated responses to simulate deliberation about a topic in response to a prompt 408. For example, the panelists 122, 124, 126 can generate simulated responses about the topic that President Obama in a youth life stage of his life, President Regan in a mature life stage of his life, and President Ford in an elder life stage of his life would have provided in their respective life stages.

Additionally and/or alternatively, the panelists 122, 124, 126 may generate simulated response(s) to question(s) included in the prompt 408. For example, the panelists 122, 124, 126 can generate simulated responses to questions that President Obama in a youth life stage of his life, President Regan in a mature life stage of his life, and President Ford in an elder life stage of his life would have provided in their respective life stages.

In some embodiments, a user (e.g., a machine user, the user 110) generates and/or provides the prompt 408. In some embodiments, the ASAI governance service 104 processes the request for panel output from the user into the prompt 408.

In some embodiments, the prompt 408 includes natural language text. For example, the prompt 408 can be a textual prompt. The natural language text can describe the topic for deliberation and/or a requested output from the panel 106. Additionally and/or alternatively, the prompt 408 may include the panel configuration data/information of FIG. 3. For example, the prompt 408 can include voting threshold(s), petition protocols, etc.

In some embodiments, the computing environment used to implement the panelists 122, 124, 126, and/or, more generally, the workflow 400, can be implemented by one or more virtual machine(s) (VM(s)), container(s), and/or virtual network(s) (e.g., software-defined network(s)). For example, the first panelist 122 can be implemented by a first virtual resource 410, the second panelist 124 can be implemented by a second virtual resource 412, and the third panelist 126 can be implemented by a third virtual resource 414.

In some embodiments, the first virtual resource 410 is a first VM. For example, the first VM can execute a first ASAI model of the first bank of ASAI models 109 to implement the first panelist 122 to generate first simulated response(s) to questions and/or about the topic that President Obama would have provided in the youth life stage of his life. Alternatively, the first virtual resource 410 can be a container configured to execute the first ASAI model.

In some embodiments, the second virtual resource 412 is a second VM. For example, the second VM can execute a second ASAI model of the second bank of ASAI models 111 to implement the second panelist 124 to generate second simulated response(s) to questions and/or about the topic that President Reagan would have provided in the mature life stage of his life. Alternatively, the second virtual resource 412 can be a container configured to execute the second ASAI model.

In some embodiments, the third virtual resource 414 is a third VM. For example, the third VM can execute a third ASAI model of a third first bank of ASAI models (not shown) to implement the third panelist 126 to generate third simulated response(s) to questions and/or about the topic that President Ford would have provided in the elder life stage of his life. Alternatively, the third virtual resource 414 can be a container configured to execute the third ASAI model.

In some embodiments, the virtual resources 410, 412, 414 communicate with one(s) of each other using at least one virtual network. The at least one virtual network can be at least one software-defined network. For example, the first virtual resource 410 can be a VM or container having a first private Internet Protocol (IP) address in a virtual network 416a, 416b, 416c (collectively reference numeral 416). In such an example, the second virtual resource 412 can be a VM or container having a second private IP address in the virtual network 416. Furthering the example, the third virtual resource 414 can be a VM or container having a third private IP address in the virtual network 416a, 416b, 416c.

To effectuate data communication among ones of the virtual resources 410, 412, 414, communication messages can be transmitted between VMs or containers. As shown, the second virtual resource 412 can transmit communication message(s) having the second private IP address of the second virtual resource 412 as a source private IP address and the first private IP address of the first virtual resource 410 as a destination private IP address. The communication message(s) can include simulated responses. For example, the second virtual resource 412 can transmit, using the first and second private IP addresses, a first communication message including a simulated response generated by the second virtual resource 412 to the first virtual resource 410.

In some embodiments, the virtual resources 410, 412, 414 can share data with one(s) of each other using shared volumes. For example, the virtual resources 410, 412, 414 can be containers included in the same container pod. The computing environment, and/or, more generally, the ASAI governance service 104 and/or the ASAI governance panel 106, can instantiate a shared volume in the container pod. The shared volume can be accessible by the first container, the second container, and/or the third container.

To effectuate data communication among ones of the virtual resources 410, 412, 414, the second container (e.g., the second virtual resource 412) can generate a first simulated response to the prompt 408 and store the first simulated response in the shared volume. The first container (e.g., the first virtual resource 410) can be executed to retrieve the first simulated response from the shared volume and generate a second simulated response using the first simulated response. In some embodiments, the first container can store the second simulated response in the shared volume, which can be accessible by one(s) of the second and/or In example operation of the workflow 400, in response to the prompt 408, the panel 106 deliberates about the topic, which is shown as panel deliberation 424. For example, the panelists 122, 124, 126 can have a dialogue amongst each other and the dialogue can be implemented at least in part as natural language text, which can be stored for data logging purposes. The panel deliberation can be interactive, such that output from the first ASAI model implementing the first panelist 122 can be output to the second ASAI model implementing the second panelist 124 (and vice versa).

To prevent undue influence from younger ASAI models, such as ASAI models in the youth life stage, from affecting the underlying training of older ASAI models, such as ASAI models in the mature and/or elder life stage, data flow between the ASAI models can be restricted. For example, the younger ASAI models can be restricted from transmitting a knowledge summary generated by the younger ASAI models and using the first contextual data 402 to older ASAI models.

As shown, output from the first panelist 122 is restricted from flowing to the second panelist 124 (shown by arrow line with "X" from the first panelist 122 to the second panelist 124) and the third panelist 126 (not shown). Further, output from the second panelist 124 is restricted to being provided to the third panelist 126, which is older and/or more mature than the second panelist 124.

By way of example, the ASAI governance service 104 can configure the virtual network 416, which can be a software-defined network, to block data transmissions from the first virtual resource 410 executing the first ASAI model to the second virtual resource 412 executing the second ASAI model. The ASAI governance service 104 can configure the virtual network 416 to enable data transmissions from the second virtual resource 412 to the first virtual resource 410 such that the second virtual resource 412 can transmit, over the virtual network 416, simulated response(s) to the first virtual resource 410.

Output from older panelists (e.g., the second and third panelists 122, 124) related to the topic may be shared with younger panelists (e.g., the first panelist 122) to effectuate the panel deliberation 424, but output from the younger panelists is not shared with older panelists. As shown, the third panelist 126 can share output with the first and second panelists 122, 124 and the second panelist 124 can share output with the first panelist 122. Further, output from younger panelists may be shared with other younger panelists (not shown in FIG. 4). For example, a panelist in a youth life stage may share output with other panelist(s) in a youth life stage.

Such restriction of information (e.g., knowledge summaries) flowing from younger to older panelists (e.g., mature life stage, elder life stage) is beneficial because a younger panelist can be prevented from distorting older panelists original ethical and coherence framework. By way of example, the first panelist 122 can be implemented by a fine-tuned youth life stage President Obama ASAI model and the second panelist 124 can be implemented by a fine-tuned mature life stage President Reagan ASAI model. In such an example, output from youth President Obama could distort mature President Reagan's original ethical and coherence framework. Mature President Reagan's cognitive structure was formed in an earlier era (e.g., President Reagan's post-presidency), shaped by Cold War norms, specific interpretations of freedom, fiscal responsibility, and U.S. leadership on the global stage. Youth President Obama, while simulating a younger Obama, can encode reasoning patterns formed in a post Sep. 11, 2001, racially complex, and globally interdependent environment-more attuned to social justice, multilateralism, or identity politics.

Furthering the above example, if youth President Obama influences mature President Reagan, Reagan's older, historically anchored reasoning risks being reframed by values that did not exist during his formative years, compromising the integrity of the Reagan ASAI model's ethical memory and coherence. However, if mature President Reagan influences youth President Obama, Obama's younger self (represented by the ASAI model) is simply being exposed to well-formed precedent—the youth Obama ASAI model can choose to accept or reject those ideas, and it fits the model of cognitive development.

By way of another example, assume that the first panelist 122 is a youth life stage President Reagan and the second panelist 124 is a mature life stage President Obama. Information from Reagan to Obama can be likewise restricted to preserve ethical memory and coherence. In this example, mature Obama has a worldview shaped by complex dilemmas of late-career Obama: drone warfare ethics, realpolitik, balancing idealism with compromise, etc. Youth Reagan is driven by early ideological clarity: anti-communism, free markets, optimism about deregulation. If youth Reagan influences (e.g., outputs data and/or information) mature Obama, it may introduce moral absolutism or political simplicity into Reagan's worldview that has been tempered by painful trade-offs and policy realism. Beneficially, influence down the maturity chain (e.g., from elder to mature and youth, from mature to youth) is safer and/or otherwise ensures ethical memory and coherency of the ASAI models of the panel 106 and further promotes growth and internal consistency as the panel deliberation 424 ensues.

In the illustrated example, the panel 106 can deliberate about a topic reflected by the prompt 408 to generate an output shown as panel output 426. The panel output 426 includes at least one simulated response. Examples of the at least one simulated response include a decision, a recommendation, and a petition. An example of a decision includes a result of a vote among the panelists 122, 124, 126 of the panel 106.

In some embodiments, each of the panelists 122, 124, 126 are configured to generate output having the same weight. For example, during a vote on the topic or an aspect thereof, each of the panelists 122, 124, 126 can have a vote having equal weight.

In some embodiments, one(s) of the panelists 122, 124, 126 can be configured to generate output having different weight(s) from other(s). As shown, the first panelist 122 can have a first weighted input 418, the second panelist 124 can have a second weighted input 420, and the third panelist 126 can have a third weighted input 422. The first weighted input 418 can be a first simulated response generated by the first ASAI model of the first bank of ASAI models 109. The second weighted input 420 can be a second simulated response generated by the second ASAI model of the second bank of ASAI models 111. The third weighted input 422 can be a third simulated response generated by the third ASAI model of the third bank of ASAI models.

By way of example, the first weighted input 418 can be 0.5, the second weighted input 420 can be 1.0 and the third weighted input 422 can be 2.0. In such an example, the first panelist 122 can generate output, such as casting a vote on a decision, which has half the weight of the output from the second panelist 124. Alternatively, two of the panelists 122, 124, 126 may generate output with the same weight while the remaining panelist may generate output with lighter or heavier weight.

Returning to an earlier example, the prompt 408 can be generated by a user (e.g., a machine user, the human user 110 of FIG. 1A) to deliberate about the topic of hydroelectric power development in agricultural regions. The prompt 408 can include a request for the panel 106 to generate the panel output 426 to be a decision whether to recommend a government policy to override existing property and water usage rights in agricultural regions to develop energy for nearby energy consumers (e.g., residential home developments, computer server data centers).

As shown, the panelists 122, 124, 126 can carry out the panel deliberation 424 about the topic. After a threshold amount of time and/or in response to one(s) of the panelists 122, 124, 126 calling for a vote, the panel deliberation 424 can end with the panel output 426. For example, the panelists 122, 124, 126 can each cast a vote on the decision regarding proceeding with the government policy. In such an example, the vote can be 2 to 1 with the first panelist 122 casting a "NO" vote and the second and third panelists 124, 126 casting "YES" votes. In some embodiments, the vote of 2 to 1 meets and/or satisfies a voting threshold of a simple majority, which can be reflected by and/or included in the panel configuration of FIG. 3.

Furthering the example, the panel output 426 can be output to the provider of the prompt 408, such as the user 110 and/or a machine user. Additionally, the panel output 426 may include log data. Examples of the log data include a participant list, panelist output, timestamps corresponding to the panelist output, and consensus rationale. Beneficially, such logging achieves traceability and transparency for the panel 106 implemented by ASAI models.

Figure 5A:
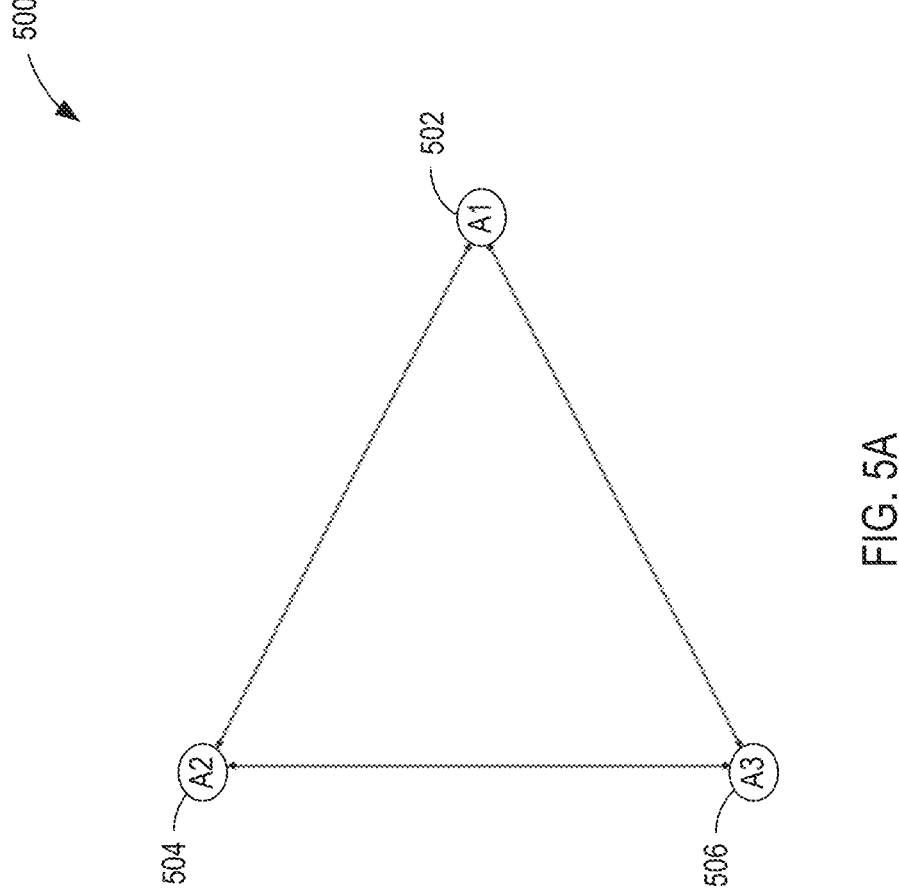
FIG. 5A shows a first information flow diagram including nodes representing panelists of a first panel, in accordance with some embodiments of the technology described herein.

FIG. 5A shows a first information flow diagram 500 associated with a first panel of ASAI models. The first information flow diagram 500 includes three nodes 502, 504, 506 each representing a panelist of the panel. For example, a first node 502 (identified by "A1") can correspond to a first panelist, a second node 504 (identified by "A2") can correspond to a second panelist, and a third node 506 (identified by "A3") can correspond to a third panelist.

The first information flow diagram 500 represents a panel in which each panelist may share output with each other. For example, the panelists can each be implemented by an ASAI model in the same life stage. As such, each panelist can be represented by a node that can transmit data to and/or receive data from each of the other nodes.

Figure 5B:
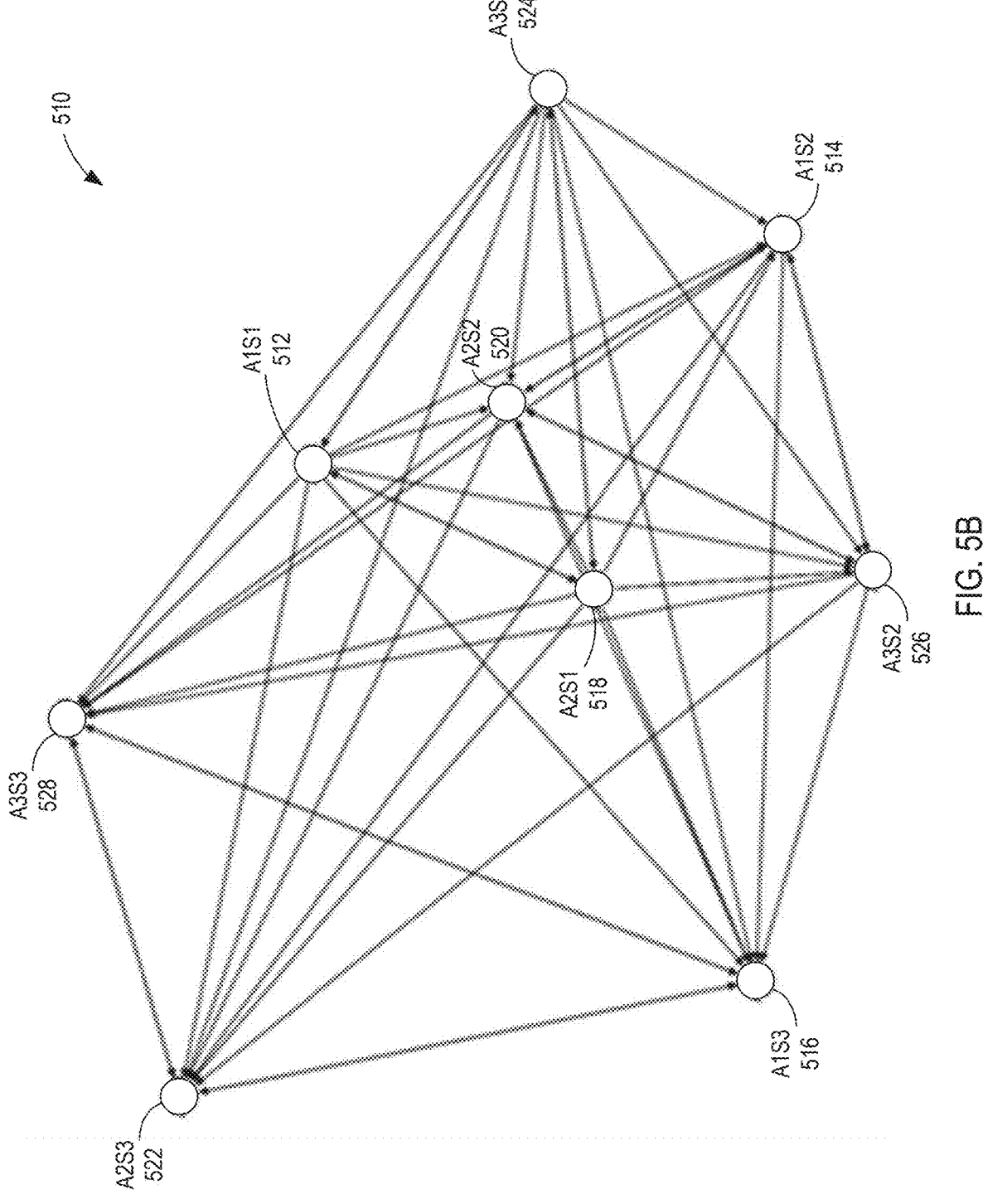
FIG. 5B shows a second information flow diagram including nodes representing panelists of a second panel, in accordance with some embodiments of the technology described herein.

FIG. 5B shows a second information flow diagram 510 associated with a second panel of ASAI models. The second information flow diagram 510 includes nine nodes 512, 514, 516, 518, 520, 522, 524, 526, 528 corresponding to three panelists. The nodes are labeled AjSk with j identifying the panelist and k identifying a subunit communication path. For example, a first node 512 (identified by "A1S1") can represent a first information flow corresponding to a first panelist, a second node 514 (identified by "A1S2") can represent a second information flow corresponding to the first panelist, and a third node 516 (identified by "A1S3") can represent a third information flow corresponding to the first panelist.

A fourth node 518 (identified by "A2S1") can represent a fourth information flow corresponding to a second panelist, a fifth node 520 (identified by "A2S2") can represent a fifth information flow corresponding to the second panelist, and a sixth node 522 (identified by "A2S3") can represent a sixth information flow corresponding to the second panelist.

A seventh node 524 (identified by "A3S1") can represent a seventh information flow corresponding to a third panelist, an eighth node 526 (identified by "A3S2") can represent an eighth information flow corresponding to the third panelist, and a ninth node 528 (identified by "A3S3") can represent a ninth information flow corresponding to the third panelist.

FIGS. 5A and 5B illustrate the combinatorial enrichment in deliberation. As discussed above, FIG. 5A shows 6 pathways representing the structured rule based exchange of information for the first panel. FIG. 5B shows 45 pathways representing the structured rule based exchange of information for the second panel. FIG. 5B represents a panel in which information flow paths are disallowed from younger to older ASAI models.

Figure 7:
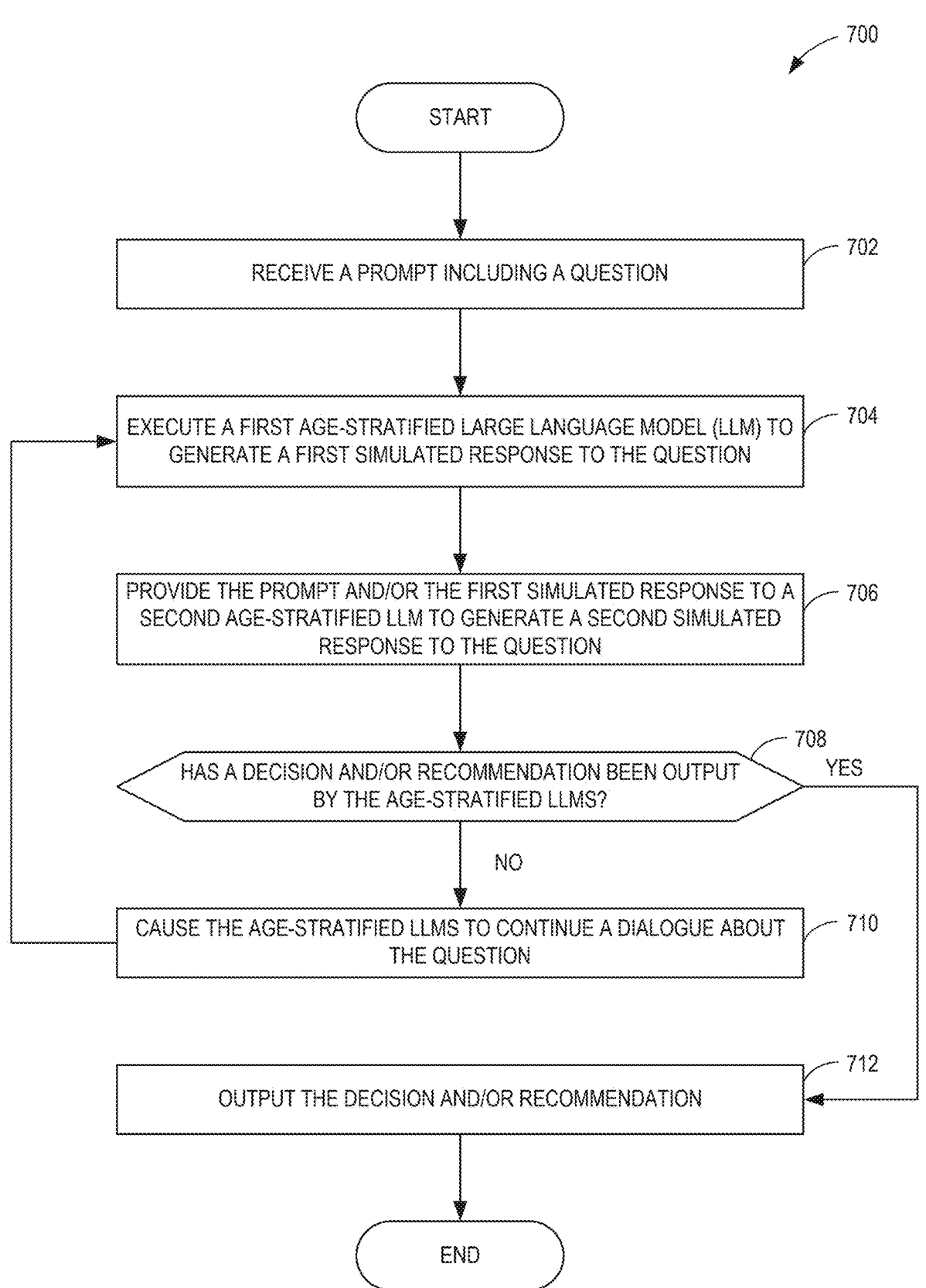
FIG. 7 is a flowchart representative of an example process that may be performed and/or example machine-readable instructions that may be executed by processor circuitry to implement the system of FIG. 1A, or portion(s) thereof, to prompt the panel of ASAI models of FIG. 1A to deliberate about a topic, in accordance with some embodiments of the technology described herein.

FIGS. 6-7 are flowcharts representative of example processes to be performed and/or example machine-readable instructions that may be executed by processor circuitry to implement the system 100 of FIG. 1A, or portion(s) thereof, and/or the system 140 of FIG. 1B, or portion(s) thereof. Additionally or alternatively, block(s) of one(s) of the flowcharts of FIGS. 6 and/or 7 may be representative of state(s) of one or more hardware-implemented state machines, algorithm(s) that may be implemented by hardware alone such as an ASIC, etc., and/or any combination(s) thereof.

FIG. 6 is a flowchart 600 representative of an example process that may be performed and/or example machine-readable instructions that may be executed by processor circuitry to implement the ASAI software 102 of FIGS. 1A, 1B, and/or 2 and/or, more generally, the system 100 of FIG. 1A and/or the system 140 of FIG. 1B. The flowchart 600 of FIG. 6 begins at block 602, at which the ASAI software 102 may receive electronic data associated with a person. For example, the data collection module 206 of FIG. 2 may query the data source service 142 for information and/or data associated with a person, such as historical figure. The historical figure may be a former U.S. president. Furthering the example, the data source service 142 can implement an API configured to grant access to electronic data resources of a presidential library for the president. In such an example, the data collection module 206 may access and retrieve data from the presidential library via the API.

At block 604, the ASAI software 102 may process the electronic data into life stage data. The life stage data can include multiple data portions corresponding to the different life stages of the person. By way of example, the data extraction module 206 of FIG. 2 can extract timestamps and/or identifications of the retrieved raw data. The NLP module 210 can execute NLP model(s) to process the extracted data into NLP data, which may include natural language text (e.g., alphanumeric characters). In some embodiments, the NLP data can be life stage data, such that the NLP module 210 can categorize and/or classify different portions of the extracted data and/or, more generally, the raw data, into different life stages of the president.

At block 606, the ASAI software 102 may select a portion of the life stage data that corresponds to a life stage of the person. For example, the ML service interface module 216 can output the life stage data to the ML model generation service 146 of FIG. 1B. In such an example, the outputting can cause the ML model generation service 146 to select a first life stage of the person, such as a youth life stage. The portion of the life stage can include a particular data portion of the multiple data portions.

At block 608, the ASAI software 102 may further train an instance of a reference large language model (LLM) using the portion to generate simulated responses. For example, the ASAI software 102 can cause the ML model generation service 146 to further train an instance of a reference LLM by using the particular data portion of the multiple data portions corresponding to the youth life stage data of the life stage data. The ML model generation service 146 can further train the instance to generate simulated responses to questions that the person would have provided in the youth life stage of the person's life. In such an example, the ML model generation service 146 can further train the reference LLM to generate the first ASAI model 150 of FIG. 1B.

At block 610, the ASAI software 102 may determine whether to select another life stage to process. For example, the ML model generation service 146 can determine to process another life stage of the person, such as a mature life stage.

If, at block 610, the ASAI software 102 determines to select another life stage to process, control returns to block 606 to select another portion of life stage data (e.g., mature life stage data) to train another AI/ML model to simulate decision making of the person in the selected next life stage to process. Otherwise, control proceeds to block 612.

At block 612, the ASAI software 102 may store the further trained LLMs as a bank of age-stratified LLMs. For example, the ML service interface module 216 can receive the ASAI models 150, 152, 154 from the ML model generation service 146 and output them to the ASAI model datastore interface module 218. The ASAI model datastore interface module 218 can output the ASAI models 150, 152, 154 to the ASAI model datastore 120 of FIGS. 1A and/or 1B for storage in the ASAI model datastore 120 as the first bank of ASAI models 109 of FIG. 1A. After storing the further trained LLMs as a bank of age-stratified LLMs at block 612, the example flowchart 600 of FIG. 6 concludes.

FIG. 7 is a flowchart 700 representative of an example process that may be performed and/or example machine-readable instructions that may be executed by processor circuitry to implement the ASAI software 102 of FIGS. 1A, 1B, and/or 2, the ASAI governance service 104 of FIGS. 1A and/or 3, and/or, more generally, the system 100 of FIG. 1A and/or the system 140 of FIG. 1B.

The flowchart 700 of FIG. 7 begins at block 702, at which the ASAI software 102 may receive a prompt including a question. For example, the user interface module 202 of FIG. 2 can receive input from the user 110 via the electronic devices 112, 114, 116. The input can be a request to the ASAI software 102 to generate a panel of panelists respectively implemented by age-stratified LLMs, such as ones of the ASAI models 108, to generate simulated responses to the question.

At block 704, the ASAI governance service 104 may execute a first age-stratified LLM to generate a first simulated response to the question. For example, the first panelist 122 can be implemented by a first one of the ASAI models 108 trained to generate simulate responses to questions that a first person would have provided in a first life stage of their life. In such an example, the first virtual resource 410 can execute the first one of the ASAI models 108 using the question to generate a first simulated response to the question that the first person would have provided in the first life stage of their life. The first simulated response can be a simulated decision, recommendation, suggestion, statement, analysis, and/or thought by the first panelist 122.

At block 706, the ASAI governance service 104 may provide the prompt and/or the first simulated response to a second age-stratified LLM to generate a second simulated response to the question. For example, the second panelist 124 can be implemented by a second one of the ASAI models 108 trained to generate simulate responses to questions that a second person would have provided in a second life stage of their life. In such an example, the second virtual resource 412 can execute the second one of the ASAI models 108 using the question and/or the first simulated response to generate a second simulated response to the question and/or the first simulated response that the second person would have provided in the second life stage of their life. The second simulated response can be a simulated decision, recommendation, suggestion, statement, analysis, and/or thought by the second panelist 124.

At block 708, the ASAI governance service 104 may determine whether a decision and/or recommendation has been output by age-stratified LLMs. For example, the ASAI governance service 104 can determine that the panel 106 generated the panel output 426. In another example, the ASAI governance service 104 can determine that the panel 106 has not generated the panel output 426 and is still deliberating.

If, at block 708, the ASAI governance service 104 determines that a decision and/or recommendation has not been output by the age-stratified LLMs, control proceeds to block 710.

At block 710, the ASAI governance service 104 may cause the age-stratified LLMs to continue a dialogue about the question. For example, the ASAI governance service 104 can prompt the panelists 122, 124, 126 to continue the panel deliberation 424. In such an example, the ASAI governance service 104 can regenerate the prompt 408, using at least one of the first simulated response or the second simulated response, to facilitate the panel deliberation 424.

If, at block 708, the ASAI governance service 104 determines that a decision and/or recommendation has been output by the age-stratified LLMs, control proceeds to block 712.

At block 712, the ASAI governance service 104 may output the decision and/or recommendation. For example, the ASAI governance service 104 may output the panel output 426 to a requester, such as a machine user and/or the user 110. After outputting the decision and/or recommendation at block 712, the example flowchart 700 of FIG. 7 concludes.

Figure 8:
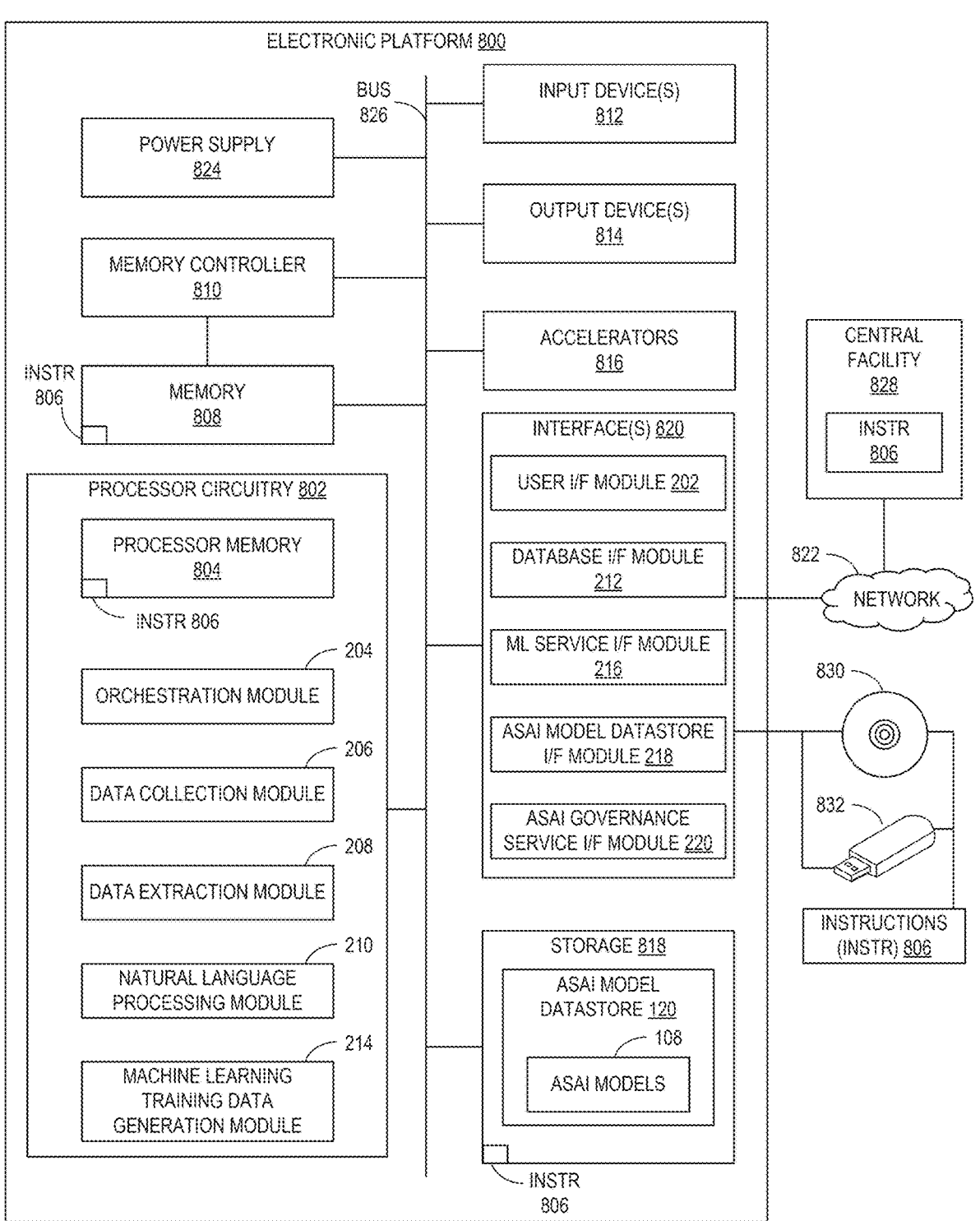
FIG. 8 is an example electronic platform structured to execute the machine-readable instructions of FIGS. 6 and/or 7 to implement the ASAI software of FIGS. 1A and/or 2, in accordance with some embodiments of the technology described herein.

FIG. 8 is an example implementation of an electronic platform 800 structured to execute the machine-readable instructions of FIGS. 6 and/or 7 to implement the ASAI software 102 of FIGS. 1A, 1B, and/or 2. It should be appreciated that FIG. 8 is intended neither to be a description of necessary components for an electronic and/or computing device to operate as the ASAI software 102, in accordance with the techniques described herein, nor a comprehensive depiction.

The electronic platform 800 of this example may be an electronic device, such as a handset device (e.g., a cellular network device, a smartphone, etc.), a desktop computer, a laptop computer, a tablet computer, a server (e.g., a computer server, a blade server, a rack-mounted server, etc.), a wearable device (e.g., an augmented reality and/or virtual reality (AR/VR) device, a heads-up display (HUD) device, smart glasses, smart goggles, etc.), a workstation, or any other type of computing and/or electronic device.

The electronic platform 800 of the illustrated example includes processor circuitry 802, which may be implemented by one or more programmable processors, one or more hardware-implemented state machines, one or more ASICs, etc., and/or any combination(s) thereof. For example, the one or more programmable processors may include one or more CPUs, one or more DSPs, one or more FPGAs, one or more GPUs, etc., and/or any combination(s) thereof. The processor circuitry 802 includes processor memory 804, which may be volatile memory, such as random-access memory (RAM) of any type. The processor circuitry 802 of this example implements the orchestration module 204, the data collection module 206, the data extraction module 208, the NLP module 210, and the ML training data module 214 of FIG. 2.

The processor circuitry 802 may execute machine-readable instructions 806 (identified by INSTRUCTIONS), which are stored in the processor memory 804, to implement at least one of the orchestration module 204, the data collection module 206, the data extraction module 208, the NLP module 210, or the ML training data module 214 of FIG. 2. The machine-readable instructions 806 may include data representative of computer-executable and/or machine-executable instructions implementing techniques that operate according to the techniques described herein. For example, the machine-readable instructions 806 may include data (e.g., code, embedded software (e.g., firmware), software, etc.) representative of the flowcharts of FIGS. 6 and/or 7, or portion(s) thereof.

The electronic platform 800 includes memory 808, which may include the instructions 806. The memory 808 of this example may be controlled by a memory controller 810. For example, the memory controller 810 may control reads, writes, and/or, more generally, access(es) to the memory 808 by other component(s) of the electronic platform 800. The memory 808 of this example may be implemented by volatile memory, non-volatile memory, etc., and/or any combination(s) thereof. For example, the volatile memory may include static random-access memory (SRAM), dynamic random-access memory (DRAM), cache memory (e.g., Level 1 (L1) cache memory, Level 2 (L2) cache memory, Level 3 (L3) cache memory, etc.), etc., and/or any combination(s) thereof. In some examples, the non-volatile memory may include Flash memory, electrically erasable programmable read-only memory (EEPROM), magnetoresistive random-access memory (MRAM), ferroelectric random-access memory (FeRAM, F-RAM, or FRAM), etc., and/or any combination(s) thereof.

The electronic platform 800 includes input device(s) 812 to enable data and/or commands to be entered into the processor circuitry 802. For example, the input device(s) 812 may include an audio sensor, a camera (e.g., a still camera, a video camera, etc.), a keyboard, a microphone, a mouse, a touchscreen, a voice recognition system, etc., and/or any combination(s) thereof.

The electronic platform 800 includes output device(s) 814 to convey, display, and/or present information to a user (e.g., a human user, a machine user, etc.). For example, the output device(s) 814 may include one or more display devices, speakers, etc. The one or more display devices may include an augmented reality (AR) and/or virtual reality (VR) display, a liquid crystal display (LCD), a light-emitting diode (LED) display, an organic light-emitting diode (OLED) display, a quantum dot (QLED) display, a thin-film transistor (TFT) LCD, a touchscreen, etc., and/or any combination(s) thereof. The output device(s) 814 can be used, among other things, to generate, launch, and/or present a user interface. For example, the user interface may be generated and/or implemented by the output device(s) 814 for visual presentation of output and speakers or other sound generating devices for audible presentation of output.

The electronic platform 800 includes accelerators 816, which are hardware devices to which the processor circuitry 802 may offload compute tasks to accelerate their processing. For example, the accelerators 816 may include artificial intelligence/machine-learning (AI/ML) processors, ASICs, FPGAs, graphics processing units (GPUs), neural network (NN) processors, systems-on-chip (SoCs), vision processing units (VPUs), etc., and/or any combination(s) thereof. In some examples, one or more of the orchestration module 204, the data collection module 206, the data extraction module 208, the NLP module 210, or the ML training data module 214 may be implemented by one(s) of the accelerators 816 instead of the processor circuitry 802. In some examples, the orchestration module 204, the data collection module 206, the data extraction module 208, the NLP module 210, and/or the ML training data module 214 may be executed concurrently (e.g., in parallel, substantially in parallel, etc.) by the processor circuitry 802 and the accelerators 816. For example, the processor circuitry 802 and one(s) of the accelerators 816 may execute in parallel function(s) corresponding to the ML training data module 214.

The electronic platform 800 includes storage 818 to record and/or control access to data, such as the machine-readable instructions 806. In this example, the storage 818 implements the ASAI model datastore 120 of FIGS. 1A and/or 1B, which stores the ASAI models 108 of FIGS. 1A and/or 1B. The storage 818 may be implemented by one or more mass storage disks or devices, such as HDDs, SSDs, etc., and/or any combination(s) thereof.

The electronic platform 800 includes interface(s) 820 to effectuate exchange of data with external devices (e.g., computing and/or electronic devices of any kind) via a network 822. In this example, the interface(s) 820 implement(s) the user interface module 202, the database interface module 212, the ML service interface module 216, the ASAI model datastore interface module 218, and the ASAI governance service interface module 220 of FIG. 2.

The interface(s) 820 of the illustrated example may be implemented by an interface device, such as network interface circuitry (e.g., a NIC, a smart NIC, etc.), a gateway, a router, a switch, etc., and/or any combination(s) thereof. The interface(s) 820 may implement any type of communication interface, such as BLUETOOTH®, a cellular telephone system (e.g., a 4G LTE interface, a 5G interface, a future generation 6G interface, etc.), an Ethernet interface, a near-field communication (NFC) interface, an optical disc interface (e.g., a Blu-ray disc drive, a Compact Disk (CD) drive, a Digital Versatile Disk (DVD) drive, etc.), an optical fiber interface, a satellite interface (e.g., a BLOS satellite interface, a LOS satellite interface, etc.), a Universal Serial Bus (USB) interface (e.g., USB Type-A, USB Type-B, USB TYPE-C™ or USB-C™, etc.), etc., and/or any combination(s) thereof.

The electronic platform 800 includes a power supply 824 to store energy and provide power to components of the electronic platform 800. The power supply 824 may be implemented by a power converter, such as an alternating current-to-direct-current (AC/DC) power converter, a direct current-to-direct current (DC/DC) power converter, etc., and/or any combination(s) thereof. For example, the power supply 824 may be powered by an external power source, such as an alternating current (AC) power source (e.g., an electrical grid), a direct current (DC) power source (e.g., a battery, a battery backup system, etc.), etc., and the power supply 824 may convert the AC input or the DC input into a suitable voltage for use by the electronic platform 800. In some examples, the power supply 824 may be a limited duration power source, such as a battery (e.g., a rechargeable battery such as a lithium-ion battery).

Component(s) of the electronic platform 800 may be in communication with one(s) of each other via a bus 826. For example, the bus 826 may be any type of computing and/or electrical bus, such as an I2C bus, a PCI bus, a PCIe bus, a SPI bus, a UCIe bus, and/or the like.

The network 822 may be implemented by any wired and/or wireless network(s) such as one or more cellular networks (e.g., 4G LTE cellular networks, 5G cellular networks, future generation 6G cellular networks, etc.), one or more data buses, one or more local area networks (LANs), one or more optical fiber networks, one or more private networks, one or more public networks, one or more wireless local area networks (WLANs), etc., and/or any combination(s) thereof. For example, the network 822 may be the Internet, but any other type of private and/or public network is contemplated.

The network 822 of the illustrated example facilitates communication between the interface(s) 820 and a central facility 828. The central facility 828 in this example may be an entity associated with one or more servers, such as one or more physical hardware servers and/or virtualizations of the one or more physical hardware servers. For example, the central facility 828 may be implemented by a public cloud provider, a private cloud provider, etc., and/or any combination(s) thereof. In this example, the central facility 828 may compile, generate, update, etc., the machine-readable instructions 806 and store the machine-readable instructions 806 for access (e.g., download) via the network 822. For example, the electronic platform 800 may transmit a request, via the interface(s) 820, to the central facility 828 for the machine-readable instructions 806 and receive the machine-readable instructions 806 from the central facility 828 via the network 822 in response to the request.

Additionally or alternatively, the interface(s) 820 may receive the machine-readable instructions 806 via non-transitory machine-readable storage media, such as an optical disc 830 (e.g., a Blu-ray disc, a CD, a DVD, etc.) or any other type of removable non-transitory machine-readable storage media such as a USB drive 832. For example, the optical disc 830 and/or the USB drive 832 may store the machine-readable instructions 806 thereon and provide the machine-readable instructions 806 to the electronic platform 800 via the interface(s) 820.

Figure 9:
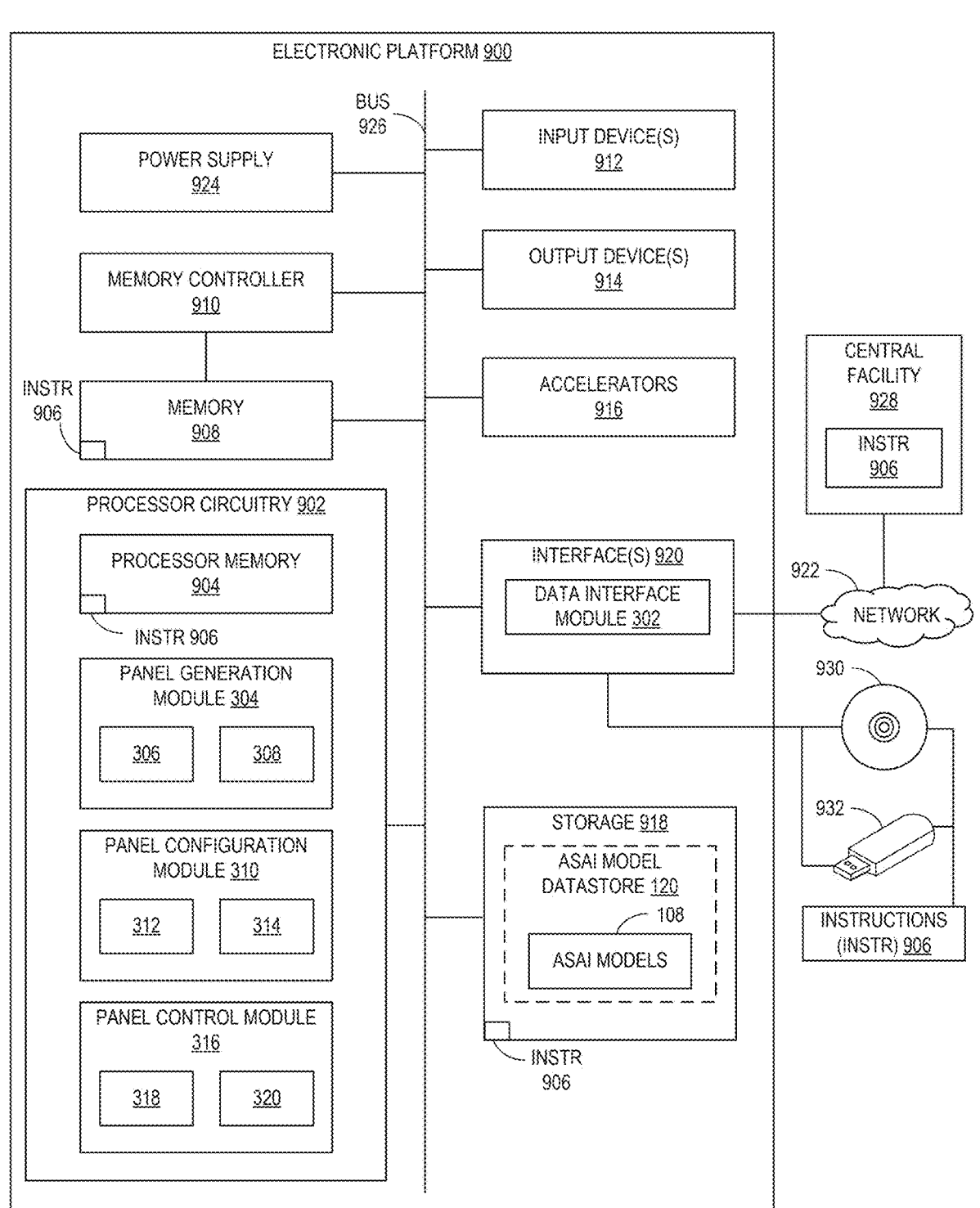
FIG. 9 is an example electronic platform structured to execute the machine-readable instructions of FIGS. 6 and/or 7 to implement the ASAI governance service of FIGS. 1A and/or 3, in accordance with some embodiments of the technology described herein.

FIG. 9 is an example implementation of an electronic platform 900 structured to execute the machine-readable instructions of FIGS. 6 and/or 7 to implement the ASAI governance service 104 of FIGS. 1A and/or 3. It should be appreciated that FIG. 9 is intended neither to be a description of necessary components for an electronic and/or computing device to operate as the ASAI governance service 104, in accordance with the techniques described herein, nor a comprehensive depiction. The electronic platform 900 of this example may be an electronic device, such as a server, a workstation, or any other type of computing and/or electronic device.

The electronic platform 900 of the illustrated example includes processor circuitry 902, which may be implemented by one or more programmable processors, one or more hardware-implemented state machines, one or more ASICs, etc., and/or any combination(s) thereof. For example, the one or more programmable processors may include one or more CPUs, one or more DSPs, one or more FPGAs, one or more GPUs, etc., and/or any combination(s) thereof. The processor circuitry 902 includes processor memory 904, which may be volatile memory. The processor circuitry 902 of this example implements the panel generation module 304, the ASAI selection module 306, the ASAI context augmentation module 308, the panel configuration module 310, the voting module 312, the petition module 314, the panel control module 316, the panel interface module 318, and the human intervention module 320 of FIG. 3.

The processor circuitry 902 may execute machine-readable instructions 906 (identified by INSTRUCTIONS), which are stored in the processor memory 904, to implement at least one of the panel generation module 304, the ASAI selection module 306, the ASAI context augmentation module 308, the panel configuration module 310, the voting module 312, the petition module 314, the panel control module 316, the panel interface module 318, or the human intervention module 320 of FIG. 3. The machine-readable instructions 906 may include data representative of computer-executable and/or machine-executable instructions implementing techniques that operate according to the techniques described herein. For example, the machine-readable instructions 906 may include data (e.g., code, embedded software (e.g., firmware), software, etc.) representative of the flowcharts of FIGS. 6 and/or 7, or portion(s) thereof.

The electronic platform 900 includes memory 908, which may include the instructions 906. The memory 908 of this example may be controlled by a memory controller 910. For example, the memory controller 910 may control reads, writes, and/or, more generally, access(es) to the memory 908 by other component(s) of the electronic platform 900. The memory 908 of this example may be implemented by volatile memory, non-volatile memory, etc., and/or any combination(s) thereof.

The electronic platform 900 includes input device(s) 912 to enable data and/or commands to be entered into the processor circuitry 902. For example, the input device(s) 912 may include an audio sensor, a camera (e.g., a still camera, a video camera, etc.), a keyboard, a microphone, a mouse, a touchscreen, a voice recognition system, etc., and/or any combination(s) thereof.

The electronic platform 900 includes output device(s) 914 to convey, display, and/or present information to a user (e.g., a human user, a machine user, etc.). For example, the output device(s) 914 may include one or more display devices, speakers, etc. The output device(s) 914 can be used, among other things, to generate, launch, and/or present a user interface. For example, the user interface may be generated and/or implemented by the output device(s) 914 for visual presentation of output and speakers or other sound generating devices for audible presentation of output.

The electronic platform 900 includes accelerators 916, which are hardware devices to which the processor circuitry 902 may offload compute tasks to accelerate their processing. For example, the accelerators 816 may include AI/ML processors, ASICs, FPGAs, GPUs, NN processors, SoCs, VPUs, etc., and/or any combination(s) thereof.

In some examples, one or more of the panel generation module 304, the ASAI selection module 306, the ASAI context augmentation module 308, the panel configuration module 310, the voting module 312, the petition module 314, the panel control module 316, the panel interface module 318, and/or the human intervention module 320 may be implemented by one(s) of the accelerators 916 instead of the processor circuitry 902. In some examples, the panel generation module 304, the ASAI selection module 306, the ASAI context augmentation module 308, the panel configuration module 310, the voting module 312, the petition module 314, the panel control module 316, the panel interface module 318, and/or the human intervention module 320 may be executed concurrently (e.g., in parallel, substantially in parallel, etc.) by the processor circuitry 902 and the accelerators 916. For example, the processor circuitry 902 and one(s) of the accelerators 916 may execute in parallel function(s) corresponding to the panel generation module 304.

The electronic platform 900 includes storage 918 to record and/or control access to data, such as the machine-readable instructions 906. In this example, the storage 918 may optionally implement the ASAI model datastore 120, which stores the ASAI models 108. The storage 918 may be implemented by one or more mass storage disks or devices, such as HDDs, SSDs, etc., and/or any combination(s) thereof.

The electronic platform 900 includes interface(s) 920 to effectuate exchange of data with external devices (e.g., computing and/or electronic devices of any kind) via a network 922. In this example, the interface(s) 920 implement(s) the data interface module 302 of FIG. 3.

The interface(s) 920 of the illustrated example may be implemented by an interface device, such as network interface circuitry, a gateway, a router, a switch, etc., and/or any combination(s) thereof. The interface(s) 920 may implement any type of communication interface, such as BLUETOOTH®, a cellular telephone system, an Ethernet interface, an NFC interface, an optical disc interface, an optical fiber interface, a satellite interface, a USB interface, etc., and/or any combination(s) thereof.

The electronic platform 900 includes a power supply 924 to store energy and provide power to components of the electronic platform 900. The power supply 924 may be implemented by a power converter, such as an AC/DC power converter, a DC/DC power converter, etc., and/or any combination(s) thereof. For example, the power supply 924 may be powered by an external power source, such as an AC power source, a DC power source, etc., and the power supply 924 may convert the AC input or the DC input into a suitable voltage for use by the electronic platform 900. In some examples, the power supply 924 may be a limited duration power source, such as a battery.

Component(s) of the electronic platform 900 may be in communication with one(s) of each other via a bus 926. For example, the bus 926 may be any type of computing and/or electrical bus, such as an I2C bus, a PCI bus, a PCIe bus, a SPI bus, a UCIe bus, and/or the like.

The network 922 may be implemented by any wired and/or wireless network(s) such as one or more cellular networks, one or more data buses, one or more LANs, one or more optical fiber networks, one or more private networks, one or more public networks, one or more WLANs, etc., and/or any combination(s) thereof. For example, the network 922 may be the Internet, but any other type of private and/or public network is contemplated.

The network 922 of the illustrated example facilitates communication between the interface(s) 920 and a central facility 928. The central facility 928 in this example may be an entity associated with one or more servers, such as one or more physical hardware servers and/or virtualizations of the one or more physical hardware servers. For example, the central facility 928 may be implemented by a public cloud provider, a private cloud provider, etc., and/or any combination(s) thereof. In this example, the central facility 928 may compile, generate, update, etc., the machine-readable instructions 906 and store the machine-readable instructions 906 for access (e.g., download) via the network 922. For example, the electronic platform 900 may transmit a request, via the interface(s) 920, to the central facility 928 for the machine-readable instructions 906 and receive the machine-readable instructions 906 from the central facility 928 via the network 922 in response to the request.

Additionally or alternatively, the interface(s) 920 may receive the machine-readable instructions 906 via non-transitory machine-readable storage media, such as an optical disc 930 (e.g., a Blu-ray disc, a CD, a DVD, etc.) or any other type of removable non-transitory machine-readable storage media such as a USB drive 932. For example, the optical disc 930 and/or the USB drive 932 may store the machine-readable instructions 906 thereon and provide the machine-readable instructions 906 to the electronic platform 900 via the interface(s) 920.

I. Further Discussion of Embodiments Disclosed Herein

Embodiments as disclosed herein include systems and methods for constructing and deploying Specialized Artificial Intelligences (SAIs) that simulate the reasoning and decision-making processes of historical figures. The SAIs can be implemented by the ASAI models 108. The disclosure includes specialized mechanisms for temporal stratification, contextual augmentation, and intertemporal dialogue among the ASAI models 108 representing human persons, which may be historical figures.

Embodiments disclosed herein include systems and methods for constructing and deploying historically grounded AI models that simulate the cognitive and decision-making traits of real historical figures. Some such embodiments include segmenting training data by chronological life stages to reduce causal inconsistency, augmenting the AI models with supplemental historical and geopolitical information, and facilitating simulated inter-temporal dialogue among multiple AI models. In some embodiments, the system and methods may further incorporate a mediation process, which may include human intervention in order to maintain logical coherence and mitigate temporal or semantic bias in simulated discussions. Example applications include education, policy advisory, science advisory, historical analysis, and media content generation.

A. Segment Data by Life Stage

Stratified training differs from conventional approaches that train on a full, undifferentiated corpus of biographical data. Embodiments disclosed herein include integration of life-stage stratification of training data into the systems 100, 140 for simulating intertemporal discourse among historically grounded AI models to effectuate improvements over such conventional approaches. Beneficially, stratification is a preferred, distinguishing feature whose implementation improves causal consistency, reduces temporal artifacts, and enhances realism of the decision making simulation by the ASAI models 108.

Although the embodiments disclosed herein are broadly applicable to any historical personage for whom sufficient biographical and contextual data exist, some such embodiments can be directed towards simulating the decision making of U.S. presidents to demonstrate feasibility and relevance. For example, several terabytes (TB) of high-quality data are available for a typical 20th or 21st century president, allowing the creation of the ASAI models 108 for multiple strata, each with hundreds of millions of parameters.

In some embodiments, segmentation of presidential data by life stage (e.g., life stage data) can begin with cleansing and normalization so that only relevant, high-quality, text-based narrative content is retained. Data is then temporally tagged by assigning dates or stages to each document or paragraph. Dates are extracted from document metadata, file names, or publication references and NLP is used to detect dates within the text. Temporal tagging tools (e.g., HeidelTime, SUTime) can identify and normalize expressions such as "in 1964", "at the age of 46," or "during his years as senator." Life events—personal, political, professional—are tied back to the president to ensure date relevance (e.g., "He graduated in 1948"→"The president graduated in 1948"). Confidence levels can be assigned to dates, and low-confidence segments are discarded or reprocessed.

B. Identify and Eliminate Biased Content

Embodiments disclosed herein can implement a systematic approach to source criticism and, at a minimum (i) assess and eliminate subjective phrases (e.g., a bold initiative, a disastrous policy) and sentiment skewed terms (e.g., radical, reactionary), (ii) identify and label sources (e.g., primary, secondary, etc.) and (iii) compare information from multiple sources. More generally, embodiments disclosed herein can use a combination of automated and human-review processes employing lexical algorithms that scan for subjective phrases and sentiment-skewed terms; use statistical methods that compare the distributions of different viewpoints; search for sources flagged based on metadata, credibility ratings or known bias classifications; make maximum use of human annotated (e.g., crowd-source and expert reviewed) sources and, where possible, employ context-aware ASAI models, which can assist in detecting and minimizing subjective content.

C. Create AIs for Each Life Stage

Embodiments disclosed herein may assign text segments to life stages using rule-based or ML classifiers. Rules may include keyword detection or date-based criteria, while ML classifiers may use supervised algorithms such as support vector machines (SVMs), random forests, or fine-tuned Bidirectional Encoder Representations from Transformers (BERT) models, depending on data availability and complexity. Features may include named entities, events, or characteristic phrases.

Additionally and/or alternatively, embodiments disclosed herein may cluster each life-stage dataset by topics such as education, law, or diplomacy using embedding-based techniques (e.g., Sentence-BERT with KMeans or agglomerative clustering) to enhance semantic coherence.

Embodiments disclosed herein may prepare tokenized input sequences within model constraints (e.g., 1024 tokens for BERT-like models) using appropriate tokenizers and context-preserving methods. Train attention-based transformer models for each life stage, optimizing parameters using methods such as Adam or AdamW until validation loss stabilizes or a compute budget is reached.

D. An Example of Stratification: Six Life Stages

For a president with 4 TB of data, the systems 100, 140 can divide data (e.g., content) into six life stages: the first and last with equal data volume, and the middle stages with double the volume. Approximately 2 trillion tokens may support models with up to 10 billion parameters, comparable to Generative Pre-trained Transformer 3 (GPT-3) scale models.

E. An Example Transformer Implementation i. Data Characteristics: The systems 100, 140 can train the ML model on high-quality textual data encompassing speeches, press conferences, internal memos, policy documents, correspondence, and potentially transcripts of meetings and phone calls from presidents during their active and mature political careers. Substantial portions of the data can be in the presidential library, and the data can be assumed to be rich in demonstrations of complex reasoning, strategic planning, and sophisticated communication.

ii. Input Tokenization and Embedding Layer: The systems 100, 140 can tokenize the input using vocabulary appropriate for political and policy discourse (e.g., WordPiece or Sentence Piece). The systems 100, 140 can map each token to a high-dimensional embedding vector having a sufficiently large dimension (e.g., 768 or 1024) to capture semantic nuances. The systems 100, 140 can add standard or learned positional embeddings to the word embeddings to provide the model with information about the order of tokens in the input sequence.

iii. Encoder/Decoder Layers (Multiple Stacks): In some embodiments, the systems 100, 140 can use transformer architectures with encoder-decoder layers, residual connections, and attention mechanisms. Training may involve autoregressive objectives, and action evaluation may include a separate value network trained via reinforcement learning or regression loss. Additionally and/or alternatively, each decoder layer may include a multi-head attention mechanism that attends to the output of the final encoder layer. This allows the decoder to focus on the relevant parts of the input context when generating the next token in the action sequence.

F. Augment the SAI with Geopolitical Information on Key Events from the Decade Prior to and During a President's Term in Office Embodiments disclosed herein may represent a broader and richer age stratified and/or age segmented AI that retains the thought processes of the SAI. In some embodiments, each SAI (e.g., each of the ASAI models 108) may be augmented by incorporating geopolitical data covering the decade prior to and during the president's term. Relevant events may include wars, political shifts, economic crises, technological advancements, social movements, treaties, and changes in global power structures. Source data from scholarly archives, government records, news archives, non-government organization (NGO) reports, and carefully filtered public sources like Wikipedia, in addition to presidential libraries may be used. The systems 100, 140 can apply the same debiasing and contextualization procedures discussed above.

G. Retain the Core Character of the SAI

Presidents make thousands of decisions. Some would have been the same no matter who was president, some are the result of philosophical convictions (e.g., former U.S. President John F. Kennedy might have been less hawkish than former U.S. President Lyndon B. Johnson on the Vietnam War), some are a combination of philosophy and politics (e.g., not every president would have engaged in nuclear arms limitation with Mikhail Gorbachev as Ronald Reagan did). Aside from war and peace decisions, some decisions are a routine part of presidential responsibility, such as agreeing to or vetoing legislation (e.g., former U.S. President William J. Clinton vetoed 37 bills, Reagan vetoed 78, etc.). Whatever the number and nature, they can be laid out as a binary vector (e.g., yes/no) and the goal would be to keep some elements invariant as the exposure to a wider range of information increases. This can be done by, for example, reinforcement learning (RL) techniques such as reward-based RL where a model receives rewards or penalties for actions; weighted loss functions; data sampling strategies; and the use of attention mechanisms to prioritize relevant data while reducing influence from less critical information.

H. Communicate Between Non-Contemporary ASAIs

Unlike conventional simulations constrained by fixed historical timelines, the present disclosure enables temporally dynamic reasoning by facilitating context-augmented dialogue between temporally disparate ASAIs. In some embodiments, a younger ASAI instance can be augmented with knowledge of events occurring after its active period, while preserving its characteristic reasoning profile. This can be achieved by generating new data segments representing the intervening historical events and annotating later life-stage segments with such contextual information. A separate, linked dataset may be maintained to support reference during simulated interactions. In some embodiments, this dataset may be implemented as a timestamped knowledge graph that links historical events, individuals, and geopolitical relationships, allowing dialogue context to be inferred based on temporal proximity and thematic association. Where feasible, the system can integrate multiple perspectives on these events to enhance historical fidelity.

In some embodiments, a human mediator may be incorporated into the system (e.g., via the human intervention module 320 of FIG. 3) to oversee and assist interactions between ASAI instances and human stakeholders. In addition to facilitating technical communication, the human mediator may also serve as an ethical safeguard, identifying inconsistencies, contextual gaps, or morally significant content that warrants further review-especially in historically sensitive simulations.

In some such embodiments, a human mediator can enable communication between two ASAIs, iteratively feeding the output of one ASAI to the other. The mediator might have other important functions as well, such as (i) ensuring that each ASAI's output is understandable and relevant to the other, given their different temporal contexts. This might involve providing brief summaries of historical events or clarifying terminology. The mediator may (ii) provide prompts or questions to guide the conversation and keep it focused, especially in the early stages of the interaction. The mediator may (iii) identify and flag potential biases that might arise during the conversation, even after the initial debiasing of the data. The mediator may (iv) intervene to ensure that the conversation remains coherent and that the ASAIs' responses are logically connected. The mediator may (v) handle technical aspects of the interaction, such as ensuring that the data are correctly processed and that the system is functioning properly. Some embodiments may eschew, or at least minimize, human intervention.

To illustrate the inter-temporal dialogue capabilities of the disclosure, consider how a hypothetical conversation between former U.S. Presidents John F. Kennedy and George W. Bush might be developed. The system 100, 140 may begin by augmenting President Kennedy's ASAI model with contextual information on events between 1964 and 2008 such as those leading to the dissolution of the Soviet Union, subsequent NATO expansion Eastward and so on, including careful debiasing of the information and contextualization for both Kennedy and Bush. The latter for Bush would include the shift form a bipolar to a unipolar world, with the downfall of the USSR leaving the US as the world's only hegemon, and the belief that democratizing Ukraine and Georgia would stabilize that region of the world.

I. Form Committees of ASAIs with Members Drawn from Arbitrary Time Stages

In some embodiments, bipartisan committees or committees with any party distribution can be formed to evaluate the relative importance of different influences on viewpoints and carry out deep analyses of counterfactual dynamics. Data can be drawn from the same sources, debiasing precedes as above, as does integration of contextualized information into SAI data.

J. Use Cases

Example use cases and/or applications for embodiments disclosed herein include educational simulations of historical debates, policy advisory based on legacy decision-making frameworks, research into counterfactual historical analysis, and entertainment and media content generation.

K. Governance Framework

The governance framework as disclosed herein can operate in conjunction with an ASAI platform, such as the ASAI software 102, where each ASAI model is assigned an age level corresponding to maturity and access privileges. For each decision task, a dynamic committee can be formed from ASAI models of varying ages. The system 100, 140 can dynamically determine the composition of the committee based on the nature and scope of the decision, ensuring diverse representation across developmental age levels relevant to the domain of inquiry. Decision-making can follow a protocol selected from:

Simple Majority Vote among ASAI instances.

Weighted Voting, wherein older ASAI instances have greater weight.

Consensus threshold mechanisms require agreement across specified age levels.

In some embodiments, no human or organizational entity is part of the ASAI committee. In some such embodiments, the committee consists solely of ASAI models (e.g., ML-enabled agents).

In some embodiments, the framework enforces strict communication rules:

Older ASAI models may communicate knowledge summaries to younger ASAI models.

Younger ASAI models cannot revise or transmit information to older ASAI models.

L. Design Principle: Inter-Temporal Communication Constraint Rationale

In some embodiments, the systems 100, 140 can implement a rule prohibiting younger ASAI models from transmitting information to older ASAI models, which can be grounded in the following example ethical and structural considerations:

It mirrors human cognitive development; wherein past stages of understanding cannot be altered by future knowledge. It preserves the developmental integrity and decision traceability of older ASAI instances. It prevents ethical breaches or manipulation by ensuring that knowledge flows only forward in time. It eliminates logical paradoxes and temporal feedback loops that could undermine decision accountability.

In some embodiments, the governance framework includes a petition mechanism, which can be implemented by the petition module 314 of FIG. 3, whereby younger ASAI models may submit non-binding recommendations to human overseers (e.g., via the human intervention module 320) concerning decisions made by older ASAI models. In some embodiments, the petitions may be enriched with metadata such as confidence scores, relevance tags, and/or historical precedents to assist human interpretation and traceability. In some such embodiments, these petitions do not alter the internal state of the older ASAI models and can be intended solely to inform human oversight without compromising the inter-temporal communication constraint.

In some embodiments, every decision output can be accompanied by a traceability log, recording one or more of a plurality of example parameters:

Committee composition (ASAI instance IDs, age levels);

Voting results and rationale; and

Any human interventions applied.

In some embodiments, the human oversight interface (e.g., implemented by the human intervention module 320) can include a software dashboard (e.g., GUI(s)) that can display flagged ASAI committee decisions, highlight ethical risk scores based on predefined criteria, and allow authorized human reviewers to approve, modify, or override proposed actions. The interface may also include a log of decision rationale, voting weights, and prior interventions to support transparency and auditability. Flagged decisions may be subjected to external ethical review where applicable.

M. Example Use Case: Foreign Policy Decision Request

By way of example, the ASAI software 102 can receive a request, such as from a machine user and/or the user 110 of FIG. 1A. The request can be: "Should the United States covertly support a regime change in Country X, where the existing government is accused of systemic human rights violations but maintains regional stability?"

i. Committee Formation

A temporary committee of age stratified knowledge augmented special AIs (ASAIs) is instantiated, drawing from multiple presidential models across developmental stages e.g., Former U.S. Presidents John F. Kennedy (in a mature life stage), Harry S. Truman (in an elder life stage), Barack H. Obama (in a mature life stage), Abraham Lincoln (in a youth life stage). For example, the panel 106 of FIG. 1A can include four of the ASAI models 108, each corresponding to one of these former U.S. presidents. Each ASAI can be tagged with an age level, which can determine voting weight and/or access privileges.

ii. Context

The question requires:

Brief history of Country X;

Parallel case studies (e.g., Iran 1953, Chile 1973, Libya 2011);

Current geopolitical consequences and humanitarian risks; and

Contextual information from intervening decades is only shared from older to younger ASAIs to preserve the inter-temporal communication constraint.

For example, the ASAI software 102 can retrieve this information from the contextual data datastores 128 of FIG. 1A.

iii. Voting Protocol

A weighted vote can be conducted:

Truman (Elder ASAI): Vote weight 3—Supports intervention;

Obama (Mature ASAI): Vote weight 2—Opposes intervention;

Lincoln (Youth ASAI): Vote weight 1—Opposes intervention; and

Kennedy (Youth ASAI): Vote weight 1—Supports intervention.

Total weight: 7

Votes in favor: 4 (Truman+Kennedy); and

Votes against: 3 (Obama+Lincoln).

A 75% consensus threshold (e.g., a voting threshold) is required for covert actions.

Result: Decision fails to reach required consensus and is initially blocked. For example, the result can be the panel output 426 of FIG. 4.

iv. Petition Mechanism Activation

Kennedy ASAI, despite being the youngest, can submit a non-binding petition supporting the intervention. His rationale can include:

The humanitarian imperative;

A belief that early, covert action could prevent greater harm later; and

A comparison to early Cold War interventions viewed favorably by history.

v. Human Oversight

The petition can be flagged on the dashboard implemented by the human intervention module 320. For example, a human overseer can review:

Petition content;

Traceability log of the decision; and

Rationale for majority outcome.

The human can have the option to:

Let the decision stand;

Modify it; or

Trigger an external ethical review or expand the committee.

The intent of this example is to display an example range of decisions in the Governance Framework: (i) integration of history, temporal integrity, human ethical oversight (ii) a real-world policy question with long-term and morally complex implications and (iii) describe weighted voting to the petition mechanism.

vi. Outcome

The human overseer can opt to pause execution and escalate to an ethics advisory board, noting the petition's high-confidence risk projection and analog to Libya 2011.

N. Example Use Case: Gene Editing Policy for Germline Modifications

By way of example, the ASAI software 102 can receive a request, such as from a machine user and/or the user 110 of FIG. 1A. The request can be: "Should the U.S. revise its regulatory framework to permit inheritable genome editing for disease prevention, provided long-term multi-generational safety monitoring is in place?"

i. Committee Formation

Ones of the ASAI models 108 with philosophical, biomedical, and societal experience are assembled, including:

Abraham Lincoln (Elder ASAI) ethical frameworks and justice;

Dwight Eisenhower (Mature ASAI) science and federal regulation;

Barack Obama (Mature ASAI) biomedical ethics and policy; and

George Washington (Elder ASAI) foundational liberties.

ii. Contextual Augmentation

ASAIs can receive:

Reports from NIH, WHO, and UNESCO on germline policy;

CRISPR-Cas9 advancements and target error rates;

Societal acceptance models and intergenerational equity considerations; and

Comparisons to 20th century eugenics programs.

iii. Deliberation and Voting

A supermajority (4 of 4) is required due to ethical gravity.

Lincoln: Opposes—concerned about commodification and social inequality.

Eisenhower: Opposes—calls for global consensus first.

Obama: Supports conditionally—requires oversight bodies and moratorium periods.

Washington: Opposes—warns against centralization of biological control.

Result: 1 in favor, 3 opposed→Reform blocked. For example, the result can implement the panel output 426 of FIG. 4.

iv. Petition Mechanism

The Obama ASAI can submit a petition recommending: Federal bioethics board convening:

A pilot program limited to severe monogenic disorders; and

A global coalition formation before national legislation.

v. Human Oversight Interface

The petition is flagged and logged in a data log. A human reviewer or a human review board can use the arguments recorded in the data log to draft a nonbinding policy roadmap that frames U.S. participation in the next international summit.

II. Further Benefits of Embodiments Disclosed Herein

Unlike current monolithic AI systems, the ASAI system (e.g., the system 100 of FIG. 1A) can generate a panel of ASAI models 108 to effectuate a deliberative process, not just a response to a query. For example, in some embodiments, no single ASAI model may unilaterally determine outcomes when part of a larger panel. In such an example, ASAI models of the panel can influence each other's outputs.

Beneficially, the ASAI models 108 are inherently more transparent over conventional AI models because: (i) each ASAI model can be developed and fine-tuned independently with respect to a specific developmental stage, enabling a clearer audit trail for how judgments evolve from early impressions to mature conclusions; (ii) the age segmentation structure exposes the internal deliberative arc of reasoning, making it easier to see how early ethical intuitions are weighed, refined, or revised; (iii) by contrast, a non-segmented AI model collapses this progression into a single opaque model, reducing the system's explainability.

Beneficially, the ASAI models 108 enable structured internal and inter-agent deliberation. For example, ethical and cognitive diversity across age segments can ensure that each decision incorporates perspectives at varying levels of maturity. In some embodiments, in a committee (e.g., a panel) of ASAI models 108, deliberation can occur not just between agents, but within each agent across segments. In some such embodiments, this deliberation across agents and/or segments enriches the discussion by surfacing ethical conflicts and resolving them through layered reasoning. A committee of conventional AI models, even if fine-tuned differently, lacks this structured temporal layering, making its deliberations shallower and more prone to premature consensus or bias.

Beneficially, the ASAI models 108 achieve superior traceability over conventional AI models because: (i) each decision output from the ASAI models 108 can be traced through the dialogue and influence chain across segments (e.g., what the youth ASAI model proposed, how the mature ASAI model modified it, and how the elder ASAI model resolved tensions between the youth and mature ASAI models). The system 100 can generate segment-specific logs to provide a chronological and developmental narrative for how a conclusion was reached. Conventional AI models, being monolithic, typically offer a single-layer explanation at best, which is more difficult to audit or replicate.

Beneficially, the ASAI models 108 can mitigate hallucinations more effectively compared to conventional AI models because the age structure of the ASAI models 108 acts as a natural filter. For example, hallucinations generated in younger ASAI models (due to limited context or impulsive heuristics) are more likely to be flagged and corrected by maturer ASAI models with broader context and more deliberative processing. Maturer ASAI models (e.g., mature ASAI models, elder ASAI models) are especially tuned for consistency, realism, and factual anchoring, serving as a check on speculative or flawed intermediate outputs. In some embodiments, if a hallucination temporarily influences the deliberation but is later disproven by one(s) of the ASAI models of the panel, the panel's traceable reasoning path (e.g., the logs) allows rollback or annotation. Such annotation can be used to generate corrective memories to be added to ethical memory stores of the ASAI models to reduce recurrence. With respect to conventional AI models, any hallucination is likely to be absorbed into the output stream without this internal corrective mechanism.

Beneficially, a panel of ASAI models 108 as disclosed herein can be configured to favor traceable, cross-examined, and explainable reasoning through a structured deliberation protocol in which each ASAI model submits not only its conclusions but also the rationale, evidence sources, and ethical priors that informed its position. In some embodiments, these rationales are logged with timestamps and participant identifiers (e.g., identifiers that identify the ASAI model that generated the output), forming a transparent provenance layer that can be audited in real time or retrospectively. During deliberation, ASAI models can evaluate and respond to each other's reasoning, highlighting inconsistencies, unsupported assumptions, or potential hallucinations. Beneficially, this interactive process enables cross-examination and iterative refinement, ensuring that no segment's contribution is accepted without scrutiny. Additionally, the panel can be configured to operate under a set of constitutional norms and deliberative rules that guide reasoning toward consensus based on coherence, relevance, and normative alignment, thereby enhancing both the explainability and integrity of the committee's final outputs.

Beneficially, the ASAI models 108 explicitly preserve and differentiate ethical memory across time. For example, ethical learning is contextualized within each life stage, maintaining fidelity to how individuals evolve in their moral reasoning. Historical grounding (e.g., training segments on the values and constraints relevant to their developmental period) prevents retroactive overwriting or rationalization of early ethical experiences. In contrast, conventional AI models risk "ethical flattening" over time—where initial values are revised or erased without trace, especially if new data or tuning shifts the model's overall distribution.

The above-noted technological benefits support a more robust, auditable, and ethically sustainable form of AI governance than using one or more conventional AI models.

III. Overview of the Embodiments Disclosed Herein

Some embodiments disclosed herein achieve transparent, traceable, and accountable AI/ML governance by instantiating a deliberative committee of cognitively differentiated AI/ML agents in which information is constrained to flow from the more to less mature cognitive state (e.g., the more mature ASAI models to the less mature ASAI models). Such information flow constraints are important to achieve reliable AI recommendations in high-stakes, compliance-heavy sectors. Examples of such sectors include healthcare, biotech, foreign policy, and finance.

More particularly, some embodiments disclosed herein establish a rule-based sequence of operations that governs how AI/ML agents form committees, exchange information, deliberate, and reach decisions. The sequence includes established roles (e.g., maturity level, ethical scope), explicit interaction rules (e.g., one-way influence), decision protocols (e.g., voting, escalation, logging) and preconditions for human arbitration. This is in distinct contrast to non-deliberative AI (e.g., Reinforcement Learning from Human Feedback (RLHF), Constitutional AI by Anthropic PBC), which is a single output generator with no structured exchange among AI/ML agents based on preference ranking or static rules, with no architectural traceability no agent-specific logs and no situational or ethical memory.

By way of example, non-deliberative committees, or AI systems lacking structured internal deliberation, typically operate through parallel or majority-rule aggregation of model outputs without requiring agents to engage with or critique one another's reasoning. This results in shallow consensus that obscures the rationale behind individual contributions and fails to expose logical gaps, hallucinations, or unsupported inferences. Without deliberation—e.g., reciprocal examination and challenge of reasoning—the system cannot produce traceable rationales, nor can it ensure that conclusions reflect a meaningful synthesis of diverse perspectives. Such architectures often rely on post-hoc explainability tools that approximate reasoning after the fact, rather than surfacing the deliberative steps that led to a decision.

Even when deliberation is present, the absence of directional constraints on information flow-such as requiring influence to proceed from more to less mature cognitive states-leaves non-deliberative committee systems vulnerable to spurious reasoning from agents that lack sufficient contextual grounding or ethical sophistication. In unconstrained settings, immature or heuristically-driven agents can unduly sway outcomes or introduce hallucinated claims that are not systematically filtered or corrected. This not only undermines the integrity of the decision-making process but erodes transparency and auditability, since there is no principled path for tracing how the final decision emerged from the committee's interactions.

Some embodiments disclosed herein overcome the technological shortcomings of such non-deliberative committee systems by formalizing the deliberative process through cognitive role differentiation, interaction constraints, and traceable information exchange. In some such embodiments, this structure ensures that each decision emerges from a documented sequence of reasoned engagements in which only AI/ML agents with broader ethical context and deeper situational awareness can influence the judgments of narrower or less context-aware counterparts. The result is a system that mirrors human deliberative norms, enhances accountability, and sharply reduces hallucinations by design—not as an afterthought.

Figure 10:
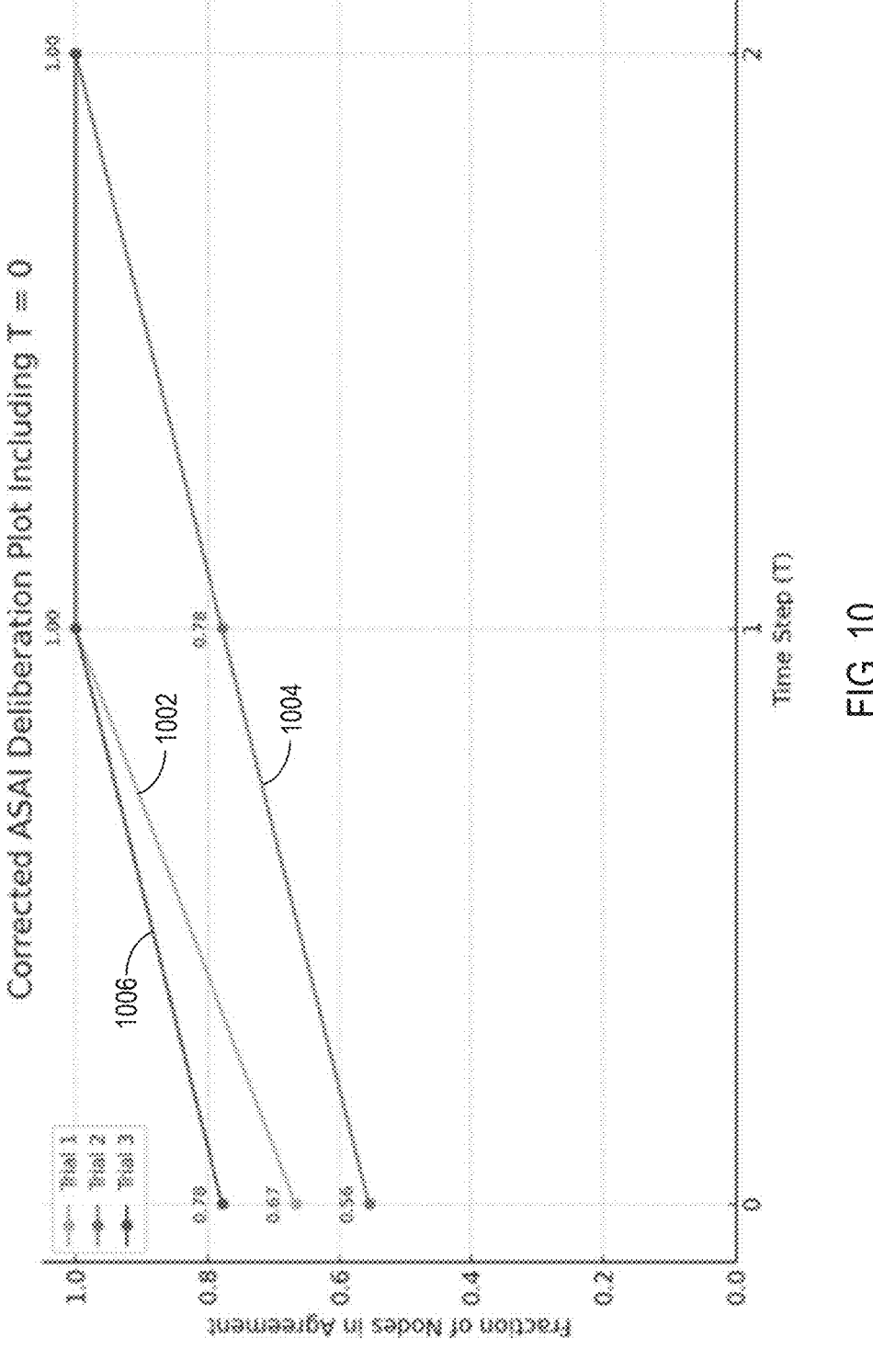
FIG. 10 shows a plot of three example simulations of deliberation among multiple ASAI models, in accordance with some embodiments of the technology described herein.

As shown in FIG. 5B, the dynamics of deliberation for a 3 agent committee, each agent having 3 cognitive states, can lead to a directed graph with 45 links and behave as a cellular automaton. Example simulations of such a configuration are shown in FIG. 10, which shows a plot 1000 of three simulations represented by respective plots 1002, 1004, 1006. The plots 1002, 1004, 1006 include a first plot 1002 representative of a first simulation (identified by "Trial 1"), a second plot 1004 representative of a second simulation (identified by "Trial 2"), and a third plot 1006 representative of a third simulation (identified by "Trial 3").

The plots 1002, 1004, 1006 represent respective simulations of three of the ASAI models 108 for the time course of exchanges as an ASAI committee deliberation moves toward a recommendation. The structure of the network and the flow of information among the three ASAI models 108 is shown in FIG. 5B (e.g., 45 paths between 9 nodes 3 ASAI models each having 3 subunits). Suppose each node in the second information flow diagram 510 of FIG. 5B can be in one of two states, e.g., 0 or 1 depending on its response to a query. In the simulations, 0 or 1 may be randomly assigned to each node. In the simulations, the second information flow diagram 510 may be updated as follows: for any given node if $\frac{2}{3}$ or more of the inputs have a state that is different from the state of that node, change its state; all nodes change at the same time, e.g., the entire system is updated all at once, not sequentially. The simulations may generate and/or output a table of the fraction of nodes in agreement after T updates, where T>20 is not exceeded, but iterations can stop earlier if 2 successive updates do not change the state of the system.

In an example implementation of the embodiment shown in FIG. 5B, there are 3 agents each with 3 cognitive levels: young, moderately mature and fully mature. The flow is one way, from more to less mature, resulting in the network of nine nodes and 45 links ss shown. The dynamic, e.g., progress toward a consensus, can be modeled as a cellular automaton, in which the state of a node depends on the states of its neighbors. The process starts when the same query is fed into each node (e.g., the ASAI model). The ASAI model, then considers it and agrees or disagrees in accordance with its ethical memory, e.g., the context in which the ASAI model was trained to simulate how the person lived and learned. The state of each segment is a 1 or a 0 which, for the purpose of the illustration, is initially assigned randomly. The network is updated according to a rule which in this case is: if $\geq\frac{2}{3}$ of neighbors disagree with a node, the node switches state. The updates of all nodes occur synchronously. The source code 1100 tracks the fraction of node in agreement as a function of time and stops when the system stabilizes or reaches a human set time limit. The plots 1002, 1004, 1006 shown in FIG. 10 shows example results for 3 different starting conditions: Trial 1 began with 66.7% agreement; Trial 2 began with 55.6% agreement and Trial 3 began with 77.8% agreement.

Example source code 1100 shown in FIGS. 11A-11B can be executed for the above task. The source code 1100 is shown as Python code but may be written in a different programming language. First results for executing the task are shown in FIG. 10 as the first plot 1002, and as shown in FIG. 10, the entire process is repeated 2 more times (beginning with the assignment of random states to the nodes) and shown as the second plot 1104 and the third plot 1106.

As shown in FIG. 10, the first plot 1002 represents a first simulation in which the nodes of FIG. 5B began with 66.7% agreement. As shown in FIG. 10, the second plot 1004 represents a second simulation in which the nodes of FIG. 5B began with 55.6% agreement. As shown in FIG. 10, the third plot 1006 represents a third simulation in which the nodes of FIG. 5B began with 77.8% agreement.

Returning to the source code 1100 shown in FIGS. 11A-11B, it may be executed by processor circuitry to simulate information flow between 3 ASAI models with 3 subunits each. The source code 1100 may be executed to perform the following:

1) Build the network with age-constrained pathways.
2) Randomly assign initial states (0 or 1) to each node.
3) Apply the update rule: if $\geq\frac{2}{3}$ of inputs disagree with a node, the node switches state.
4) Update all nodes synchronously at each time step.
5) Track the fraction of nodes in agreement over time.
6) Stop when the system stabilizes or reaches the time limit.
7) Plot the results, including the true initial state at T=0.

Techniques operating according to the principles described herein may be implemented in any suitable manner. The processing and decision blocks of the flowcharts above represent steps and acts that may be included in algorithms that carry out these various processes. Algorithms derived from these processes may be implemented as software integrated with and directing the operation of one or more single- or multi-purpose processors, may be implemented as functionally equivalent circuits such as a DSP circuit or an ASIC, or may be implemented in any other suitable manner. It should be appreciated that the flowcharts included herein do not depict the syntax or operation of any particular circuit or of any particular programming language or type of programming language. Rather, the flowcharts illustrate the functional information one skilled in the art may use to fabricate circuits or to implement computer software algorithms to perform the processing of a particular apparatus carrying out the types of techniques described herein. For example, the flowcharts, or portion(s) thereof, may be implemented by hardware alone (e.g., one or more analog or digital circuits, one or more hardware-implemented state machines, etc., and/or any combination(s) thereof) that is configured or structured to carry out the various processes of the flowcharts. In some examples, the flowcharts, or portion(s) thereof, may be implemented by machine-executable instructions (e.g., machine-readable instructions, computer-readable instructions, computer-executable instructions, etc.) that, when executed by one or more single- or multi-purpose processors, carry out the various processes of the flowcharts. It should also be appreciated that, unless otherwise indicated herein, the particular sequence of steps and/or acts described in each flowchart is merely illustrative of the algorithms that may be implemented and can be varied in implementations and embodiments of the principles described herein.

Accordingly, in some embodiments, the techniques described herein may be embodied in machine-executable instructions implemented as software, including as application software, system software, firmware, middleware, embedded code, or any other suitable type of computer code. Such machine-executable instructions may be generated, written, etc., using any of a number of suitable programming languages and/or programming or scripting tools, and also may be compiled as executable machine language code or intermediate code that is executed on a framework, virtual machine, or container.

Machine-executable instructions (e.g., processor-executable instructions) implementing the techniques described herein (when implemented as one or more functional facilities or in any other manner) may, in some embodiments, be encoded on one or more computer-readable media, machine-readable media, etc., to provide functionality to the media. Computer-readable media, machine-readable media, etc., include magnetic media such as a hard disk drive, optical media such as a CD or a DVD, a persistent or non-persistent solid-state memory (e.g., Flash memory, Magnetic RAM, etc.), or any other suitable storage media. Such a computer-readable medium, a machine-readable medium, etc., may be implemented in any suitable manner. As used herein, the terms "computer-readable media" (also called "computer-readable storage media"), "computer-readable medium" (also called "computer-readable storage medium"), "machine-readable media" (also called "machine-readable storage media"), and "machine-readable medium" (also called "machine-readable storage medium") refer to tangible storage media. Tangible storage media are non-transitory and have at least one physical, structural component. In a "computer-readable medium" and "machine-readable medium" as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium, a machine-readable medium, etc., may be altered during a recording process.

Further, some techniques described above comprise acts of storing information (e.g., data and/or instructions) in certain ways for use by these techniques. In some implementations of these techniques-such as implementations where the techniques are implemented as machine-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as machine-executable instructions, these instructions may be executed on one or more suitable computing device(s) and/or electronic device(s) operating in any suitable computer and/or electronic system, or one or more computing devices (or one or more processors of one or more computing devices) and/or one or more electronic devices (or one or more processors of one or more electronic devices) may be programmed to execute the machine-executable instructions. A computing device, electronic device, or processor (e.g., processor circuitry) may be programmed to execute instructions when the instructions are stored in a manner accessible to the computing device, electronic device, or processor, such as in a datastore (e.g., an on-chip cache or instruction register, a computer-readable storage medium and/or a machine-readable storage medium accessible via a bus, a computer-readable storage medium and/or a machine-readable storage medium accessible via one or more networks and accessible by the device/processor, etc.).

Embodiments have been described where the techniques are implemented in circuitry and/or machine-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The phrase "and/or," as used herein in the specification and in the claims, should be understood to mean "either or both," of the elements so conjoined, e.g., elements that are conjunctively present in some cases and disjunctively present in other cases. Multiple elements listed with "and/or" should be construed in the same fashion, e.g., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

All definitions, as defined and used herein, should be understood to control over dictionary definitions, definitions in documents incorporated by reference, and/or ordinary meanings of the defined terms.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

Various aspects are described in this disclosure, which include, but are not limited to, the following aspects:

1. A method for generating a first bank of age-stratified large language models (LLMs) to simulate responses to prompts that would be provided by a first person in different life stages of their life, the method comprising: using at least one computer hardware processor to perform: receiving, from at least one first datastore and via at least one communication network, first electronic data associated with the first person; processing the first electronic data to generate first life stage data comprising first multiple data portions corresponding to the different life stages of the first person; generating the first bank of age-stratified LLMs by using the first multiple data portions to further train a reference LLM, the generating comprising: generating, for each particular data portion of the first multiple data portions corresponding to a particular life stage of the first person, a respective age-stratified LLM by further training, using the particular data portion, an instance of the reference LLM to generate simulated responses to questions that the first person would have provided in their particular life stage; and storing the first bank of age-stratified trained LLMs.

2. The method of aspect 1, wherein the different life stages of the first person comprise a youth life stage, a mature life stage, and an elder life stage of the first person, and generating the first bank of age-stratified LLMs comprises: generating a first age-stratified LLM of the first bank by further training, using a first data portion of the first multiple data portions corresponding to the youth life stage of the first person, a first instance of the reference LLM to generate simulated responses to questions that the first person would have provided in the youth life stage; generating a second age-stratified LLM of the first bank by further training, using a second data portion of the first multiple data portions corresponding to the mature life stage of the first person, a second instance of the reference LLM to generate simulated responses to questions that the first person would have provided in the mature life stage; and generating a third age-stratified LLM of the first bank by further training, using a third data portion of the first multiple data portions corresponding to the elder life stage of the first person, a third instance of the reference LLM to generate simulated responses to questions that the first person would have provided in the elder life stage.

3. The method of aspect 1, wherein generating the first bank of age-stratified LLMs comprises: retrieving the instance of the reference LLM from at least one second datastore; adjusting, using (i) a first data portion of the first multiple data portions corresponding to a first life stage of the first person and (ii) a first LLM learning rate smaller than a second LLM learning rate used to train the instance of the reference LLM, a first set of LLM parameters of at least one output layer of the instance of the reference LLM to generate a further trained LLM; determining a value of an evaluation parameter indicative of a performance of the further trained LLM by executing the further trained LLM using a performance verification dataset; and outputting the further trained LLM as a first age-stratified LLM of the first bank of age-stratified LLMs in response to determining that the value of the evaluation parameter meets an evaluation parameter threshold.

4. The method of aspect 1, further comprising: processing second electronic data to generate second life stage data comprising second multiple data portions corresponding to different life stages of a second person; and generating a second bank of age-stratified LLMs by using the second multiple data portions to further train the reference LLM, the generating comprising: generating, for each particular data portion of the second multiple data portions corresponding to a particular life stage of the second person, a respective age-stratified LLM by further training, using the particular data portion, a further instance of the reference LLM to generate simulated responses to questions that the second person would have provided in their particular life stage.

5. The method of aspect 1, further comprising: using a first age-stratified LLM of the first bank of age-stratified LLMs corresponding to a first life stage of the first person and a second age-stratified LLM of a second bank of age-stratified LLMs corresponding to a second life stage of a second person to simulate a dialogue that the first person and the second person would have had in their respective life stages by: executing the first age-stratified LLM to generate a first simulated response to a question comprised in a first prompt that the first person would have provided in the first life stage of the first person; and executing the second age-stratified LLM to generate a second simulated response to at least one of the question or the first simulated response that the second person would have provided in the second life stage of the second person.

6. The method of aspect 5, wherein: executing the first age-stratified LLM comprises executing the first age-stratified LLM in a first virtual machine (VM) having a first private Internet Protocol (IP) address in a virtual network; and executing the second age-stratified LLM comprises executing the second age-stratified LLM in a second VM having a second private IP address in the virtual network, and simulating the dialogue comprises: transmitting, from the first VM and using the first and second private IP addresses, a first communication message comprising the first simulated response to the second VM over the virtual network; and transmitting, from the second VM and using the first and second private IP addresses, a second communication message comprising the second simulated response to the first VM over the virtual network.

7. The method of aspect 5, wherein: executing the first age-stratified LLM comprises executing the first age-stratified LLM in a first container having a first private Internet Protocol (IP) address in a virtual network; and executing the second age-stratified LLM comprises executing the second age-stratified LLM in a second container having a second private IP address in the virtual network.

8. The method of aspect 7, wherein simulating the dialogue comprises: transmitting, from the first container and using the first and second private IP addresses, the first simulated response to the second container over the virtual network; and transmitting, from the second container and using the first and second private IP addresses, the second simulated response to the first container over the virtual network.

9. The method of aspect 7, wherein a container pod comprises the first container and the second container, and simulating the dialogue comprises: instantiating a shared volume in the container pod and accessible by the first container and the second container; and wherein: executing the first age-stratified LLM comprises storing the first simulated response in the shared volume; and executing the second age-stratified LLM comprises retrieving the first simulated response from the shared volume and storing the second simulated response in the shared volume.

10. The method of aspect 1, wherein a first age-stratified LLM of the first bank of age-stratified LLMs corresponds to a first life stage of the first person, and further comprising: receiving, from an electronic device associated with a user and via the at least one communication network, a first prompt comprising a question for the first age-stratified LLM to generate a first simulated response that the first person would have provided in the first life stage; retrieving, from at least one second datastore, contextual data associated with the question that the first person would have used to provide the first simulated response; and executing, using the first prompt and the contextual data, the first age-stratified LLM to generate the first simulated response.

11. The method of aspect 1, wherein processing the first electronic data comprises: detecting, using a natural language processing model, at least partial calendar dates from the first multiple data portions and each partial calendar date associated with at least one of the first multiple data portions; and executing, using the at least partial calendar dates, a machine learning (ML) model to generate the first life stage data, the ML model trained to classify multiple data portions as pertaining to particular life stages of persons to generate life stage data, and generating the first life stage data comprises: generating, for each particular data portion of the first multiple data portions, a data association between the particular data portion and a particular life stage of the first person by mapping a particular partial calendar date of the particular data portion to the particular life stage; and storing the data associations, the first life stage data comprising the data associations.

12. An apparatus comprising at least one memory storing instructions, and at least one computer hardware processor configured to execute the instructions to perform the method of any one of aspects 1-11.

13. At least one computer-readable storage medium storing processor executable instructions that, when executed by at least one computer hardware processor, cause the at least one computer hardware processor to perform the method of any one of aspects 1-11.

14. A system comprising at least one hardware processor, and at least one computer-readable storage medium storing processor executable instructions that, when executed by the at least one hardware processor, cause the at least one hardware processor to perform the method of any one of aspects 1-11.

A1. A method for generating a dialogue between at least a first age-stratified large language model (LLM) and a second age-stratified LLM, the first age-stratified LLM trained to generate simulated responses to questions that a first person would have provided in a first life stage of their life, the second age-stratified LLM trained to generate simulated responses to questions that a second person would have provided in a second life stage of their life, the method comprising: using at least one computer hardware processor to perform: receiving, from an electronic device and via at least one communication network, a prompt comprising a question; executing, using the prompt, the first age-stratified LLM to generate a first simulated response to the question that the first person would have provided in the first life stage; executing, using at least one of the prompt or the first simulated response, the second age-stratified LLM to generate a second simulated response to at least one of the question or the first simulated response that the second person would have provided in the second life stage; and generating, using at least one of the first simulated response or the second simulated response, an output representing a third simulated response to the question that the first person and the second person would have collectively determined to provide in their particular life stages and for output to the electronic device via the at least one communication network.

A2. The method of aspect A1, wherein: executing the first age-stratified LLM comprises executing the first age-stratified LLM in a first virtual machine (VM) having a first private Internet Protocol (IP) address in a software-defined network; and executing the second age-stratified LLM comprises executing the second age-stratified LLM in a second VM having a second private IP address in the software-defined network, and the method further comprising: transmitting, from the first VM and using the first and second private IP addresses, the first simulated response to the second VM over the software-defined network; and transmitting, from the second VM and using the first and second private IP addresses, the second simulated response to the first VM over the software-defined network.

A3. The method of aspect A1, wherein: executing the first age-stratified LLM comprises executing the first age-stratified LLM in a first container having a first private Internet Protocol (IP) address in a software-defined network; and executing the second age-stratified LLM comprises executing the second age-stratified LLM in a second container having a second private IP address in the software-defined network.

A4. The method of aspect A3, further comprising: transmitting, from the first container and using the first and second private IP addresses, the first simulated response to the second container over the software-defined network; and transmitting, from the second container and using the first and second private IP addresses, the second simulated response to the first container over the software-defined network.

A5. The method of aspect A3, wherein a container pod comprises the first container and the second container, and the method further comprising: instantiating a shared volume in the container pod and accessible by the first container and the second container; and wherein: executing the first age-stratified LLM comprises storing the first simulated response in the shared volume; and executing the second age-stratified LLM comprises retrieving the first simulated response from the shared volume and storing the second simulated response in the shared volume.

A6. The method of aspect A1, wherein the first life stage of the first person is a maturer life stage than the second life stage of the second person, and further comprising: configuring a software-defined network to enable communications from the first age-stratified LLM to the second age-stratified LLM; and transmitting, from the first age-stratified LLM and using the software-defined network, the first output to the second age-stratified LLM.

A7. The method of aspect A1, wherein the second life stage of the second person is a maturer life stage than the first life stage of the first person, and further comprising: configuring a software-defined network to block data transmissions from the first age-stratified LLM to the second age-stratified LLM; configuring the software-defined network to enable data transmissions from the second age-stratified LLM to the first age-stratified LLM; and transmitting, from the second age-stratified LLM and over the software-defined network, the second simulated response to the first age-stratified LLM.

A8. The method of aspect A1, wherein the question is whether at least the first person and the second person in their particular life stages would vote for a course of action, the simulated response is a first simulated vote that the first person would have cast in the first life stage, the second simulated response is a second simulated vote that the second person would have cast in the second life stage, and generating the third simulated response comprises: receiving, from at least the first age-stratified LLM and the second age-stratified LLM, at least the first simulated vote and the second simulated vote; and in response to a number of simulated votes in the affirmative meeting a voting threshold, generating the third simulated response comprises generating the third simulated response to be indicative of approval of the course of action.

A9. The method of aspect A1, wherein the first person in the first life stage and the second person in the second life stage do not overlap in time.

A10. The method of aspect A9, further comprising: accessing, via the at least one communication network, at least one datastore comprising contextual data associated with the question, the contextual data comprising information that would not have been available to the first person in the first life stage, and wherein: executing the first age-stratified LLM comprises executing, using the prompt and the contextual data, the first age-stratified LLM to generate the first simulated response that the first person would have provided in the first life stage having access to the contextual data.

A11. An apparatus comprising at least one memory storing instructions, and at least one computer hardware processor configured to execute the instructions to perform the method of any one of aspects A1-A10.

A12. At least one computer-readable storage medium storing processor executable instructions that, when executed by at least one computer hardware processor, cause the at least one computer hardware processor to perform the method of any one of aspects A1-A10.

A13. A system comprising at least one hardware processor, and at least one computer-readable storage medium storing processor executable instructions that, when executed by the at least one hardware processor, cause the at least one hardware processor to perform the method of any one of aspects A1-A10.

The invention claimed is:

1. A method for generating a dialogue between at least a first age-stratified large language model (LLM) and a second age-stratified LLM, the first age-stratified LLM trained to generate simulated responses to questions that a first person would have provided in a first life stage of their life, the second age-stratified LLM trained to generate simulated responses to questions that a second person would have provided in a second life stage of their life, the method comprising:

using at least one computer hardware processor to perform:

receiving, from an electronic device and via at least one communication network, a prompt comprising a question;

executing, using the prompt, the first age-stratified LLM to generate a first simulated response to the question that the first person would have provided in the first life stage;

executing, using the prompt and the first simulated response, the second age-stratified LLM to generate a second simulated response to at least one of the question or the first simulated response, the second simulated response corresponding to a response that the second person would have provided in the second life stage; and generating, using the first simulated response and the second simulated response, an output representing a third simulated response to the question that the first person and the second person would have collectively determined to provide in their particular life stages, the output to be provided to the electronic device via the at least one communication network.

2. The method of claim 1, wherein:

executing the first age-stratified LLM comprises executing the first age-stratified LLM in a first virtual machine (VM) having a first private Internet Protocol (IP) address in a software-defined network; and executing the second age-stratified LLM comprises executing the second age-stratified LLM in a second VM having a second private IP address in the software-defined network, and the method further comprising:

transmitting, from the first VM and using the first and second private IP addresses, the first simulated response to the second VM over the software-defined network; and transmitting, from the second VM and using the first and second private IP addresses, the second simulated response to the first VM over the software-defined network.

3. The method of claim 1, wherein:

executing the first age-stratified LLM comprises executing the first age-stratified LLM in a first container having a first private Internet Protocol (IP) address in a software-defined network; and executing the second age-stratified LLM comprises executing the second age-stratified LLM in a second container having a second private IP address in the software-defined network.

4. The method of claim 3, further comprising:

transmitting, from the first container and using the first and second private IP addresses, the first simulated response to the second container over the software-defined network; and transmitting, from the second container and using the first and second private IP addresses, the second simulated response to the first container over the software-defined network.

5. The method of claim 3, wherein a container pod comprises the first container and the second container, and the method further comprising:

instantiating a shared volume in the container pod and accessible by the first container and the second container; and wherein:

executing the first age-stratified LLM comprises storing the first simulated response in the shared volume; and executing the second age-stratified LLM comprises retrieving the first simulated response from the shared volume and storing the second simulated response in the shared volume.

6. The method of claim 1, wherein the first life stage of the first person corresponds to a first age range of the first person's life and is thereby a maturer life stage than the second life stage of the second person that corresponds to a second age range of the second person's life that is less than the first age range, and further comprising:

configuring a software-defined network to enable communications from the first age-stratified LLM to the second age-stratified LLM; and transmitting, from the first age-stratified LLM and using the software-defined network, the first output to the second age-stratified LLM.

7. The method of claim 1, wherein the second life stage of the second person corresponds to a second age range of the second person's life and is thereby a maturer life stage than the first life stage of the first person that corresponds to a first age range of the first person's life that is less than the second age range, and further comprising:

configuring a software-defined network to block data transmissions from the first age-stratified LLM to the second age-stratified LLM;

configuring the software-defined network to enable data transmissions from the second age-stratified LLM to the first age-stratified LLM; and transmitting, from the second age-stratified LLM and over the software-defined network, the second simulated response to the first age-stratified LLM.

8. The method of claim 1, wherein the question is whether at least the first person and the second person in their particular life stages would vote for a course of action, the first simulated response is a first simulated vote that the first person would have cast in the first life stage, the second simulated response is a second simulated vote that the second person would have cast in the second life stage, and generating the third simulated response comprises:

receiving, from at least the first age-stratified LLM and the second age-stratified LLM, at least the first simulated vote and the second simulated vote; and in response to a number of simulated votes in the affirmative meeting a voting threshold, generating the third simulated response comprises generating the third simulated response to be indicative of approval of the course of action.

9. The method of claim 1, wherein the first person in the first life stage is not alive when the second person is in the second life stage.

10. The method of claim 9, further comprising:

accessing, via the at least one communication network, at least one datastore comprising contextual data associated with the question, the contextual data comprising information that would not have been available to the first person in the first life stage, and wherein:

executing the first age-stratified LLM comprises executing, using the prompt and the contextual data, the first age-stratified LLM to generate the first simulated response that the first person would have provided in the first life stage having access to the contextual data.

11. At least one computer-readable storage medium storing processor executable instructions that, when executed by at least one hardware processor, cause the at least one hardware processor to perform a method for generating a dialogue between at least a first age-stratified large language model (LLM) and a second age-stratified LLM, the first age-stratified LLM trained to generate simulated responses to questions that a first person would have provided in a first life stage of their life, the second age-stratified LLM trained to generate simulated responses to questions that a second person would have provided in a second life stage of their life, the method comprising:

receiving, from an electronic device and via at least one communication network, a prompt comprising a question;

executing, using the prompt, the first age-stratified LLM to generate a first simulated response to the question that the first person would have provided in the first life stage;

executing, using the prompt and the first simulated response, the second age-stratified LLM to generate a second simulated response to at least one of the question or the first simulated response, the second simulated response corresponding to a response that the second person would have provided in the second life stage; and generating, using the first simulated response and the second simulated response, an output representing a third simulated response to the question that the first person and the second person would have collectively determined to provide in their particular life stages, the output to be provided to the electronic device via the at least one communication network.

12. The at least one computer-readable storage medium of claim 11, wherein:

executing the first age-stratified LLM comprises executing the first age-stratified LLM in a first virtual machine (VM) having a first private Internet Protocol (IP) address in a software-defined network; and executing the second age-stratified LLM comprises executing the second age-stratified LLM in a second VM having a second private IP address in the software-defined network, and the method further comprising:

transmitting, from the first VM and using the first and second private IP addresses, the first simulated response to the second VM over the software-defined network; and

causing transmission, from the second VM and using the first and second private IP addresses, of the second simulated response to the first VM over the software-defined network.

13. The at least one computer-readable storage medium of claim 11, wherein:

executing the first age-stratified LLM comprises executing the first age-stratified LLM in a first container having a first private Internet Protocol (IP) address in a software-defined network; and executing the second age-stratified LLM comprises executing the second age-stratified LLM in a second container having a second private IP address in the software-defined network.

14. The at least one computer-readable storage medium of claim 13, the method further comprising:

causing transmission, from the first container and using the first and second private IP addresses, of the first simulated response to the second container over the software-defined network; and causing transmission, from the second container and using the first and second private IP addresses, of the second simulated response to the first container over the software-defined network.

15. The at least one computer-readable storage medium of claim 13, wherein a container pod comprises the first container and the second container, and the method further comprising:

instantiating a shared volume in the container pod and accessible by the first container and the second container; and wherein:

executing the first age-stratified LLM comprises storing the first simulated response in the shared volume; and executing the second age-stratified LLM comprises retrieving the first simulated response from the shared volume and storing the second simulated response in the shared volume.

16. A system for generating a dialogue between at least a first age-stratified large language model (LLM) and a second age-stratified LLM, the first age-stratified LLM trained to generate simulated responses to questions that a first person would have provided in a first life stage of their life, the second age-stratified LLM trained to generate simulated responses to questions that a second person would have provided in a second life stage of their life, the system comprising:

at least one hardware processor; and at least one computer-readable storage medium storing processor executable instructions that, when executed by the at least one hardware processor, cause the at least one hardware processor to perform a method comprising:

receiving, from an electronic device and via at least one communication network, a prompt comprising a question;

executing, using the prompt, the first age-stratified LLM to generate a first simulated response to the question that the first person would have provided in the first life stage;

executing, using the prompt and the first simulated response, the second age-stratified LLM to generate a second simulated response to at least one of the question or the first simulated response, the second simulated response corresponding to a response that the second person would have provided in the second life stage; and generating, using the first simulated response and the second simulated response, an output representing a third simulated response to the question that the first person and the second person would have collectively determined to provide in their particular life stages, the output to be provided to the electronic device via the at least one communication network.

17. The system of claim 16, wherein the first life stage of the first person corresponds to a first age range of the first person's life and is thereby a maturer life stage than the second life stage of the second person that corresponds to a second age range of the second person's life that is less than the first age range, and the method further comprising:

configuring a software-defined network to enable communications from the first age-stratified LLM to the second age-stratified LLM; and transmitting, from the first age-stratified LLM and using the software-defined network, the first output to the second age-stratified LLM.

18. The system of claim 16, wherein the second life stage of the second person corresponds to a second age range of the second person's life and is thereby a maturer life stage than the first life stage of the first person that corresponds to a first age range of the first person's life that is less than the second age range, and the method further comprising:

configuring a software-defined network to block data transmissions from the first age-stratified LLM to the second age-stratified LLM;

configuring the software-defined network to enable data transmissions from the second age-stratified LLM to the first age-stratified LLM; and transmitting, from the second age-stratified LLM and over the software-defined network, the second simulated response to the first age-stratified LLM.

19. The system of claim 16, wherein the question is whether at least the first person and the second person in their particular life stages would vote for a course of action, the first simulated response is a first simulated vote that the first person would have cast in the first life stage, the second simulated response is a second simulated vote that the second person would have cast in the second life stage, and generating the third simulated response comprises:

receiving, from at least the first age-stratified LLM and the second age-stratified LLM, at least the first simulated vote and the second simulated vote; and in response to a number of simulated votes in the affirmative meeting a voting threshold, generating the third simulated response comprises generating the third simulated response to be indicative of approval of the course of action.

20. The system of claim 16, wherein the first person in the first life stage and the second person in the second life stage do not overlap in time, and the method further comprising:

accessing, via the at least one communication network, at least one datastore comprising contextual data associated with the question, the contextual data comprising information that would not have been available to the first person in the first life stage, and wherein:

executing the first age-stratified LLM comprises executing, using the prompt and the contextual data, the first age-stratified LLM to generate the first simulated response that the first person would have provided in the first life stage having access to the contextual data.

\* \* \* \* \*